US012627415B2

(12) United States Patent (10) Patent No.: US 12,627,415 B2
Choi et al. (45) Date of Patent: May 12, 2026

(54) METHOD AND DEVICE FOR DETERMINING NUMBER OF HARQ PROCESS IDS AND TRANSMITTING HARQ-ACK IN WIRELESS COMMUNICATION SYSTEM

(71) Applicant: Samsung Electronics Co., Ltd., Suwon-si (KR)

(72) Inventors: Kyungjun Choi, Suwon-si (KR); Seongmok Lim, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 18/563,703

(22) PCT Filed: Dec. 30, 2022

(86) PCT No.: PCT/KR2022/021688
§ 371 (c)(1),
(2) Date: Nov. 22, 2023

(87) PCT Pub. No.: WO2023/128684
PCT Pub. Date: Jul. 6, 2023

(65) Prior Publication Data
US 2024/0313900 A1 Sep. 19, 2024

(30) Foreign Application Priority Data

Dec. 30, 2021 (KR) ........................ 10-2021-0192886
Sep. 7, 2022 (KR) ........................ 10-2022-0113729

(51) Int. Cl.
*H04L 1/1822* (2023.01)
*H04L 1/1607* (2023.01)
(Continued)

(52) U.S. Cl.
CPC .......... *H04L 1/1822* (2013.01); *H04L 1/1614* (2013.01); *H04L 1/1854* (2013.01); *H04L 1/1887* (2013.01)

(58) Field of Classification Search
CPC ..... H04L 1/1887; H04L 1/1854; H04L 1/188; H04L 1/1861; H04L 5/00; H04L 1/1896;
(Continued)

(56) References Cited

U.S. PATENT DOCUMENTS

2021/0167888 A1 6/2021 Lin
2021/0258107 A1 8/2021 Khoshnevisan et al.
(Continued)

FOREIGN PATENT DOCUMENTS

EP 3840266 A1 6/2021
WO 2021187845 A1 9/2021
WO 2021206398 A1 10/2021

OTHER PUBLICATIONS

International Search Report and Written Opinion of the International Searching Authority dated Mar. 31, 2023, in connection with International Application No. PCT/KR2022/021688, 10 pages.
(Continued)

*Primary Examiner* — Syed Ali

(57) ABSTRACT

The present disclosure provides a method performed by a terminal in a wireless communication system. The method comprising the steps of: receiving first information for setting the number of HARQ processes associated with a PDSCH; confirming whether a first SCS for a first BWP is set to 480 kHz or 960 kHz; confirming whether a second SCS for a second BWP is set to a value other than 480 kHz and 960 kHz; and receiving the PDSCH on the basis of the first BWP or the second BWP, wherein the number of HARQ processes can be supported up to 32 in the second BWP in which the second SCS is set, if 32 HARQ processes set on (Continued)

the basis of the first information are associated with the first SCS.

15 Claims, 20 Drawing Sheets

(51) Int. Cl.
 *H04L 1/1829*        (2023.01)
 *H04L 1/1867*        (2023.01)
(58) Field of Classification Search
  CPC ... H04L 1/1864; H04L 1/1614; H04L 5/0055;
                                  H04L 1/1822
  See application file for complete search history.

(56)              References Cited

U.S. PATENT DOCUMENTS

| | | | | |
|---|---|---|---|---|
| 2021/0400714 | A1 | 12/2021 | Huang et al. | |
| 2022/0022173 | A1* | 1/2022 | Oh | H04L 1/1607 |
| 2022/0116953 | A1* | 4/2022 | Kim | H04W 72/21 |
| 2022/0150946 | A1* | 5/2022 | Tsai | H04W 76/28 |
| 2022/0368475 | A1* | 11/2022 | Lei | H04L 1/1822 |
| 2023/0143581 | A1* | 5/2023 | Myung | H04W 72/1268 |
| | | | | 370/329 |
| 2023/0319830 | A1* | 10/2023 | Liang | H04L 5/0092 |
| | | | | 370/329 |
| 2023/0327821 | A1* | 10/2023 | Yang | H04L 1/1812 |
| | | | | 370/329 |
| 2023/0403702 | A1* | 12/2023 | Su | H04L 1/1896 |
| 2024/0057108 | A1* | 2/2024 | Yi | H04L 1/1854 |
| 2024/0073816 | A1* | 2/2024 | Lai | H04L 5/0053 |
| 2024/0090023 | A1* | 3/2024 | Singh | H04L 1/1854 |
| 2024/0179716 | A1* | 5/2024 | Liang | H04L 1/1812 |
| 2024/0306100 | A1* | 9/2024 | Noh | H04W 52/42 |

OTHER PUBLICATIONS

3GPP TS 38.212 V17.5.0 (Mar. 2023), Technical Specification, 3rd Generation Partnership Project; Technical Specification Group Radio Access Network; NR; Multiplexing and channel coding (Release 17), Mar. 2023, 203 pages.
3GPP TS 38.214 V17.3.0 (Sep. 2022), Technical Specification, 3rd Generation Partnership Project; Technical Specification Group Radio Access Network; NR; Physical layer procedures for data (Release 17), Sep. 2022, 232 pages.
3GPP TS 38.306 V17.2.0 (Sep. 2022), Technical Specification, 3rd Generation Partnership Project; Technical Specification Group Radio Access Network; NR; User Equipment (UE) radio access capabilities (Release 17), Sep. 2022, 244 pages.
3GPP TS 38.331 V16.7.0 (Dec. 2021), Technical Specification, 3rd Generation Partnership Project; Technical Specification Group Radio Access Network; NR; Radio Resource Control (RRC) protocol specification (Release 16), Dec. 2021, 963 pages.
3GPP TS 38.331 V17.5.0 (Jun. 2023), Technical Specification, 3rd Generation Partnership Project; Technical Specification Group Radio Access Network; NR; Radio Resource Control (RRC) protocol specification (Release 17), Jun. 2023, 1328 pages.
Moderator (LG Electronics), et al., "Summary #4 of PDSCH/ PUSCH enhancements (Scheduling/ HARQ)," R1-2112714, 3GPP TSG RAN WG1 Meeting #107-e, e-Meeting, Nov. 11-19, 2021, 118 pages.
Moderator (LG Electronics), et al., "Correction to support up to 32 HARQ process numbers for FR2-2," R1-2210604, 3GPP TSG RAN WG1 #110bis-e, e-Meeting, Oct. 10-19, 2022, 3 pages.
QUALCOMM Incorporated, "PDSCH and PUSCH enhancements for 52.6-71GHz band," R1-2112207, 3GPP TSG RAN WG1 Meeting #107-e, e-Meeting, Nov. 11-29, 2021, 12 pages.
Supplementary European Search Report dated Jul. 25, 2024, in connection with European Patent Application No. 22916825.7, 10 pages.

* cited by examiner

1 Subframe [110]

$N_{symb}^{subframe,\mu}$ OFDM symbol

1 OFDM symbol [102]

1 Subcarrier [103]

$K = N_{RB,x}^{max,\mu} N_{sc}^{RB} - 1$ $N_{RB}^{\mu} N_{sc}^{RB}$ subcarrier

Resource block $N_{sc}^{RB}$ subcarrier [104]

Resource element (k,l) [101]

$K = 0$ $\bar{l} = 0$          $\bar{l} = 14 \cdot 2^{\mu} - 1$

Frequency

Time

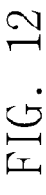

TDRA field
[1200]

MCS field
[1205]

NDI field
for single
PDSCH
[1210]

RV field
for single
PDSCH
[1215]

HARQ process
number field
[1220]

Antenna port(s)
field
[1225]

DMRS
sequence
initialization
field
[1230]

Padding
bits
[1235]

[a]: DCI for single-PDSCH scheduling

TDRA field
[1200]

MCS field
[1255]

NDI field
for 1st
PDSCH
[1260]

RV field
for 1st
PDSCH
[1262]

NDI field
for 2nd
PDSCH
[1261]

RV field
for 2nd
PDSCH
[1263]

HARQ process
number field
[1270]

Antenna port(s)
field
[1275]

DMRS
sequence
initialization
field
[1280]

[b]: DCI for multi-PDSCH scheduling 1 bit

METHOD AND DEVICE FOR DETERMINING NUMBER OF HARQ PROCESS IDS AND TRANSMITTING HARQ-ACK IN WIRELESS COMMUNICATION SYSTEM

TECHNICAL FIELD

The disclosure relates to operations of a terminal and a base station in a wireless communication system. Specifically, the disclosure relates to a method for determining the number of HARQ processes by a terminal, a method for HARQ-ACK transmission according to the determination, and a device capable of performing the same.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The disclosure is to provide a device and a method capable of effectively providing a service in a mobile communication system.

Specifically, the disclosure provides a method for configuring the number of HARQ process IDs in consideration of BWPs having different subcarrier spacings and a method for generating a Type-3 HARQ-ACK codebook according to the number of HARQ process IDs in a wireless communication system.

In addition, the disclosure provides a method for determining the number of bits of an HARQ process number field or HARQ-ACK bitmap field included in DCI/UCI.

Solution to Problem

A method performed by a terminal in a wireless communication system according to an embodiment of the disclosure may include receiving first information for configuring the number of hybrid automatic repeat request (HARQ) processes associated with a physical downlink shared channel (PDSCH), identifying that a first subcarrier spacing (SCS) for a first bandwidth part (BWP) is configured to be 480 kHz or 960 kHz, identifying that a second SCS for a second BWP is configured to be a value other than 480 kHz and 960 kHz, and receiving the PDSCH based on the first BWP or the second BWP, wherein, if 32, which is the number of HARQ processes, configured based on the first information is associated with the first SCS, up to 32 HARQ processes may be supported in the second BWP for which the second SCS is configured.

A method performed by a base station in a wireless communication system according to an embodiment of the disclosure may include transmitting, to a terminal, first information for configuring the number of HARQ processes associated with a PDSCH, and transmitting the PDSCH to the terminal, based on a first BWP or a second BWP, wherein a first SCS for the first BWP is configured to be 480 kHz or 960 kHz, a second SCS for the second BWP is configured to be a value other than 480 kHz and 960 kHz, and if 32, which is the number of HARQ processes, configured based on the first information is associated with the first SCS, up to 32 HARQ processes may be supported in the second BWP for which the second SCS is configured.

A terminal of a wireless communication system according to an embodiment of the disclosure may include a transceiver, and a controller functionally connected to the transceiver, wherein the controller is configured to receive first information for configuring the number of HARQ processes associated with a PDSCH, identify that a first SCS for a first BWP is configured to be 480 kHz or 960 kHz, identify that a second SCS for a second BWP is configured to be a value other than 480 kHz and 960 kHz, and receive the PDSCH based on the first BWP or the second BWP, wherein, if 32, which is the number of HARQ processes, configured based on the first information is associated with the first SCS, up to 32 HARQ processes may be supported in the second BWP for which the second SCS is configured.

A base station of a wireless communication system according to an embodiment of the disclosure may include a transceiver, and a controller functionally connected to the transceiver, wherein the controller is configured to transmit, to a terminal, first information for configuring the number of HARQ processes associated with a PDSCH, and transmit the PDSCH to the terminal, based on a first BWP or a second BWP, wherein a first SCS for the first BWP is configured to be 480 kHz or 960 kHz, a second SCS for the second BWP is configured to be a value other than 480 kHz and 960 kHz, and if 32, which is the number of HARQ processes, configured based on the first information is associated with the first SCS, up to 32 HARQ processes may be supported in the second BWP for which the second SCS is configured.

Advantageous Effects of Invention

According to an embodiment of the disclosure, the number of HARQ processes can be determined by considering that a BWP supporting an SCS of 480 kHz or 960 kHz is configured, and an HARQ-ACK codebook may be generated based on the determined number of HARQ processes.

In addition, according to an embodiment of the disclosure, the number of bits of an HARQ process number field or HARQ-ACK bitmap field included in DCI/UCI can be appropriately determined, and a payload of DCI can be determined according to explicit configuration.

BRIEF DESCRIPTION OF DRAWINGS

FIG. 6 is a diagram for illustrating a method of transmitting or receiving data by a base station and a terminal in consideration of a downlink data channel and a rate matching resource in the wireless communication system according to an embodiment of the disclosure;

FIG. 12 is a diagram illustrating DCI for single-PDSCH scheduling and multi-PDSCH scheduling according to an embodiment of the disclosure;

MODE FOR THE INVENTION

Figure 1:
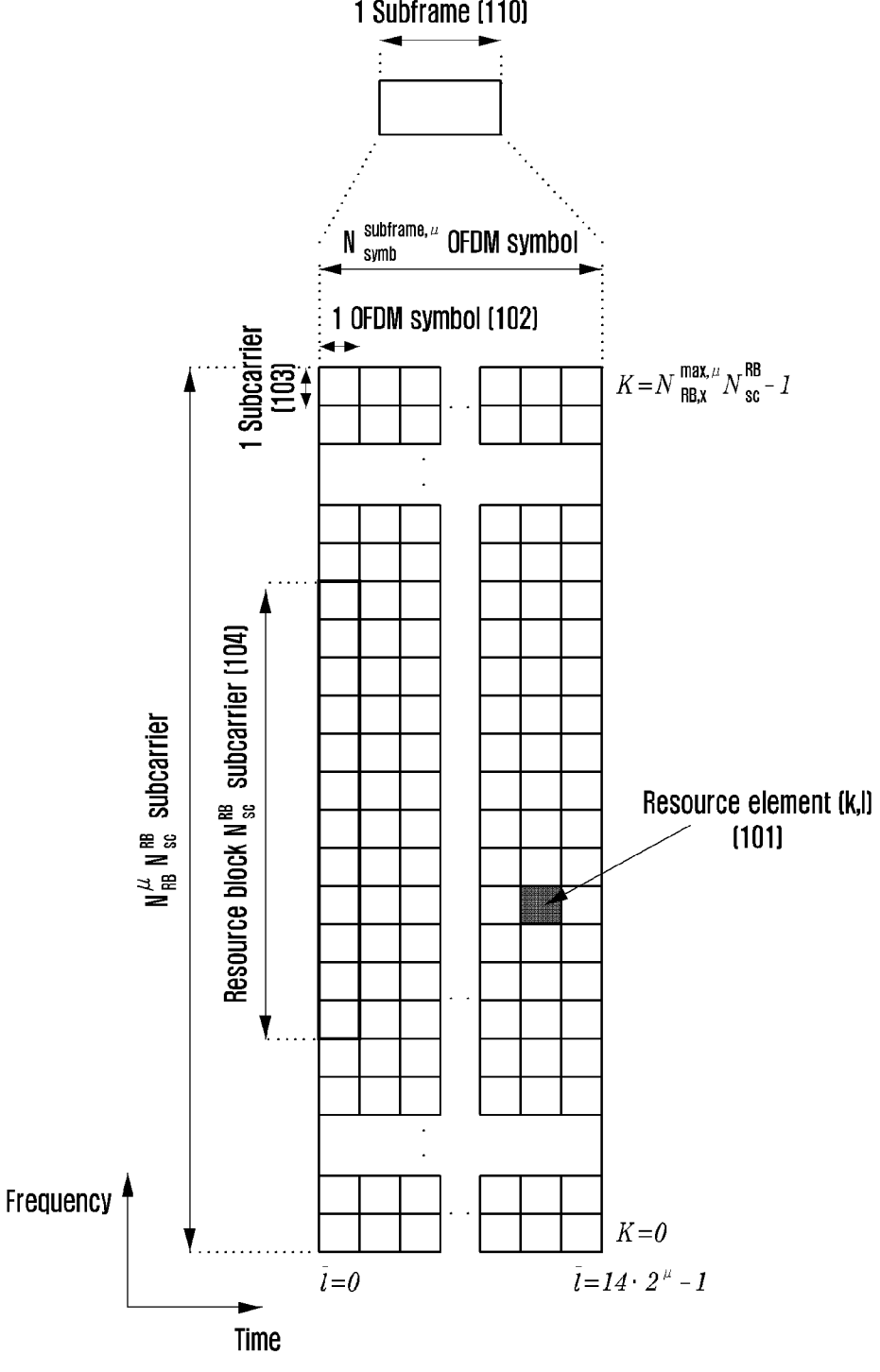
FIG. 1 is a diagram illustrating a basic structure of a time-frequency domain in a wireless communication system according to an embodiment of the disclosure.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like. eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

[NR Time-Frequency Resources]

Hereinafter, a frame structure of a 5G system will be described in more detail with reference to the drawings.

FIG. 1 is a diagram illustrating a basic structure of a time-frequency domain that is a radio resource region in which data or a control channel is transmitted in a 5G system.

In FIG. 1, a horizontal axis represents a time domain, and a vertical axis represents a frequency domain. A basic unit of a resource in the time and frequency domains is a resource element (RE) 101, and may be defined to be 1 orthogonal frequency division multiplexing (OFDM) symbol 102 on the time axis and 1 subcarrier 103 on the frequency axis.

$$N_{SC}^{RB}$$

(e.g., 12) consecutive REs in the frequency domain may constitute one resource block (RB) 104.

Figure 2:
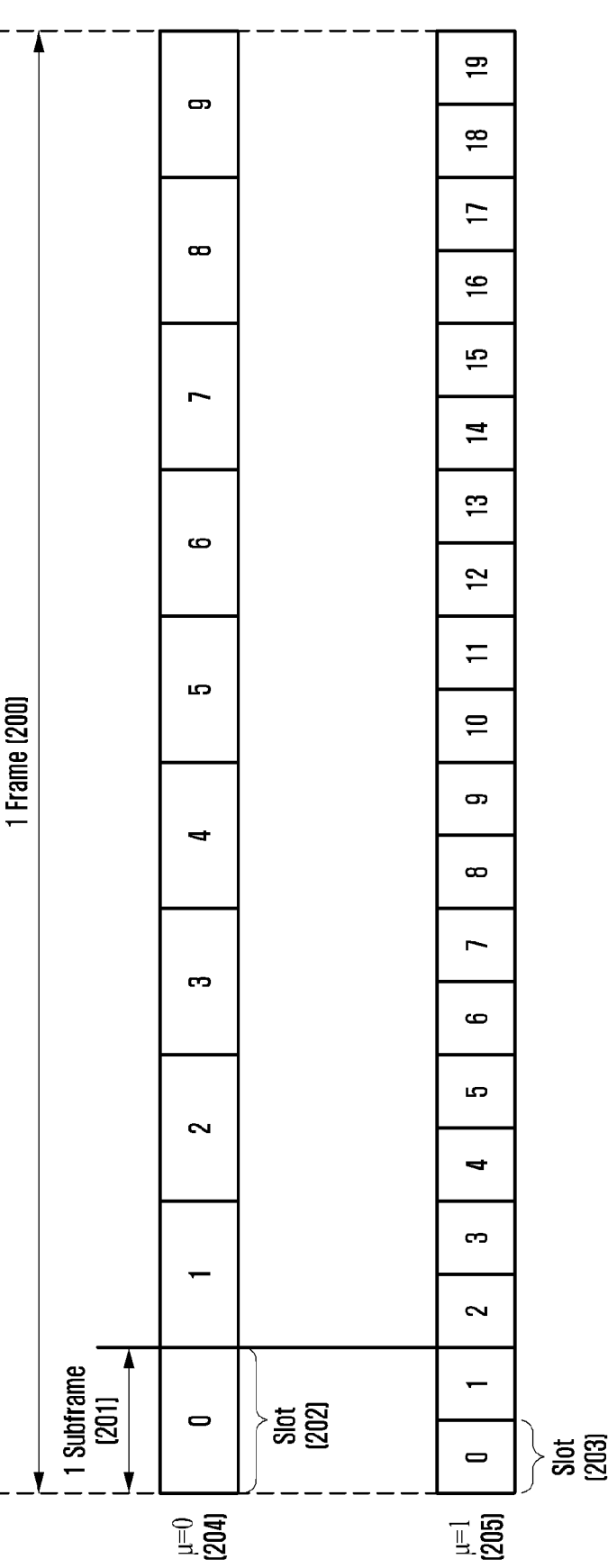
FIG. 2 is a diagram illustrating a frame, a subframe, and a slot structure in the wireless communication system according to an embodiment of the disclosure.

FIG. 2 is a diagram illustrating a frame, a subframe, and a slot structure in the wireless communication system according to an embodiment of the disclosure;

FIG. 2 illustrates an example of a frame 200, a subframe 201, and a slot 202 structure. One frame 200 may be defined to be 10 ms. One subframe 201 may be defined to be 1 ms, and therefore one frame 200 may include a total of 10 subframes 201. One slot 202 or 203 may be defined to be 14 OFDM symbols (that is, the number of symbols per slot $$\left(N_{symb}^{slot}\right) = 14).$$

One subframe 201 may include one or multiple slots 202 and 203, and the number of slots 202 and 203 per subframe 201 may vary according to configuration values μ 204 and 205 for subcarrier spacings. The example of FIG. 2 illustrates a case 204 where subcarrier spacing configuration value μ=0 and a case 205 where subcarrier spacing configuration value μ=1. For μ=0 204, one subframe 201 may include one slot 202, and for μ=1 205, one subframe 201 may include two slots 203. That is, the number $$\left(N_{slot}^{subframe,\mu}\right)$$

of slots per subframe may vary according to configuration value $\mu$ for a subcarrier spacing, and accordingly, the number $$\left(N_{slot}^{frame,\mu}\right)$$

of slots per frame may vary.

$$N_{slot}^{subframe,\mu}$$

And $$N_{slot}^{frame,\mu}$$

according to each subcarrier spacing configuration $\mu$ may be defined in Table 1 below.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a bandwidth part (BWP) configuration in a 5G communication system will be described in detail with reference to the drawings.

Figure 3:
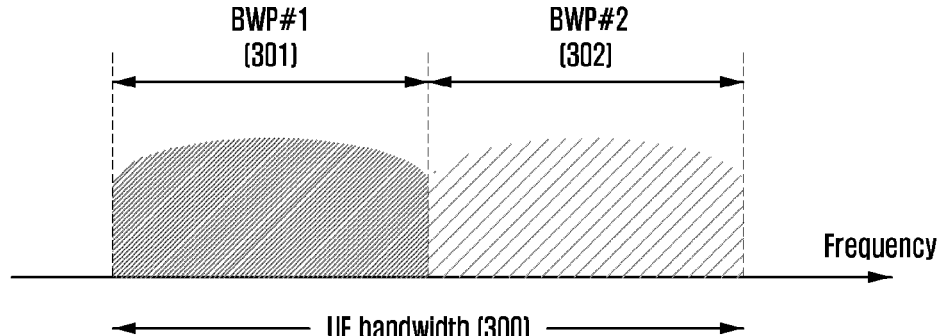
FIG. 3 is a diagram illustrating an example of a bandwidth part configuration in the wireless communication system according to an embodiment of the disclosure.

FIG. 3 is a diagram illustrating an example of a bandwidth part configuration in the wireless communication system according to an embodiment of the disclosure.

FIG. 3 shows an example in which a terminal bandwidth (UE bandwidth) 300 is configured to have two bandwidth parts, i.e., bandwidth part #1 301 and bandwidth part #2 302. A base station may configure one or multiple bandwidth parts for a terminal, and may configure, for each bandwidth part, information as shown in Table 2 below.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, |
| n4, n5}, | |
| (subcarrier spacing) | |
| cyclicPrefix | ENUMERATED { extended } |
| (cyclic prefix) | |
| } | |

The disclosure is not limited to the above example, and in addition to the configuration information, various parameters related to a bandwidth part may be configured for the terminal. The base station may transfer the information to the terminal via higher-layer signaling, for example, radio resource control (RRC) signaling. At least one bandwidth part among the configured one or multiple bandwidth parts may be activated. Whether the configured bandwidth part is active may be transferred from the base station to the terminal in a semi-static manner via RRC signaling or may be dynamically transferred via downlink control information (DCI).

According to some embodiments, the terminal before a radio resource control (RRC) connection may be configured with an initial bandwidth part (BWP) for initial access, by the base station via a master information block (MIB). More specifically, during initial access, the terminal may receive configuration information for a search space and a control area (control resource set (CORESET)) in which a PDCCH for receiving system information (which may correspond to remaining system information (RMSI) or system information block 1 (SIB1)) required for the initial access may be transmitted via the MIB. Each of the search space and the control resource set configured via the MIB may be considered to be identifier (identity (ID)) 0. The base station may notify, via the MIB, the terminal of configuration information, such as frequency allocation information, time allocation information, and numerology for control resource set #0. In addition, the base station may notify, via the MIB, the terminal of configuration information for a monitoring periodicity and occasion for control resource set #0, that is, the configuration information for search space #0. The terminal may consider a frequency domain configured to be control resource set #0, which is acquired from the MIB, as an initial bandwidth part for initial access. In this case, an identity (ID) of the initial bandwidth part may be considered to be 0.

The bandwidth part configuration supported by 5G may be used for various purposes. According to some embodiments, if a bandwidth supported by the terminal is smaller than a system bandwidth, this may be supported via the bandwidth part configuration. For example, the base station may configure, for the terminal, a frequency location (configuration information 2) of the bandwidth part, and the terminal may thus transmit or receive data at a specific frequency location within the system bandwidth.

According to some embodiments, for the purpose of supporting different numerologies, the base station may configure multiple bandwidth parts for the terminal. For example, in order to support data transmission or reception using both a subcarrier spacing of 15 kHz and a subcarrier spacing of 30 kHz for a certain terminal, the base station may configure two bandwidth parts with the subcarrier spacings of 15 kHz and 30 kHz, respectively. Different bandwidth parts may be frequency-division-multiplexed, and when data is to be transmitted or received at a specific subcarrier spacing, a bandwidth part configured with the subcarrier spacing may be activated.

In addition, according to some embodiments, for the purpose of reducing power consumption of the terminal, the base station may configure, for the terminal, bandwidth parts having different bandwidth sizes. For example, if the terminal supports a very large bandwidth, for example, a bandwidth of 100 MHz, and always transmits or receives data via the corresponding bandwidth, very large power consumption may occur. In particular, in a situation where there is no traffic, it may be very inefficient, in terms of power consumption, to perform unnecessary monitoring for a downlink control channel with a large bandwidth of 100 MHz. For the purpose of reducing power consumption of the terminal, the base station may configure, for the terminal, a bandwidth part of a relatively small bandwidth, for example, a bandwidth part of 20 MHz. In a situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) during initial access. More specifically, a terminal may be configured with a control area (control resource set (CORESET)) for a downlink control channel through which downlink control information (DCI) for scheduling of a system information block (SIB) may be transmitted from an MIB of a physical broadcast channel (PBCH). The bandwidth of the control resource set, which is configured via the MIB, may be considered to be the initial bandwidth part, and the terminal may receive a physical downlink shared channel (PDSCH), through which the SIB is transmitted, via the configured initial bandwidth part. In addition to reception of the SIB, the initial bandwidth part may be used for other system information (OSI), paging, and random access.

[Switching Bandwidth Part (BWP)]

When one or more bandwidth parts are configured for the terminal, the base station may indicate the terminal to change (or switch or shift) the bandwidth part, by using a bandwidth part indicator field in DCI. For example, in FIG. 3, if a currently active bandwidth part of the terminal is bandwidth part #1 301, the base station may indicate bandwidth part #2 302 to the terminal by using the bandwidth part indicator in the DCI, and the terminal may switch the bandwidth part to bandwidth part #2 302 indicated using the bandwidth part indicator in the received DCI.

As described above, the DCI-based switching of the bandwidth part may be indicated by the DCI for scheduling of a PDSCH or PUSCH, and therefore when a request for switching a bandwidth part is received, the terminal may need to perform, with ease, transmission or reception of the PDSCH or PUSCH scheduled by the corresponding DCI in the switched bandwidth part. To this end, requirements for a delay time ($T_{BWP}$) required during bandwidth part switching are regulated in the standards, and may be defined as shown in Table 3, for example.

TABLE 3

| | NR Slot | | BWP switch delay $T_{BWP}$ (slots) | |
|---|---|---|---|---|
| μ | length (ms) | | Type 1$^{Note\ 1}$ | Type 2$^{Note\ 1}$ |
| 0 | 1 | | 1 | 3 |
| 1 | 0.5 | | 2 | 5 |
| 2 | 0.25 | | 3 | 9 |
| 3 | 0.125 | | 6 | 18 |

*Note 1*:

Depends on UE capability.

*Note 2*:

If the BWP switch involves changing of SCS, the BWP switch delay is determined by the smaller SCS between the SCS before BWP switch and the SCS after BWP switch.

The requirements for a bandwidth part switching delay time support type 1 or type 2 according to capability of the terminal. The terminal may report a supportable bandwidth part delay time type to the base station.

According to the aforementioned requirements for the bandwidth part switching delay time, when the terminal receives DCI including a bandwidth part switching indicator in slot n, the terminal may complete switching to a new bandwidth part indicated by the bandwidth part switching indicator at a time point no later than slot n+$T_{BWP}$, and may perform transmission or reception for a data channel scheduled by the corresponding DCI in the switched new bandwidth part. When the base station is to schedule the data channel with the new bandwidth part, time domain resource allocation for the data channel may be determined by considering the bandwidth part switching delay time ($T_{BWP}$) of the terminal. That is, in the method of determining time domain resource allocation for the data channel when the base station schedules the data channel with the new bandwidth part, the data channel may be scheduled after the bandwidth part switching delay time. Accordingly, the terminal may not expect that DCI indicating bandwidth part switching indicates a value of a slot offset (K0 or K2) smaller than a value of the bandwidth part switching delay time ($T_{BWP}$).

If the terminal receives DCI (e.g., DCI format 1_1 or 0_1) indicating bandwidth part switching, the terminal may not perform any transmission or reception during a time interval from a third symbol of a slot in which a PDCCH including the DCI is received to a start point of a slot indicated by a slot offset (K0 or K2) value indicated via a time domain resource allocation indicator field in the DCI. For example, in case that the terminal receives the DCI indicating bandwidth part switching in slot n, and the slot offset value indicated by the DCI is K, the terminal may not perform any transmission or reception from a third symbol of slot n to a symbol before slot n+K (i.e., the last symbol in slot n+K−1).

[SS/PBCH Block]

In the following, a synchronization signal (SS)/PBCH block in 5G will be described.

The SS/PBCH block may refer to a physical layer channel block including a primary SS (PSS), a secondary SS (SSS), and a PBCH. Detailed descriptions are as follows.

PSS: A PSS is a signal that serves as a reference for downlink time/frequency synchronization, and provides some information of a cell ID.

SSS: An SSS serves as a reference for downlink time/frequency synchronization, and provides the remaining cell ID information that is not provided by a PSS. Additionally, the SSS may serve as a reference signal for demodulation of a PBCH.

PBCH: A PBCH provides essential system information necessary for transmission or reception of a data channel and a control channel of a terminal. The essential system information may include search space-related control information indicating radio resource mapping information of a control channel, scheduling control information on a separate data channel for transmission of system information, and the like.

SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The terminal may decode a PBCH and may detect a PSS and an SSS during initial access. The MIB may be acquired from the PBCH, and control area (control resource set (CORESET)) #0 (which may correspond to a control resource set having a control resource set index of 0) may be configured therefrom. The terminal may perform monitoring on control resource set #0 while assuming that demodulation reference signals (DMRSs) transmitted in control resource set #0 and a selected SS/PBCH block are quasi-co-located (QCLed). The terminal may receive system information as downlink control information transmitted in control resource set #0. The terminal may acquire, from the received system information, random-access channel (RACH)-related configuration information required for initial access. The terminal may transmit a physical RACH (PRACH) to the base station in consideration of a selected SS/PBCH index, and the base station having received the PRACH may acquire information on the SS/PBCH block index selected by the terminal. The base station may identify a block that the terminal has selected from among respective SS/PBCH blocks and may identify that control resource set #0 associated with the selected block is monitored.

[PDCCH: Relating to DCI]

Next, downlink control information (DCI) in the 5G system will be described in detail.

In the 5G system, scheduling information for uplink data (or physical uplink data channel (physical uplink shared channel (PUSCH)) or downlink data (or physical downlink data channel (physical downlink shared channel (PDSCH)) is transferred from the base station to the terminal via DCI. The terminal may monitor a fallback DCI format and a non-fallback DCI format for the PUSCH or PDSCH. The fallback DCI format may include a fixed field predefined between the base station and the terminal, and the non-fallback DCI format may include a configurable field.

The DCI may be transmitted on a physical downlink control channel (PDCCH) via channel coding and modulation. A cyclic redundancy check (CRC) is attached to a DCI message payload, and may be scrambled by a radio network temporary identifier (RNTI) corresponding to the identity of the terminal. Different RNTIs may be used according to the purpose of the DCI message, for example, terminal-specific (UE-specific) data transmission, a power control command, a random-access response, or the like. In other words, an RNTI is not transmitted explicitly, but is included in CRC calculation and transmitted. When the DCI message transmitted on the PDCCH is received, the terminal may check the CRC by using an assigned RNTI and may determine, if a CRC check result is correct, that the message is transmitted to the terminal.

For example, DCI for PDSCH scheduling for system information (SI) may be scrambled by an SI-RNTI. DCI for PDSCH scheduling for a random-access response (RAR) message may be scrambled by an RA-RNTI. DCI for PDSCH scheduling for a paging message may be scrambled by a P-RNTI. DCI for notification of a slot format indicator (SFI) may be scrambled by an SFI-RNTI. DCI for notification of a transmit power control (TPC) may be scrambled by a TPC-RNTI. DCI for scheduling of a UE-specific PDSCH or PUSCH may be scrambled by a cell RNTI (C-RNTI).

DCI format 0_0 may be used as fallback DCI for scheduling of a PUSCH, wherein a CRC is scrambled by a C-RNTI. DCI format 0_0 in which the CRC is scrambled by the C-RNTI may include, for example, information in Table 4 below.

14

DCI format 0_1 may be used as non-fallback DCI for scheduling of a PUSCH, wherein a CRC is scrambled by a C-RNTI. DCI format 0_1 in which the CRC is scrambled by the C-RNTI may include, for example, information in Table 5 below.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP}+1)/2) \rceil$ bits
Time domain resource assignment -1, 2, 3, or 4 bits
Virtual resource block (VRB)-to-physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-code-books;
0 bit otherwise.
TPC command for scheduled PUSCH - 2 bits SRS resource indicator $\left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based PUSCH transmission;

$\lceil \log_2(N_{SRS}) \rceil$ bits for codebook based PUSCH transmission.
Precoding information and number of layers -up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-DMRS association - 0 or 2 bits.
beta_offset indicator - 0 or 2 bits
- DMRS sequence initialization - 0 or 1 bit DCI format 1_0 may be used as fallback DCI for PDSCH scheduling, wherein a CRC is scrambled by a C-RNTI. DCI format 1_0 in which the CRC is scrambled by the C-RNTI may include, for example, information in Table 6 below.

TABLE 4

Identifier for DCI formats - [1] bit
Frequency domain resource assignment -[$\lceil \log_2 (N_{RB}^{UL,BWP}(N_{RB}^{UL,BWP}+1)/2) \rceil$] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
- UL / supplementary UL (SUL) indicator - 0 or 1 bit

TABLE 6

| |
| --- |
| Identifier for DCI formats - [1] bit |
| Frequency domain resource assignment -[[ $\log_2 (N_{RB}^{DL,BWP}(N_{RB}^{DL,BWP} + 1) / 2)$ ]] bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| Physical uplink control channel (PUCCH) resource indicator - 3 bits |
| -     PDSCH-to-HARQ feedback timing indicator - [3] bits |

DCI format 1_1 may be used as non-fallback DCI for PDSCH scheduling, wherein a CRC is scrambled by a C-RNTI. DCI format 1_1 in which the CRC is scrambled by the C-RNTI may include, for example, information in Table 7 below.

TABLE 7

| |
| --- |
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP} / P \rceil$ bits |
| For resource allocation type 1, $\lceil \log_2 (N_{RB}^{DL,BWP} (N_{RB}^{DL,BWP} +1) / 2) \rceil$ bits |
| Time domain resource assignment −1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| PRB bundling size indicator - 0 or 1 bit |
| Rate matching indicator - 0, 1, or 2 bits |
| Zero power (ZP) CSI-reference signal (RS) trigger - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| Code block group (CBG) transmission information - 0, 2, 4, 6, or 8 bits |
| CBG flushing out information - 0 or 1 bit |
| -     DMRS sequence initialization - 1 bit |

[PDCCH: CORESET, REG, CCE, and Search Space]

Hereinafter, a downlink control channel in the 5G communication system will be described in more detail with reference to the drawings.

Figure 4:
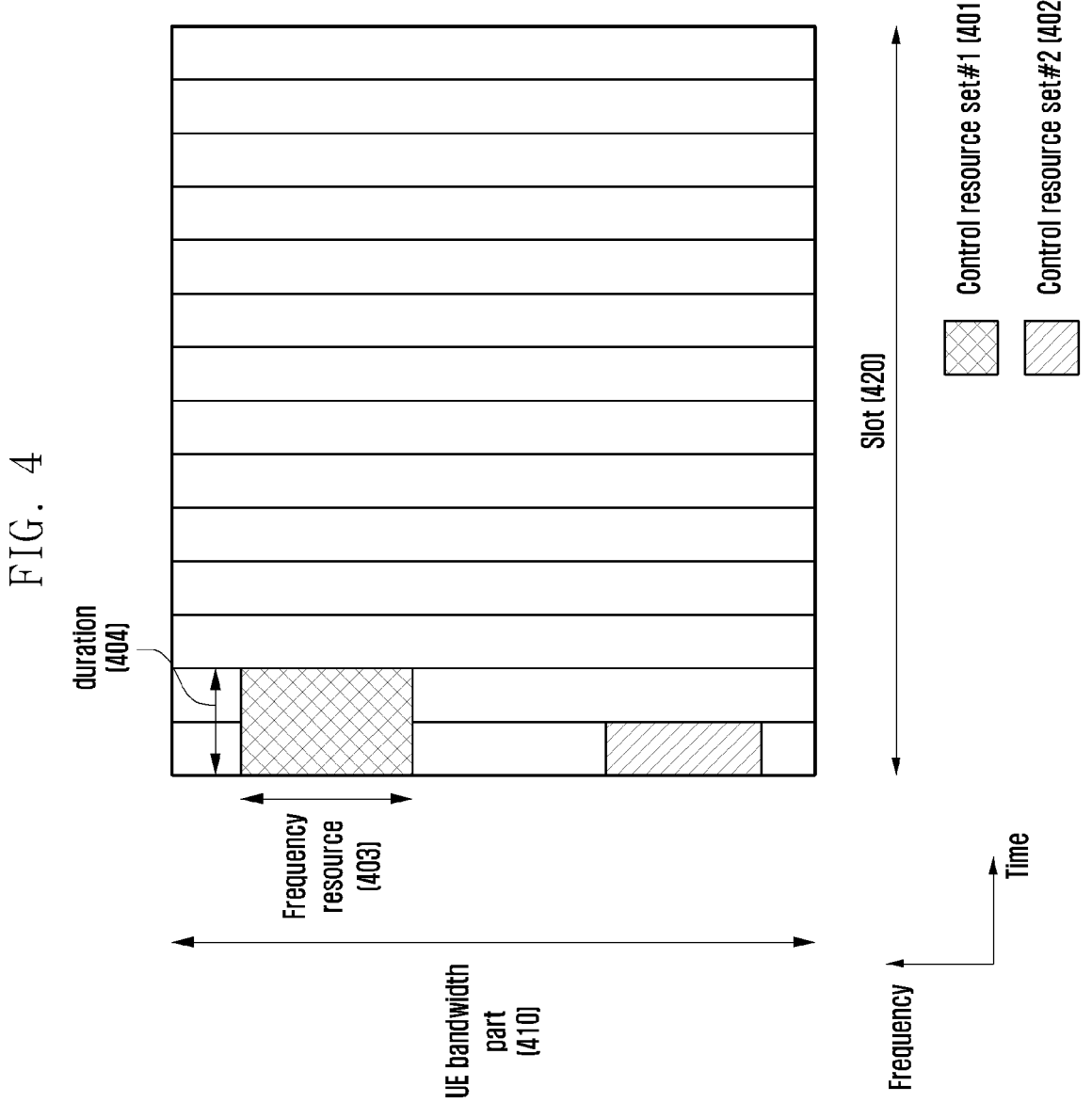
FIG. 4 is a diagram illustrating an example of a control resource set configuration of a downlink control channel in the wireless communication system according to an embodiment of the disclosure.

FIG. 4 is a diagram illustrating an example of a control resource set (control resource set (CORESET)) in which a downlink control channel is transmitted in the 5G wireless communication system. FIG. 4 illustrates an example in which a terminal bandwidth part 410 (UE bandwidth part) is configured on the frequency axis, and two control resource sets (control resource set #1 401 and control resource set #2 402) are configured within one slot 420 on the time axis. The control resource sets 401 and 402 may be configured in a specific frequency resource 403 within the entire terminal bandwidth part 410 on the frequency axis. One or multiple OFDM symbols may be configured on the time axis and may be defined as a control area duration (control resource set duration) 404. Referring to the example illustrated in FIG. 4, control resource set #1 401 is configured to have a control resource set duration of 2 symbols, and control resource set #2 402 is configured to have a control resource set duration of 1 symbol. The aforementioned control resource set in 5G may be configured for the terminal by the base station via higher-layer signaling (e.g., system information, a master information block (MIB), and radio resource control (RRC) signaling). Configuring a control resource set for the terminal may refer to providing information, such as an identifier (identity) of the control resource set, a frequency location of the control resource set, and a symbol length of the control resource set. For example, information in Table 8 below may be included.

TABLE 8

| |
| --- |
| ControlResourceSet ::=                   SEQUENCE { |
| Corresponds to L1 parameter 'CORESET-ID' |
| controlResourceSetId              ControlResourceSetId, |
| (control resource set identity) |
| frequencyDomainResources      BIT STRING (SIZE (45)), |
| (frequency axis resource allocation information) |
| duration                          INTEGER |
| (1..maxCoReSetDuration), |
| (time axis resource allocation information) |

TABLE 8-continued

```
cce-REG-MappingType
    CHOICE {
(CCE-to-REG mapping scheme)
interleaved
    SEQUENCE {
reg-BundleSize                      ENUMERATED
{n2, n3, n6},
(REG bundle size)
precoderGranularity                 ENUMERATED
{sameAsREG-bundle, allContiguousRBs},
interleaverSize                     ENUMERATED
{n2, n3, n6}
(interleaver size)
shiftIndex
    INTEGER(0..maxNrofPhysicalResourceBlocks-1)
        OPTIONAL
(interleaver shift)
},
nonInterleaved                      NULL
},
tci-StatesPDCCH
    SEQUENCE(SIZE (1..maxNrofTCI-StatesPDCCH)) OF TCI-StateId
        OPTIONAL,
(QCL configuration information)
tci-PresentInDCI                    ENUMERATED
{enabled}
        OPTIONAL,   -- Need S
}
```

In Table 8, tci-StatesPDCCH (simply, referred to as a transmission configuration indication (TCI) state) configuration information may include information on one or multiple synchronization signal (SS)/physical broadcast channel (PBCH) block indexes or channel state information reference signal (CSI-RS) indexes having the quasi-co-location (QCL) relationship with a DMRS transmitted in the corresponding control resource set.

Figure 5:
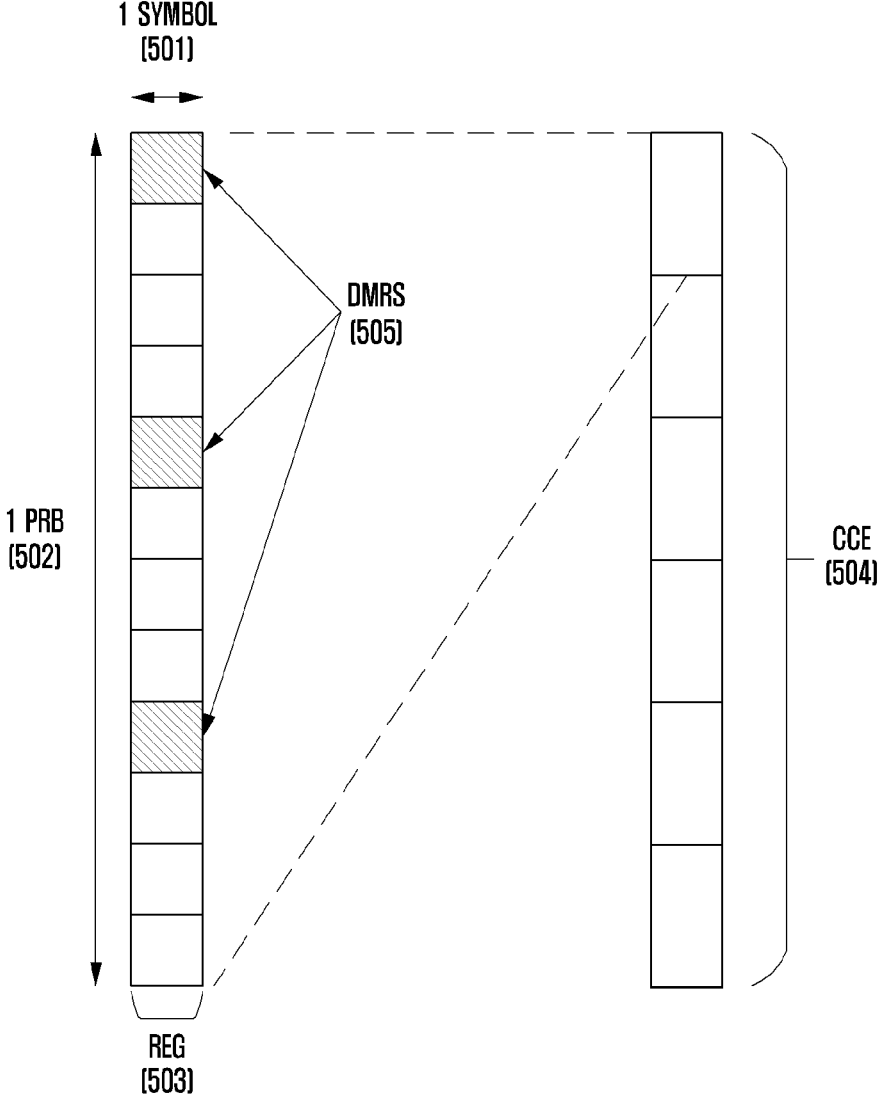
FIG. 5 is a diagram illustrating a structure of a downlink control channel in the wireless communication system according to an embodiment of the disclosure.

FIG. 5 is a diagram showing an example of a basic unit of time and frequency resources constituting a downlink control channel which may be used in 5G. According to FIG. 5, a basic unit of time and frequency resources constituting a control channel is referred to as a resource element group (REG) 503, and the REG 503 may be defined to have 1 OFDM symbol 501 on the time axis and 1 physical resource block (PRB) 502, that is, 12 subcarriers, on the frequency axis. A base station may configure a downlink control channel allocation unit by concatenation with the REG 503.

As illustrated in FIG. 5, when a basic unit for allocation of a downlink control channel in 5G is a control channel element (CCE) 504, 1 CCE 504 may include multiple REGs 503. When the REG 503 illustrated in FIG. 5 is described as an example, the REG 503 may include 12 REs, and if 1 CCE 504 includes 6 REGs 503, 1 CCE 504 may include 72 REs. When a downlink control resource set is configured, the corresponding resource set may include multiple CCEs 504, and a specific downlink control channel may be mapped to one or multiple CCEs 504 so as to be transmitted according to an aggregation level (AL) within the control resource set. The CCEs 504 within the control resource set are classified by numbers, and the numbers of the CCEs 504 may be assigned according to a logical mapping scheme.

The basic unit of the downlink control channel illustrated in FIG. 5, that is, the REG 503, may include both REs, to which DCI is mapped, and an area to which a DMRS 505, which is a reference signal for decoding the REs, is mapped. As shown in FIG. 5, 3 DMRSs 505 may be transmitted in 1 REG 503. The number of CCEs required to transmit a PDCCH may be 1, 2, 4, 8, or 16 depending on an aggregation level (AL), and different numbers of CCEs may be used to implement link adaptation of the downlink control channel. For example, if AL=L, a single downlink control channel may be transmitted via L CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined to be a set of search spaces at all configured aggregation levels.

The search space may be classified into a common search space and a terminal-specific (UE-specific) search space. A certain group of terminals or all terminals may examine a common search space of a PDCCH in order to receive cell-common control information, such as a paging message or dynamic scheduling for system information. For example, PDSCH scheduling assignment information for transmission of an SIB including cell operator information, etc. may be received by monitoring the common search space of the PDCCH. Since a certain group of terminals or all terminals need to receive the PDCCH, the common search space may be defined as a set of predetermined CCEs. Scheduling assignment information for a UE-specific PDSCH or PUSCH may be received by monitoring a UE-specific search space of the PDCCH. The UE-specific search space may be defined UE-specifically, based on an identity of the terminal and functions of various system parameters.

In 5G, a parameter for the search space of the PDCCH may be configured for the terminal by the base station via higher-layer signaling (e.g., SIB, MIB, and RRC signaling). For example, the base station may configure, for the terminal, the number of PDCCH candidates at each aggregation level L, a monitoring periodicity for a search space, a monitoring occasion in units of symbols in the slot for the search space, a search space type (common search space or UE-specific search space), a combination of an RNTI and a DCI format, which is to be monitored in the search space, a control resource set index for monitoring of the search space, etc. For example, information in Table 9 below may be included.

TABLE 9

```
SearchSpace ::=                                SEQUENCE {
Identity of the search space. SearchSpaceId = 0 identifies the SearchSpace configured via
PBCH (MIB) or ServingCellConfigCommon.
searchSpaceId                                  SearchSpaceId,
(search space identifier)
controlResourceSetId                           ControlResourceSetId,
(control resource set identifier)
```

TABLE 9-continued

| | |
|---|---|
| monitoringSlotPeriodicityAndOffset | CHOICE { |
| (monitoring slot level period) | |
| sl1 | |
| NULL, | |
| sl2 | |
| INTEGER (0..1), | |
| sl4 | |
| INTEGER (0..3), | |
| sl5 | |
| INTEGER (0..4), | |
| sl8 | |
| INTEGER (0..7), | |
| sl10 | |
| INTEGER (0..9), | |
| sl16 | |
| INTEGER (0..15), | |
| sl20 | |
| INTEGER (0..19) | |
| } | |
| OPTIONAL, | |
| duration (monitoring length) | INTEGER (2..2559) |
| monitoringSymbolsWithinSlot | BIT STRING |
| (SIZE (14)) | |
| OPTIONAL, | |
| (monitoring symbol within slot) | |
| nrofCandidates | SEQUENCE { |
| (number of PDCCH candidates at each aggregation level) | |
| aggregationLevel1 | ENUMERATED |
| {n0, n1, n2, n3, n4, n5, n6, n8}, | |
| aggregationLevel2 | ENUMERATED |
| {n0, n1, n2, n3, n4, n5, n6, n8}, | |
| aggregationLevel4 | ENUMERATED |
| {n0, n1, n2, n3, n4, n5, n6, n8}, | |
| aggregationLevel8 | ENUMERATED |
| {n0, n1, n2, n3, n4, n5, n6, n8}, | |
| aggregationLevel16 | ENUMERATED |
| {n0, n1, n2, n3, n4, n5, n6, n8} | |
| }, | |
| searchSpaceType | CHOICE { |
| (search space type) | |
| Configures this search space as common search space (CSS) and DCI formats to monitor. | |
| common | |
| SEQUENCE { | |
| (common search space) | |
| } | |
| ue-Specific | |
| SEQUENCE { | |
| (UE-specific search space) | |
| Indicates whether the UE monitors in this USS for DCI formats 0-0 and 1-0 or for formats | |
| 0-1 and 1-1. | |
| formats | |
| ENUMERATED {formats0-0-And-1-0, formats0-1-And-1-1}, | |
| ... | |
| } | |

According to configuration information, the base station may configure one or multiple search space sets for the terminal. According to some embodiments, the base station may configure search space set 1 and search space set 2 for the terminal, may configure DCI format A, which is scrambled by an X-RNTI in search space set 1, to be monitored in the common search space, and may configure DCI format B, which is scrambled by a Y-RNTI in search space set 2, to be monitored in the UE-specific search space.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow definitions and uses below.

Cell RNTI (C-RNTI): For UE-specific PDSCH scheduling

Temporary cell RNTI (TC-RNTI): For UE-specific PDSCH scheduling Configured scheduling RNTI (CS-RNTI): For semi-statically configured UE-specific PDSCH scheduling Random-access RNTI (RA-RNTI): For PDSCH scheduling during random-access Paging RNTI (P-RNTI): For scheduling PDSCH on which paging is transmitted System information RNTI (SI-RNTI): For scheduling PDSCH on which system information is transmitted Interruption RNTI (INT-RNTI): For indicating whether to puncture PDSCH Transmit power control for PUSCH RNTI (TPC-PUSCH-RNTI): For indicating power control command for PUSCH Transmit power control for PUCCH RNTI (TPC-PUCCH-RNTI): For indicating power control command for PUCCH Transmit power control for SRS RNTI (TPC-SRS-RNTI): For indicating power control command for SRS The aforementioned DCI formats may conform to the following definition as in the example of Table 10.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of aggregation level L in search space set s and control resource set p may be expressed as Equation 1 below.

$$L \cdot \left\{ \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \left\lfloor \frac{N_{CCE,p}}{L} \right\rfloor \right) \right\} + i \quad \text{[Equation 1]}$$

L: aggregation level $n_{CI}$: carrier index $N_{CCE,p}$: a total number of CCEs existing in control resource set p $n_{s,f}^{\mu}$:

slot index $M_{s,max}^{(L)}$:

the number of PDCCH candidates for aggregation level L $m_{s,n_{CI}} = 0, \ldots, M_{p,s,max}^{(L)} - 1$:

PDCCH candidate index of aggregation level L i=0, . . . , L−1

$$Y_{p,n_{s,f}^{\mu}} = \left( A_p \cdot Y_{p,n_{s,f}^{\mu}-1} \right) \mod D, \; Y_{p,-1} = n_{RNTI} \neq 0,$$

$$A_p = 39827 \text{ for } p\bmod 3 = 0, \; A_p = 39829 \text{ for } p\bmod 3 = 1,$$

$$A_p = 39839 \text{ for } p\bmod 3 = 2, \text{ and } D = 65537.$$

$n_{RNTI}$: terminal identifier

A $$Y_{p,n_{s,f}^{\mu}}$$

value may correspond to 0 for the common search space. For the UE-specific search space, the $$Y_{p,n_{s,f}^{\mu}}$$

value may correspond to a value that vanes depending on a time index and the identity (a C-RNTI or an ID configured for the terminal by the base station) of the terminal.

In 5G, multiple search space sets may be configured by different parameters (e.g., parameters in Table 9), and therefore a set of search spaces monitored by the terminal at each time point may vary. For example, if search space set #1 is configured with an X-slot period, search space set #2 is configured with a Y-slot period, and X and Y are different from each other, the terminal may monitor both search space set #1 and search space set #2 in a specific slot, and may monitor one of search space set #1 and search space set #2 in a specific slot.

[PDCCH: BD/CCE Limit]

When multiple search space sets are configured for the terminal, the following conditions may be considered for a method of determining a search space set required to be monitored by the terminal.

If the terminal is configured with a value of monitoringCapabilityConfig-r16, which is higher-layer signaling, via r15monitoringcapability, the terminal may define, for each slot, a maximum value for the number of PDCCH candidates that may be monitored and for the number of CCEs constituting the entire search space (here, the entire search space refers to all CCE sets corresponding to a union area of multiple search space sets), and if a value of monitoringCapabilityConfig-16 is configured via r16monitoringcapability, the terminal may define, for each span, a maximum value for the number of PDCCH candidates that may be monitored and for the number of CCEs constituting the entire search space (here, the entire search space may refer to all CCE sets corresponding to a union area of multiple search space sets).

[Condition 1: Limiting the Maximum Number of PDCCH Candidates]

As described above, according to a configuration value of higher-layer signaling, M which is the maximum number of PDCCH candidates that may be monitored by the terminal may, for example, conform to Table 11 below when defined based on slot, and may conform to Table 12 below when defined based on span, in a cell configured with a subcarrier spacing of $15 \cdot 2^{\mu}$ kHz.

TABLE 11

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 12

| | Maximum number $M^\mu$ of monitored PDCCH candidates per span for combination (X,Y) and per serving cell | | |
|---|---|---|---|
| μ | (2,2) | (4,3) | (7,3) |
| 0 | 14 | 28 | 44 |
| 1 | 12 | 24 | 36 |

[Condition 2: Limiting the Maximum Number of CCEs]

As described above, according to a configuration value of higher-layer signaling, C which is the maximum number of CCEs constituting the entire search space (here, the entire search space refers to all CCE sets corresponding to a union area of multiple search space sets) may, for example, conform to Table 13 below when defined based on slot, and may conform to Table 14 below when defined based on span, in a cell configured with a subcarrier spacing of $15 \cdot 2^\mu$ kHz.

TABLE 13

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 14

| | Maximum number $C^\mu$ of non-overlapped CCEs per span for combination (X,Y) and per serving cell | | |
|---|---|---|---|
| μ | (2,2) | (4,3) | (7,3) |
| 0 | 18 | 36 | 56 |
| 1 | 18 | 36 | 56 |

For the convenience of description, a situation in which both conditions 1 and 2 are satisfied at a specific time point is defined as "condition A". Therefore, not satisfying condition A may refer to not satisfying at least one of conditions 1 and 2.

[PDCCH: Overbooking]

According to configurations of the search space sets by the base station, a case in which condition A is not satisfied at a specific time point may occur. If condition A is not satisfied at a specific time point, the terminal may select and monitor only some of the search space sets configured to satisfy condition A at the corresponding time point, and the base station may transmit a PDCCH in the selected search space sets.

The method of selecting some search spaces from the entire configured search space set may conform to the following methods.

If condition A for a PDCCH is not satisfied at a specific time point (slot), the terminal (or base station) may select a search space set, in which a search space type is configured to be a common search space, preferentially over a search space set configured to be a UE-specific search space, from among search space sets existing at the corresponding time point.

If all the search space sets configured to be the common search space are selected (that is, if condition A is satisfied even after all the search spaces configured to be the common search space are selected), the terminal (or base station) may select the search space sets configured to be the UE-specific search space. In this case, if there are multiple search space sets configured to be the UE-specific search spaces, a search space set having a low search space set index may have a higher priority. In consideration of the priority, the UE-specific search space sets may be selected within a range in which condition A is satisfied.

[Relating to Rate Matching/Puncturing]

In the following, rate matching and puncturing are described in detail.

When time and frequency resource A, in which certain symbol sequence A is to be transmitted, overlaps certain time and frequency resource B, rate matching or puncturing may be considered as transmission/reception of channel A in consideration of area resource C in which resource A and resource B overlap. Detailed operations may conform to the following contents.

Rate Matching Operation

The base station may transmit, to the terminal, channel A by mapping the same only to resource areas remaining after excluding resource C corresponding to an area overlapping with resource B, from the entire resource A in which symbol sequence A is to be transmitted. For example, when symbol sequence A includes {symbol #1, symbol #2, symbol #3, symbol #4}, resource A is {resource #1, resource #2, resource #3, resource #4}, and resource B is {resource #3, resource #5}, the base station may sequentially map symbol sequence A to resources {resource #1, resource #2, resource #4} remaining after excluding, from resource A, {resource #3} corresponding to resource C, so as to transmit the same. As a result, the base station may map a symbol sequence of {symbol #1, symbol #2, symbol #3} to {resource #1, resource #2, resource #4}, respectively, so as to transmit the same.

The terminal may determine resource A and resource B from scheduling information for symbol sequence A from the base station, and may determine, based on resources A and B, resource C that is an area in which resource A and resource B overlap. The terminal may receive symbol sequence A, based on an assumption that symbol sequence A has been mapped to and transmitted in the areas remaining after excluding resource C from the entire resource A. For example, when symbol sequence A includes {symbol #1, symbol #2, symbol #3, symbol #4}, resource A is {resource #1, resource #2, resource #3, resource #4}, and resource B is {resource #3, resource #5}, the terminal may receive symbol sequence A, based on an assumption that symbol sequence A has been sequentially mapped to resources {resource #1, resource #2, resource #4} remaining after excluding, from resource A, {resource #3} which corresponds to resource C. As a result, the terminal may perform a series of reception operations later based on an assumption that a symbol sequence of {symbol #1, symbol #2, symbol #3} is mapped to and transmitted in {resource #1, resource #2, resource #4}, respectively.

Puncturing Operation

When there is resource C, which corresponds to an area overlapping with resource B, in the entire resource A in which symbol sequence A is to be transmitted to the terminal, the base station may map symbol sequence A to the entire resource A, but may perform transmission only in resource areas remaining after excluding resource C from resource A, without performing transmission in a resource area corresponding to resource C. For example, when symbol sequence A includes {symbol #1, symbol #2, symbol #3, symbol #4}, resource A is {resource #1, resource #2, resource #3, resource #4}, and resource B is {resource #3, resource #5}, the base station may map symbol sequence A {symbol #1, symbol #2, symbol #3, symbol #4} to resource A {resource #1, resource #2, resource #3, resource #4}, respectively, and may transmit only a symbol sequence of {symbol #1, symbol #2, symbol #4} corresponding to resources {resource #1, resource #2, resource #4} which remain after excluding, from resource A, {resource #3} corresponding to resource C, without transmitting {symbol #3} mapped to {resource #3} corresponding to resource C. As a result, the base station may map the symbol sequence {symbol #1, symbol #2, symbol #4} to {resource #1, resource #2, resource #4}, respectively, so as to transmit the same.

The terminal may determine resource A and resource B from scheduling information for symbol sequence A from the base station, and may determine, based on resources A and B, resource C that is an area in which resource A and resource B overlap. The terminal may receive symbol sequence A, based on an assumption that symbol sequence A has been mapped to the entire resource A but is transmitted only in areas remaining after excluding resource C from resource area A. For example, when symbol sequence A includes {symbol #1, symbol #2, symbol #3, symbol #4}, resource A is {resource #1, resource #2, resource #3, resource #4}, and resource B is {resource #3, resource #5}, the terminal may assume that symbol sequence A {symbol #1, symbol #2, symbol #3, symbol #4} is mapped to resource A {resource #1, resource #2, resource #3, resource #4}, respectively, but {symbol #3} mapped to {resource #3} corresponding to resource C is not transmitted, and may perform reception based on an assumption that a symbol sequence of {symbol #1, symbol #2, symbol #4}, which corresponds to resources {resource #1, resource #2, resource #4} remaining after excluding, from resource A, {resource #3} corresponding to resource C, is mapped and transmitted. As a result, the terminal may perform a series of reception operations later based on an assumption that a symbol sequence of {symbol #1, symbol #2, symbol #4} is mapped to and transmitted in {resource #1, resource #2, resource #4}, respectively.

Hereinafter, a method of configuring a rate matching resource for the purpose of rate matching in the 5G communication system will be described. Rate matching refers to a signal magnitude being adjusted by considering the amount of resources in which a signal is transmittable. For example, rate matching of a data channel may refer to a data size being adjusted according to the amount of resources, without transmission of the data channel by mapping the same to a specific time and frequency resource area.

Figure 6:
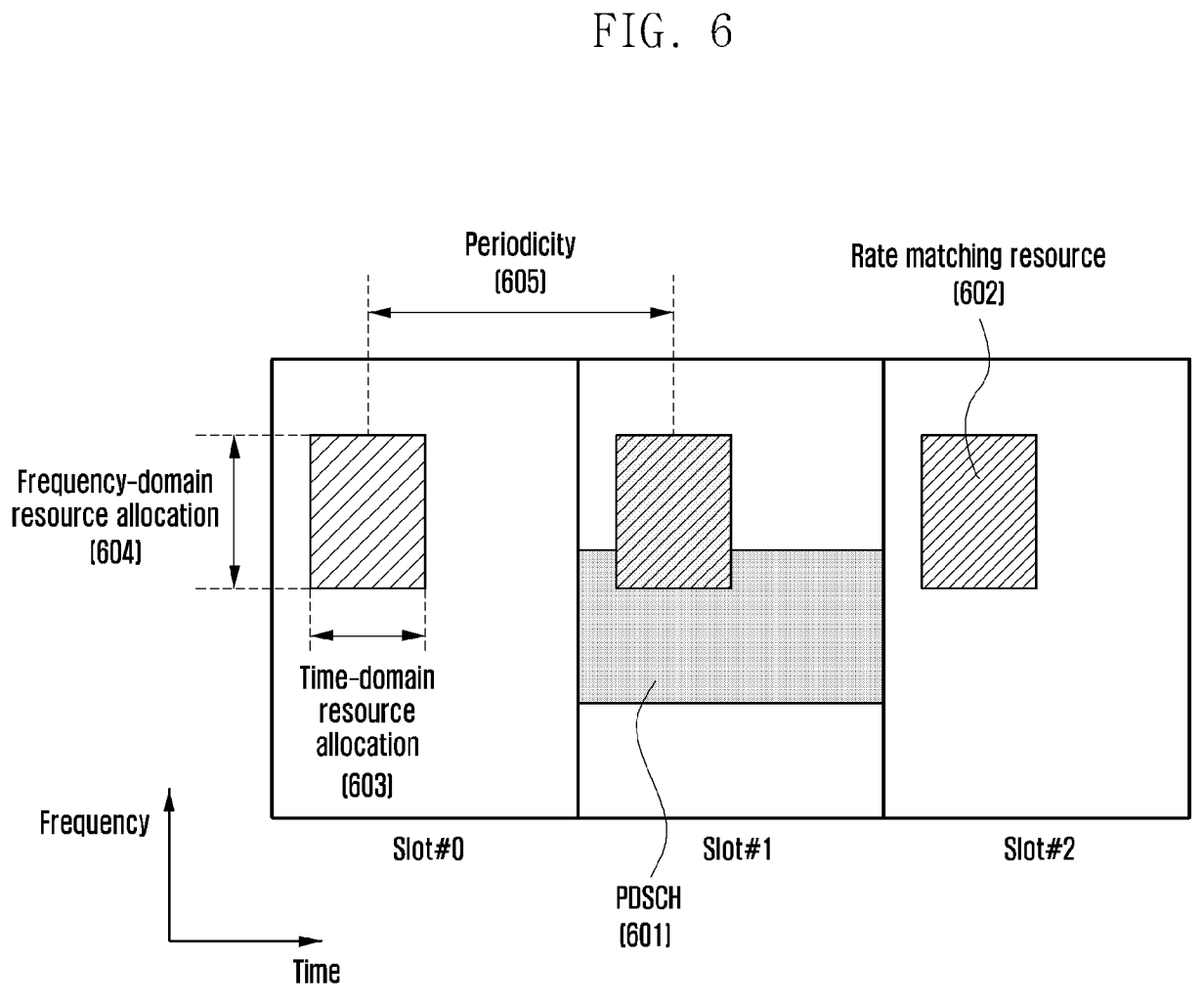

FIG. 6 is a diagram for describing a method by which a base station and a terminal transmit or receive data in consideration of a downlink data channel and a rate matching resource.

FIG. 6 illustrates a downlink data channel (PDSCH) 601 and a rate matching resource 602. A base station may configure one or multiple rate matching resources 602 for a terminal via higher-layer signaling (e.g., RRC signaling). Configuration information of the rate matching resource 602 may include time axis resource allocation information 603, frequency axis resource allocation information 604, and periodicity information 605. Hereinafter, a bitmap corresponding to the frequency axis resource allocation information 604 is referred to as a "first bitmap", a bitmap corresponding to the time axis resource allocation information 603 is referred to as a "second bitmap", and a bitmap corresponding to the periodicity information 605 is referred to as a "third bitmap". When all or some of the time and frequency resources of the scheduled data channel 601 overlap the configured rate matching resource 602, the base station may match the data channel 601 to the rate matching resource 602 part so as to transmit the same, and the terminal may perform reception and decoding after an assumption that the data channel 601 is rate-matched in the rate matching resource 602 part.

The base station may dynamically notify, via DCI, the terminal of whether to rate-match the data channel in the configured rate matching resource part via an additional configuration (corresponding to a "rate matching indicator" in the aforementioned DCI format). Specifically, the base station may select some of the configured rate matching resources, group the same into a rate matching resource group, and indicate to the terminal of whether to perform rate matching of a data channel for each rate matching resource group, via DCI by using a bitmap scheme. For example, when four rate matching resources of RMR #1, RMR #2, RMR #3, and RMR #4 are configured, the base station may configure rate matching groups of RMG #1={RMR #1, RMR #2} and RMG #2={RMR #3, RMR #4}, and may indicate, to the terminal via a bitmap, whether to perform rate matching in each of RMG #1 and RMG #2, by using 2 bits within a DCI field. For example, the base station may indicate "1" when rate matching is needed, and may indicate "0" when rate matching should not be performed.

In 5G, granularity at an "RB symbol level" and granularity at an "RE level" are supported as the aforementioned method of configuring a rate matching resource for the terminal. More specifically, the following configuration method may be conformed to.

RB Symbol Level

The terminal may be configured with up to four RateMatchPattern for each bandwidth part via higher-layer signaling, and one RateMatchPattern may include the following content.

As reserved resources within a bandwidth part, resources in which time and frequency resource areas of the corresponding reserved resources are configured may be included in a combination of an RB-level bitmap and a symbol-level bitmap on the frequency axis. The reserved resources may span one or two slots. A time domain pattern (periodicityAndPattern), in which time and frequency domains including respective RB-level and symbol-level bitmap pairs are repeated, may be additionally configured.

Time and frequency domain resource areas configured as a control resource set within a bandwidth part and a resource area corresponding to a time domain pattern configured by a search space configuration in which the corresponding resource areas are repeated may be included.

RE level

The terminal may be configured with the following contents via higher-layer signaling.

As configuration information (lte-CRS-ToMatchAround) for REs corresponding to an LTE cell-specific reference signal or common reference signal (CRS) pattern, the number (nrofCRS-Ports) of LTE CSR ports, values (v-shift) of LTE-CRS-vshift(s), information (carrierFreqDL) on a center subcarrier position of an LTE carrier from a frequency point that is a reference (e.g., reference point A), information on a bandwidth size (carrierBandwidthDL) of an LTE carrier, subframe configuration information (mbsfn-SubframConfigList) corresponding to a multicast-broadcast single-frequency network (MBSFN), and the like may be included. The terminal may determine a CRS position within an NR slot corresponding to the LTE subframe, based on the aforementioned information.

Configuration information for a resource set corresponding to one or multiple zero power (ZP) CSI-RSs within a bandwidth part may be included.

[Relating to LTE CRS Rate Match]

Subsequently, rate matching for LTE CRS described above will be described in detail. For the coexistence of long-term evolution (LTE) and new RAT (NR) (LTE-NR coexistence), NR provides a function of configuring a cell-specific reference signal (CRS) pattern of LTE for an NR terminal. More specifically, the CRS pattern may be provided by RRC signaling including at least one parameter in ServingCellConfigCommon information element (IE) or ServingCellConfig IE. Examples of the parameter may include lte-CRS-ToMatchAround, lte-CRS-PatternList1-r16, lte-CRS-PatternList2-r16, crs-RateMatch-PerCORE-SETPoolIndex-r16, and the like.

Rel-15 NR provides a function in which one CRS pattern may be configured per serving cell via parameter lte-CRS-ToMatchAround. In Rel-16 NR, the function has been expanded to enable configuration of multiple CRS patterns per serving cell. More specifically, a single-transmission and reception point (TRP) configuration terminal may be configured with one CRS pattern per one LTE carrier, and a multi-TRP configuration terminal may be configured with two CRS patterns per one LTE carrier. For example, up to three CRS patterns per serving cell may be configured for the single-TRP configuration terminal via parameter lte-CRS-PatternList1-r16. For another example, a CRS may be configured for each TRP in the multi-TRP configuration terminal. That is, a CRS pattern for TRP1 may be configured via parameter lte-CRS-PatternList1-r16, and a CRS pattern for TRP2 may be configured via parameter lte-CRS-PatternList2-r16. When two TRPs are configured as above, whether to apply both the CRS patterns of TRP1 and TRP2 to a specific physical downlink shared channel (PDSCH) or whether to apply only a CRS pattern for one TRP is determined via parameter crs-RateMatch-PerCORESETPoolIndex-r16, wherein only the CRS pattern of one TRP is applied if parameter crs-RateMatch-PerCORESETPoolIndex-r16 is configured to be enabled, and both the CRS patterns of the two TRPs are applied on other cases.

Table 15 shows ServingCellConfig IE including the CRS pattern, and Table 16 shows RateMatchPatternLTE-CRS IE including at least one parameter for the CRS pattern.

TABLE 15

| | |
|---|---|
| ServingCellConfig ::= | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE (SIZE (1..maxNrofBWPs)) OF |
| BWP-Id | OPTIONAL, -- Need N |
| downlinkBWP-ToAddModList | SEQUENCE (SIZE (1..maxNrofBWPs)) OF |
| BWP-Downlink | OPTIONAL, -- Need N |
| firstActiveDownlinkBWP-Id | BWP-Id |
| OPTIONAL, -- Cond SyncAndCellAdd | |
| bwp-InactivityTimer | ENUMERATED {ms2, ms3, ms4, ms5, ms6, |
| ms8, ms10, ms20, ms30, | |
| ms40,ms50, ms60, ms80,ms100, ms200,ms300, ms500, | |
| ms750, ms1280, ms 1920, ms2560, spare10, spare9, spare8, | |
| spare7, spare6, spare5, spare4, spare3, spare2, spare1 } | OPTIONAL, -- Need R |
| defaultDownlinkBWP-Id | BWP-Id |
| OPTIONAL, -- Need S | |
| uplinkConfig | UplinkConfig |
| OPTIONAL, -- Need M | |
| supplementaryUplink | UplinkConfig |
| OPTIONAL, -- Need M | |
| pdcch-ServingCellConfig | SetupRelease { PDCCH-ServingCellConfig } |
| OPTIONAL, -- Need M | |
| pdsch-ServingCellConfig | SetupRelease { PDSCH-ServingCellConfig } |
| OPTIONAL, -- Need M | |
| csi-MeasConfig | SetupRelease { CSI-MeasConfig } |
| OPTIONAL, -- Need M | |
| sCellDeactivation Timer | ENUMERATED {ms20, ms40, ms80, ms160, |
| ms200, ms240, | |
| ms320, ms400, ms480, ms520, ms640, ms720, | |
| ms840, ms1280, spare2,spare1} | OPTIONAL, -- Cond |
| ServingCellWithoutPUCCH | |
| crossCarrierSchedulingConfig | CrossCarrierSchedulingConfig |
| OPTIONAL, -- Need M | |
| tag-Id | TAG-Id, |
| dummy | ENUMERATED {enabled} |
| OPTIONAL, -- Need R | |
| pathlossReferenceLinking | ENUMERATED {spCell, sCell} |
| OPTIONAL, -- Cond SCellOnly | |
| servingCellMO | MeasObjectId |
| OPTIONAL, -- Cond MeasObject | |
| ..., | |

TABLE 15-continued

```
[[
lte-CRS-ToMatchAround                               SetupRelease { RateMatchPatternLTE-CRS }
OPTIONAL,   -- Need M
rateMatchPatternToAddModList                                            SEQUENCE (SIZE
(1..maxNrofRateMatchPatterns)) OF RateMatchPattern          OPTIONAL,   -- Need N
rateMatchPatternToReleaseList                                           SEQUENCE (SIZE
(1..maxNrofRateMatchPatterns)) OF RateMatchPatternId          OPTIONAL,   -- Need N
downlinkChannelBW-PerSCS-List                    SEQUENCE (SIZE (1..maxSCSs)) OF SCS-
SpecificCarrier                                  OPTIONAL   -- Need S
]],
[[
supplementaryUplinkRelease                                       ENUMERATED {true}
OPTIONAL,   -- Need N
tdd-UL-DL-ConfigurationDedicated-IAB-MT-r16                    TDD-UL-DL-ConfigDedicated-
IAB-MT-r16                                       OPTIONAL,   -- Cond TDD_IAB
dormantBWP-Config-r16                            SetupRelease { DormantBWP-Config-r16 }
OPTIONAL,   -- Need M
ca-SlotOffset-r16                                CHOICE {
refSCS15kHz                                         INTEGER (-2..2),
refSCS30KHz                                         INTEGER (-5..5),
refSCS60KHz                                         INTEGER (-10..10),
refSCS120KHz                                        INTEGER (-20..20)
}
OPTIONAL,   -- Cond AsyncCA
channelAccessConfig-r16                          SetupRelease { ChannelAccessConfig-r16 }
OPTIONAL,   -- Need M
intraCellGuardBandsDL-List-r16                        SEQUENCE (SIZE (1..maxSCSs)) OF
IntraCellGuardBandsPerSCS-r16                    OPTIONAL,   -- Need S
intraCellGuardBandsUL-List-r16                        SEQUENCE (SIZE (1..maxSCSs)) OF
IntraCellGuardBandsPerSCS-r16                    OPTIONAL,   -- Need S
csi-RS-ValidationWith-DCI-r16                                    ENUMERATED {enabled}
OPTIONAL,   -- Need R
lte-CRS-PatternList1-r16                         SetupRelease { LTE-CRS-PatternList-r16 }
OPTIONAL,   -- Need M
lte-CRS-PatternList2-r16                         SetupRelease { LTE-CRS-PatternList-r16 }
OPTIONAL,   -- Need M
crs-RateMatch-PerCORESETPoolIndex-r16                           ENUMERATED {enabled}
OPTIONAL,   -- Need R
enableTwoDefaultTCI-States-r16                                  ENUMERATED {enabled}
OPTIONAL,   -- Need R
enableDefaultTCI-StatePerCoresetPoolIndex-r16                   ENUMERATED {enabled}
OPTIONAL,   -- Need R
enableBeamSwitchTiming-r16                                       ENUMERATED {true}
OPTIONAL,   -- Need R
cbg-TxDiffTBsProcessingType1-r16                                ENUMERATED {enabled}
OPTIONAL,   -- Need R
cbg-TxDiffTBsProcessingType2-r16                                ENUMERATED {enabled}
OPTIONAL   -- Need R
]]
}
```

TABLE 16

| RateMatchPatternLTE-CRS |
| --- |
| The IE RateMatchPatternLTE-CRS is used to configure a pattern to rate match around LTE CRS. See TS 38.214 [19], clause 5.1.4.2. |

RateMatchPatternLTE-CRS information element

```
ASN1START
TAG-RATEMATCHPATTERNLTE-CRS-START
RateMatchPatternLTE-CRS ::=      SEQUENCE {
carrierFreqDL                    INTEGER (0..16383),
carrierBandwidthDL               ENUMERATED {n6, n15, n25, n50, n75, n100,
spare2, spare1},
mbsfn-SubframeConfigList         EUTRA-MBSFN-SubframeConfigList
OPTIONAL,   -- Need M
nrofCRS-Ports                       ENUMERATED {n1, n2, n4},
v-Shift                             ENUMERATED {n0, n1, n2, n3, n4, n5}
}
LTE-CRS-PatternList-r16 ::=      SEQUENCE (SIZE (1..maxLTE-CRS-Patterns-
r16)) OF RateMatchPatternLTE-CRS
TAG-RATEMATCHPATTERNLTE-CRS-STOP
ASN1STOP
```

TABLE 16-continued

RateMatchPatternLTE-CRS field descriptions carrierBandwidthDL
BW of the LTE carrier in number of PRBs (see TS 38.214 [19], clause 5.1.4.2).
carrier FreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause
5.1.4.2).
v-Shift
Shifting value v-shift in LTE to rate match around LTE CRS (see TS 38.214 [19], clause
5.1.4.2).

[PDSCH: Relating to Frequency Resource Allocation]

Figure 7:
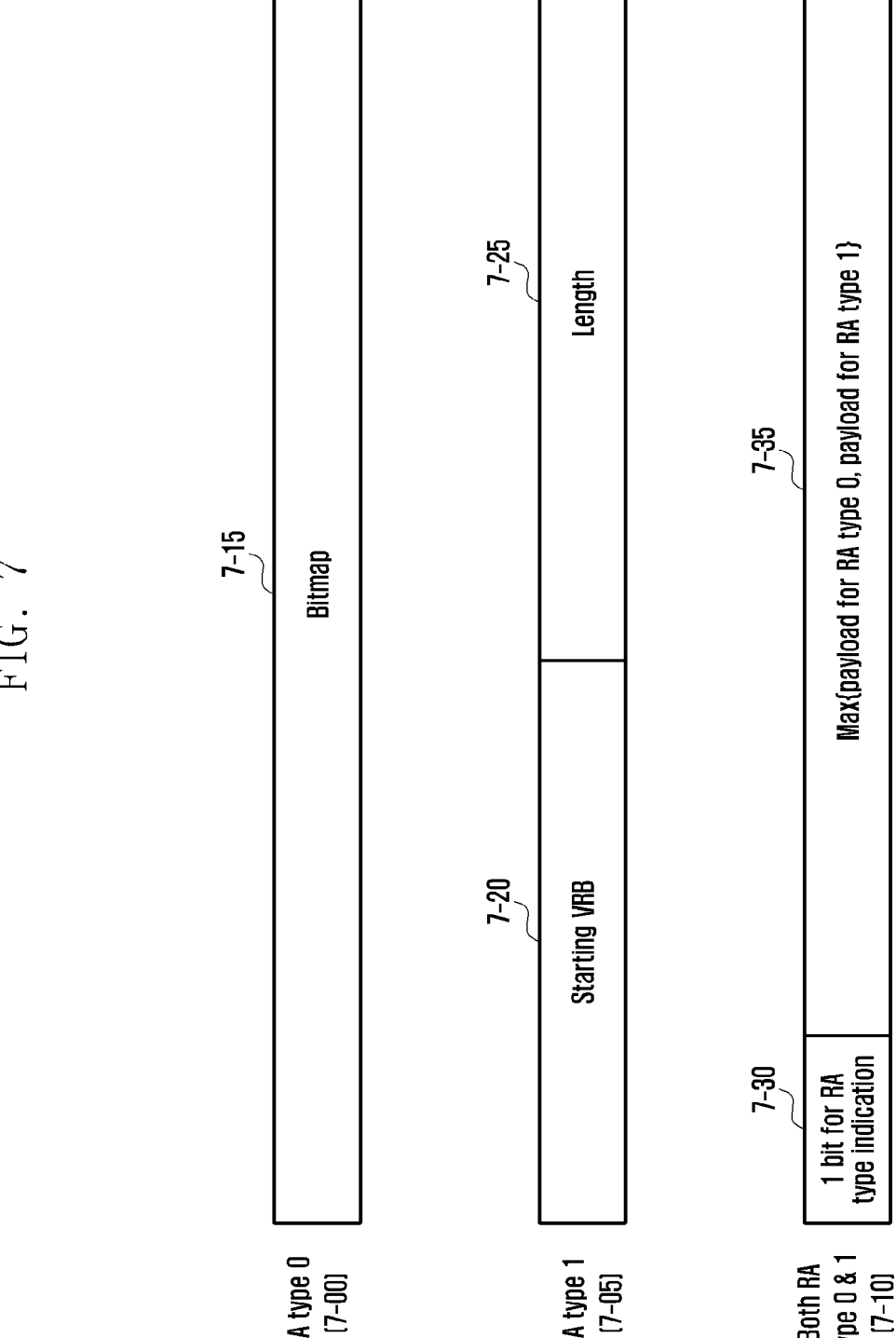
FIG. 7 is a diagram illustrating an example of frequency axis resource allocation of a PDSCH in the wireless communication system according to an embodiment of the disclosure.

FIG. 7 is a diagram illustrating an example of frequency axis resource allocation of a physical downlink shared channel (PDSCH) in the wireless communication system according to an embodiment of the disclosure.

FIG. 7 is a diagram illustrating three frequency axis resource allocation methods of type 0 7-00, type 1 7-05, and a dynamic switch 7-10 which are configurable via a higher layer in the NR wireless communication system.

Referring to FIG. 7, if a terminal is configured 7-00, via higher-layer signaling, to use only resource type 0, some downlink control information (DCI) for allocation of a PDSCH to the terminal has a bitmap including NRBG bits. Conditions for this will be described later. In this case, NRBG refers to the number of resource block groups (RBGs) determined as shown in [Table 17] below according to a BWP size assigned by a BWP indicator and higher-layer parameter rbg-Size, and data is transmitted on the RBG indicated to be 1 by a bit map.

TABLE 17

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured 7-05, via higher-layer signaling, to use only resource type 1, a part of DCI for allocation of a PDSCH to the terminal includes frequency axis resource allocation information including $$\lceil \log_2(N_{RB}^{DL,BWP}(N_{RB}^{DL,BWP} + 1)/2) \rceil$$

bits. Conditions for this will be described later. Based on this, the base station may configure a starting VRB 7-20 and a length 7-25 of frequency axis resources continuously allocated therefrom.

If the terminal is configured 7-10, via higher-layer signaling, to use both resource type 0 and resource type 1, some DCI for assigning of a PDSCH to the terminal includes frequency axis resource allocation information including bits of a greater value 7-35 among payloads 7-20 and 7-25 for configuring resource type 1 and a payload 7-15 for configuring resource type 0. Conditions for this will be described later. In this case, one bit may be added to a most significant bit (MSB) of the frequency axis resource allocation information in the DCI, and if the corresponding bit has a value of "0, use of resource type 0 may be indicated, and if the bit has a value of "1", use of resource type 1 may be indicated.

[PDSCH/PUSCH: Relating to Time Resource Allocation]

Hereinafter, a method of time domain resource allocation for a data channel in the next-generation mobile communication system (5G or NR system) is described.

The base station may configure, for the terminal via higher-layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for a PDSCH, and a table including up to 16 entries (maxNrofUL-Allocations=16) may be configured for a PUSCH. In an embodiment, the time domain resource allocation information may include a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and a length of a start symbol in which the PDSCH or PUSCH is scheduled within a slot, a mapping type of the PDSCH or PUSCH, or the like. For example, information as shown in [Table 18] or [Table 19] below may be transmitted from the base station to the terminal.

TABLE 18

| PDSCH-TimeDomainResourceAllocationList information element |
| --- |
| PDSCH-TimeDomainResourceAllocationList ::= SEQUENCE (SIZE(1..maxNrofDL-<br>Allocations)) OF PDSCH-TimeDomainResourceAllocation<br>PDSCH-TimeDomainResourceAllocation ::= SEQUENCE {<br>k0 INTEGER (0..32)<br>OPTIONAL,  -- Need S<br>mapping type ENUMERATED {typeA, typeB},<br>startSymbolAndLength INTEGER (0..127)<br>} |

TABLE 19

| PUSCH-TimeDomainResourceAllocationList information element |
| --- |
| PUSCH-TimeDomainResourceAllocationList ::= SEQUENCE (SIZE(1..maxNrofUL-<br>Allocations)) OF PUSCH-TimeDomainResourceAllocation<br>PUSCH-TimeDomainResourceAllocation ::= SEQUENCE {<br>k2 INTEGER (0..32)<br>OPTIONAL,  -- Need S<br>mapping type ENUMERATED {typeA, typeB},<br>startSymbolAndLength INTEGER (0..127)<br>} |

The base station may notify one of the entries in the tables relating to the time domain resource allocation information described above to the terminal via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Figure 8:
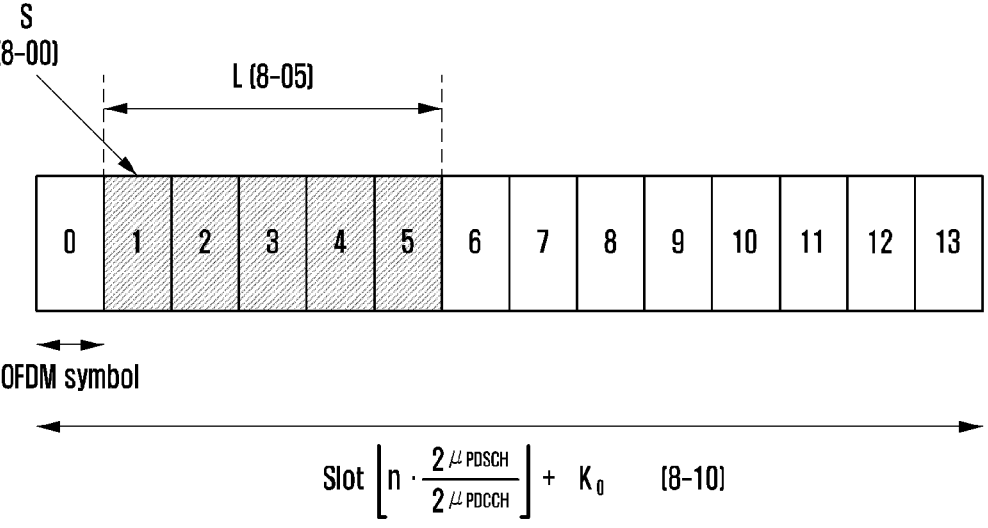
FIG. 8 is a diagram illustrating an example of time axis resource allocation of a PDSCH in the wireless communication system according to an embodiment of the disclosure.

FIG. 8 is a diagram illustrating an example of time domain resource allocation of a PDSCH in the wireless communication system according to an embodiment of the disclosure.

Referring to FIG. 8, a base station may indicate a time axis position of a PDSCH resource according to a start position 8-00 and a length 8-05 of an OFDM symbol in one slot dynamically indicated via DCI, a scheduling offset K0 value, and subcarrier spacings (SCSs) (pPDSCH, pPDCCH) of a data channel and a control channel configured using a higher layer.

Figure 9:
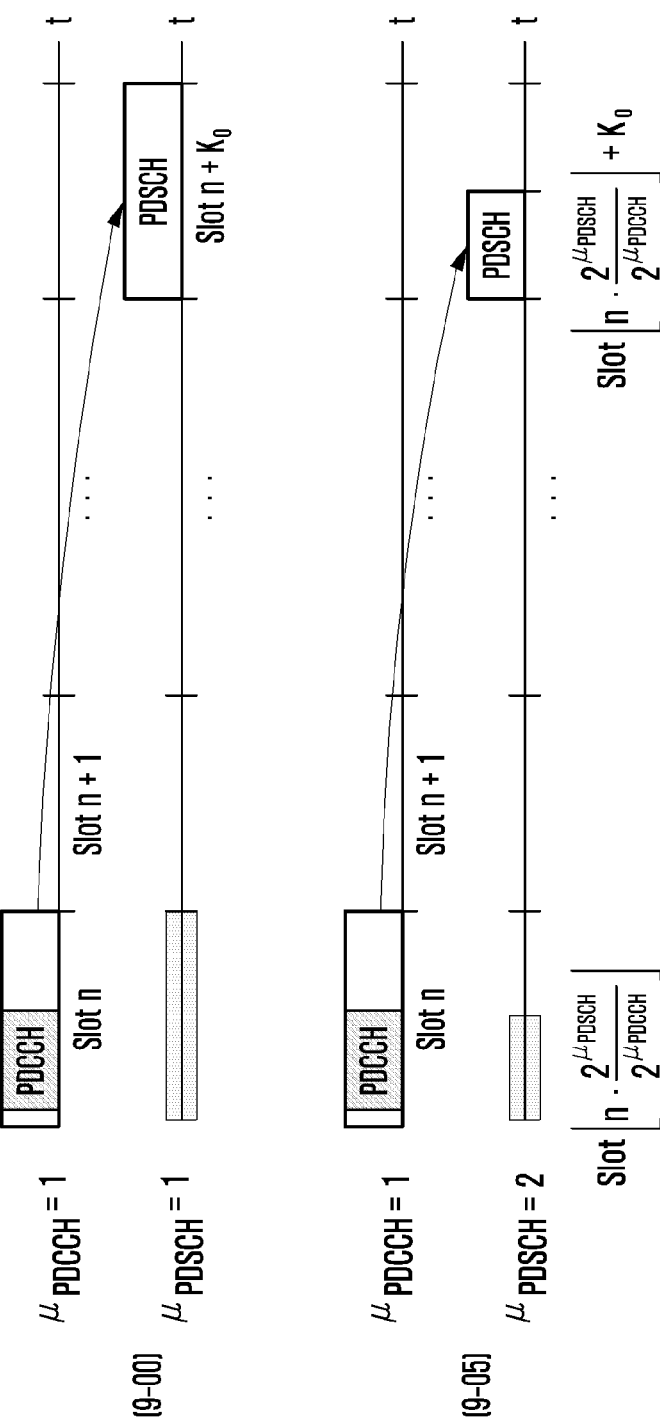
FIG. 9 is a diagram illustrating an example of time axis resource allocation according to subcarrier spacings of a data channel and a control channel in the wireless communication system according to an embodiment of the disclosure.

FIG. 9 is a diagram illustrating an example of time axis resource allocation according to subcarrier spacings of a data channel and a control channel in the wireless communication system according to an embodiment of the disclosure.

Referring to FIG. 9, if a subcarrier spacing of a data channel is the same as that of a control channel 9-00 (pPDSCH=PDCCH), slot numbers for data and control are the same, and therefore a base station and a terminal may generate a scheduling offset according to predetermined slot offset K0. On the other hand, if the subcarrier spacings (SCSs) of the data channel and the control channel are different (9-05, pPDSCH≠pPDCCH), the slot numbers for data and control are different, and therefore the base station and the terminal may generate a scheduling offset according to predetermined slot offset K0, based on the subcarrier spacing of the PDCCH.

[PUSCH: Relating to Transmission Scheme]

Next, a scheduling scheme of PUSCH transmission will be described. PUSCH transmission may be dynamically scheduled by a UL grant in DCI or may be operated by configured grant Type 1 or Type 2. Dynamic scheduling indication for PUSCH transmission is possible by DCI format 0_0 or 0_1.

For configured grant Type 1 PUSCH transmission, the UL grant in DCI may not be received, and configuration may be performed semi-statically via reception of configuredGrant-Config including rrc-ConfiguredUplinkGrant of [Table 20] via higher signaling. Configured grant Type 2 PUSCH transmission may be semi-persistently scheduled by the UL grant in DCI after reception of configuredGrantConfig, which does not include rrc-ConfiguredUplinkGrant of [Table 20], via higher signaling. When PUSCH transmission is operated by the configured grant, parameters applied to PUSCH transmission are applied via configuredGrantConfig that is higher signaling in [Table 20], except for dataScram-blingIdentityPUSCH, txConfig, codebookSubset, maxRank, and scaling of UCI-OnPUSCH provided via pusch-Config that is higher signaling in [Table 21]. If the terminal is provided with transformPrecoder in configuredGrantConfig which is higher signaling in [Table 20], the terminal applies tp-pi2BPSK in pusch-Config of [Table 21] to PUSCH transmission operated by the configured grant.

TABLE 20

| ConfiguredGrantConfig ::= | SEQUENCE { |
| --- | --- |
| frequencyHopping | ENUMERATED {intraSlot, interSlot} |
| OPTIONAL,  -- Need S, | |
| cg-DMRS-Configuration | DMRS-UplinkConfig, |
| mcs-Table | ENUMERATED {qam256, |
| qam64LowSE} | OPTIONAL, - |
| - Need S | |

TABLE 20-continued

```
mcs-TableTransformPrecoder                         ENUMERATED {qam256,
qam64LowSE}                                             OPTIONAL, -
- Need S
uci-OnPUSCH                            SetupRelease { CG-UCI-OnPUSCH }
OPTIONAL,   -- Need M
resourceAllocation                                        ENUMERATED
{ resourceAllocationType0, resourceAllocationType1, dynamicSwitch },
rbg-Size                                           ENUMERATED {config2}
OPTIONAL,   -- Need S
powerControlLoopToUse                      ENUMERATED {n0, n1},
p0-PUSCH-Alpha                             P0-PUSCH-AlphaSetId,
transformPrecoder                          ENUMERATED {enabled, disabled}
OPTIONAL,   -- Need S
nrofHARQ-Processes                    INTEGER(1..16),
repK                                  ENUMERATED {n1, n2, n4, n8},
repK-RV                               ENUMERATED {s1-0231, s2-0303,
s3-0000}                                       OPTIONAL,   -- Need R
periodicity                           ENUMERATED {
sym2, sym7, sym1x14, sym2x14, sym4x14, sym5x14, sym8x14, sym10x14,
sym16x14, sym20x14,
sym32x14, sym40x14, sym64x14, sym80x14, sym128x14, sym160x14, sym256x14,
sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12,
sym20x12, sym32x12,
sym40x12, sym64x12, sym80x12, sym128x12, sym160x12, sym256x12,
sym320x12, sym512x12, sym640x12,
sym1280x12, sym2560x12
},
configuredGrantTimer                               INTEGER (1..64)
OPTIONAL,   -- Need R
rrc-ConfiguredUplinkGrant              SEQUENCE {
timeDomainOffset                           INTEGER (0..5119),
timeDomainAllocation                       INTEGER (0..15),
frequencyDomainAllocation              BIT STRING (SIZE(18)),
antennaPort                                INTEGER (0..31),
dmrs-SeqInitialization                             INTEGER (0..1)
OPTIONAL,   -- Need R
precodingAndNumberOfLayers                 INTEGER (0..63),
srs-ResourceIndicator                              INTEGER (0..15)
OPTIONAL,   -- Need R
mcsAndTBS                                  INTEGER (0..31),
frequencyHoppingOffset                             INTEGER (1..
maxNrofPhysicalResourceBlocks-1)           OPTIONAL,   -- Need
R
pathlossReferenceIndex                 INTEGER (0..maxNrofPUSCH-
PathlossReferenceRSs-1),
...
}
OPTIONAL,   -- Need R
...
}
```

Next, a PUSCH transmission method will be described. A DMRS antenna port for PUSCH transmission is the same as an antenna port for SRS transmission. PUSCH transmission may follow each of a codebook-based transmission method and a non-codebook-based transmission method, depending on whether a value of txConfig in pusch-Config of [Table 21], which is higher signaling, is "codebook" or "nonCodebook".

As described above, PUSCH transmission may be dynamically scheduled via DCI format 0_0 or 0_1, and may be semi-statically configured by a configured grant. If the terminal is indicated with scheduling for PUSCH transmis-sion via DCI format 0_0, the terminal performs beam configuration for PUSCH transmission by using pucch-spatialRelationInfoID corresponding to a UE-specific PUCCH resource which corresponds to a minimum ID within an activated uplink BWP in a serving cell, and in this case, the PUSCH transmission is based on a single antenna port. The terminal does not expect scheduling for PUSCH transmission via DCI format 0_0, within a BWP in which a PUCCH resource including pucch-spatialRelationInfo is not configured. If the terminal is not configured with txConfig in pusch-Config of [Table 21], the terminal does not expect to be scheduled via DCI format 0_1.

TABLE 21

```
PUSCH-Config ::=                                  SEQUENCE {
dataScramblingIdentityPUSCH                       INTEGER (0..1023)
OPTIONAL,   -- Need S
txConfig                                          ENUMERATED {codebook,
nonCodebook}                                      OPTIONAL,   -- Need S
```

TABLE 21-continued

| | |
|---|---|
| dmrs-UplinkForPUSCH-MappingTypeA | SetupRelease { DMRS- |
| UplinkConfig } | OPTIONAL, -- Need M |
| dmrs-UplinkForPUSCH-MappingTypeB | SetupRelease { DMRS- |
| UplinkConfig } | OPTIONAL, -- Need M |
| pusch-PowerControl | PUSCH-PowerControl |
| OPTIONAL, -- Need M | |
| frequencyHopping | ENUMERATED {intraSlot, interSlot} |
| OPTIONAL, -- Need S | |
| frequencyHoppingOffsetLists | SEQUENCE (SIZE (1..4)) OF INTEGER |
| (1..maxNrofPhysicalResourceBlocks-1) | |
| OPTIONAL, -- Need M | |
| resourceAllocation | ENUMERATED |
| { resourceAllocationType0, resourceAllocationType1, dynamicSwitch}, | |
| pusch-TimeDomainAllocationList | SetupRelease { PUSCH- |
| TimeDomainResourceAllocationList } | OPTIONAL, -- Need M |
| pusch-AggregationFactor | ENUMERATED { n2, n4, n8 } |
| OPTIONAL, -- Need S | |
| mcs-Table | ENUMERATED {qam256, |
| qam64LowSE} | OPTIONAL, -- Need |
| S | |
| mcs-TableTransformPrecoder | ENUMERATED {qam256, |
| qam64LowSE} | OPTIONAL, -- Need |
| S | |
| transformPrecoder | ENUMERATED {enabled, disabled} |
| OPTIONAL, -- Need S | |
| codebookSubset | ENUMERATED |
| {fullyAndPartialAndNonCoherent, partialAndNonCoherent,nonCoherent} | |
| OPTIONAL, -- Cond codebookBased | |
| maxRank | INTEGER (1..4) |
| OPTIONAL, -- Cond codebookBased | |
| rbg-Size | ENUMERATED { config2} |
| OPTIONAL, -- Need S | |
| uci-OnPUSCH | SetupRelease { UCI-OnPUSCH} |
| OPTIONAL, -- Need M | |
| tp-pi2BPSK | ENUMERATED {enabled} |
| OPTIONAL, -- Need S | |
| ... | |
| } | |

Next, codebook-based PUSCH transmission will be described. Codebook-based PUSCH transmission may be dynamically scheduled via DCI format 0_0 or 0_1 and may operate semi-statically by a configured grant. If a codebook-based PUSCH is dynamically scheduled by DCI format 0_1 or is configured semi-statically by a configured grant, the terminal determines a precoder for PUSCH transmission, based on an SRS resource indicator (SRI), a transmission precoding matrix indicator (TPMI), and a transmission rank (the number of PUSCH transmission layers).

In this case, the SRI may be given via a field, SRS resource indicator, in DCI or may be configured via srs-ResourceIndicator that is higher signaling. The terminal, during codebook-based PUSCH transmission, may be configured with at least one SRS resource and configured with up to two SRS resources. When the terminal is provided with the SRI via DCI, an SRS resource indicated by the SRI refers to an SRS resource corresponding to the SRI from among SRS resources transmitted before a PDCCH including the SRI. In addition, the TPMI and the transmission rank may be given via a field, precoding information and number of layers, in DCI or may be configured via precodingAndNum-berOfLayers that is higher signaling. The TPMI is used to indicate a precoder applied to PUSCH transmission. If the terminal is configured with one SRS resource, the TPMI is used to indicate a precoder to be applied in the configured one SRS resource. If the terminal is configured with multiple SRS resources, the TPMI is used to indicate a precoder to be applied in the SRS resource indicated via the SRI.

A precoder to be used for PUSCH transmission is selected from an uplink codebook having the same number of antenna ports as a value of nrofSRS-Ports in SRS-Config which is higher signaling. In codebook-based PUSCH transmission, the terminal determines a codebook subset, based on codebookSubset in pusch-Config, which is higher signaling, and the TPMI. codebookSubset in pusch-Config which is higher signaling may be configured to be one of "fullyAndPartialAndNonCoherent", "partialAndNonCoherent", or "nonCoherent", based on UE capability reported to the base station by the terminal. If the terminal has reported "partialAndNonCoherent" as UE capability, the terminal does not expect that a value of codebookSubset which is higher signaling is configured to be "fullyAndPartialAnd-NonCoherent". If the terminal has reported "nonCoherent" as UE capability, the terminal expects the value of code-bookSubset, which is higher signaling, to be configured to neither "fullyAndPartialAndNonCoherent" nor "partialAnd-NonCoherent". If nrofSRS-Ports in SRS-ResourceSet which is higher signaling indicates two SRS antenna ports, the terminal does not expect that the value of codebookSubset which is higher signaling is configured to be "partialAnd-NonCoherent".

The terminal may be configured with one SRS resource set, in which a value of usage in SRS-ResourceSet that is higher signaling is configured to be "codebook", and one SRS resource in the corresponding SRS resource set may be indicated via the SRI. If multiple SRS resources are configured in the SRS resource set in which the usage value in SRS-ResourceSet that is higher signaling is configured to be "codebook", the terminal expects that the value of nrofSRS-Ports in SRS-Resource that is higher signaling is configured to be the same for all SRS resources.

The terminal transmits one or multiple SRS resources included in the SRS resource set, in which the value of usage is configured to be "codebook", to the base station according to higher signaling, and the base station selects one of the SRS resources transmitted by the terminal and indicates the terminal to perform PUSCH transmission using transmission beam information of the corresponding SRS resource. In this case, in codebook-based PUSCH transmission, the SRI is used as information for selecting of an index of one SRS resource and is included in the DCI. Additionally, the base station adds, to the DCI, information indicating the rank and TPMI to be used for PUSCH transmission by the terminal. The terminal uses the SRS resource indicated by the SRI to perform PUSCH transmission by applying the precoder indicated by the TPMI and the rank, which has been indicated based on a transmission beam of the SRS resource.

Next, non-codebook-based PUSCH transmission will be described. Non-codebook-based PUSCH transmission may be dynamically scheduled via DCI format 0_0 or 0_1 and may operate semi-statically by a configured grant. If at least one SRS resource is configured in an SRS resource set, in which the value of usage in SRS-ResourceSet that is higher signaling is configured to be "nonCodebook", the terminal may be scheduled for non-codebook-based PUSCH transmission via DCI format 0_1.

For the SRS resource set in which the value of usage in SRS-ResourceSet that is higher signaling is configured to be "nonCodebook", the terminal may be configured with one connected non-zero power (NZP) CSI-RS resource. The terminal may perform calculation on a precoder for SRS transmission via measurement for the NZP CSI-RS resource connected to the SRS resource set. If a difference between a last reception symbol of an aperiodic NZP CSI-RS resource connected to the SRS resource set and a first symbol of aperiodic SRS transmission in the terminal is less than 42 symbols, the terminal does not expect updating of information on the precoder for SRS transmission.

If a value of resourceType in SRS-ResourceSet that is higher signaling is configured to be "aperiodic", the connected NZP CSI-RS is indicated via an SRS request which is a field in DCI format 0_1 or 1_1. In this case, the connected NZP CSI-RS resource being an aperiodic NZP CSI-RS resource indicates the presence of the connected NZP CSI-RS in case that a value of the field, SRS request, in DCI format 0_1 or 1_1 is other than "00". In this case, the DCI should indicate neither a cross carrier nor cross BWP scheduling. In addition, if the value of SRS request indicates the presence of the NZP CSI-RS, the NZP CSI-RS is located at a slot in which a PDCCH including the SRS request field has been transmitted. In this case, TCI states configured in scheduled subcarriers are not configured to be QCL-TypeD.

If a periodic or semi-persistent SRS resource set is configured, the connected NZP CSI-RS may be indicated via associatedCSI-RS in SRS-ResourceSet that is higher signaling. For non-codebook-based transmission, the terminal does not expect that spatialRelationInfo, which is higher signaling for the SRS resource, and associatedCSI-RS in SRS-ResourceSet which is higher signaling are configured together.

When multiple SRS resources are configured, the terminal may determine the transmission rank and precoder to be applied to PUSCH transmission, based on the SRI indicated by the base station. In this case, the SRI may be indicated via the field, SRS resource indicator, in DCI or may be configured via srs-ResourceIndicator that is higher signaling. Like the aforementioned codebook-based PUSCH transmission, when the terminal receives the SRI via the DCI, the SRS resource indicated by the SRI refers to an SRS resource corresponding to the SRI from among SRS resources transmitted before the PDCCH including the SRI. The terminal may use one or multiple SRS resources for SRS transmission, and the maximum number of SRS resources simultaneously transmittable in the same symbol within one SRS resource set is determined by UE capability reported to the base station by the terminal. In this case, the SRS resources that the terminal simultaneously transmits occupy the same RB. The terminal configures one SRS port for each SRS resource. Only one SRS resource set, in which the value of usage in SRS-ResourceSet that is higher signaling is configured to be "nonCodebook", may be configured, and up to 4 SRS resources for the non-codebook-based PUSCH transmission may be configured.

The base station transmits one NZP CSI-RS connected to the SRS resource set to the terminal, and the terminal calculates, based on a result of measurement at reception of the NZP CSI-RS, the precoder to be used during transmission of one or multiple SRS resources in the SRS resource set. The terminal applies the calculated precoder when transmitting, to the base station, one or multiple SRS resources in the SRS resource set in which usage is configured to be "nonCodebook", and the base station selects one or multiple SRS resources from among the received one or multiple SRS resources. In this case, in non-codebook-based PUSCH transmission, the SRI refers to an index capable of representing one SRS resource or a combination of multiple SRS resources, and the SRI is included in the DCI. The number of SRS resources indicated by the SRI transmitted by the base station may be the number of transmission layers of the PUSCH, and the terminal transmits the PUSCH by applying, to each layer, the precoder applied to SRS resource transmission.

[PUSCH: Preparation Procedure Time]

Next, a PUSCH preparation procedure time will be described. If the base station uses DCI format 0_0, 0_1, or 0_2 to schedule the terminal to transmit the PUSCH, the terminal may require a PUSCH preparation procedure time for transmitting the PUSCH by applying a transmission method (a transmission precoding method of an SRS resource, the number of transmission layers, and a spatial domain transmission filter) indicated via the DCI.

In NR, the PUSCH preparation procedure time is defined in consideration of the same. The PUSCH preparation procedure time of the terminal may conform to [Equation 2] below.

$$T_{proc,2} = \max((N_2 + d_{2,1} + d_2)(2048 + 144)\kappa 2^{-\mu} T_c + \qquad \text{[Equation 2]}$$
$$T_{ext} + T_{switch}, \ d_{2,2})$$

Each variable in $T_{proc,2}$ described above using Equation 2 may have the following meaning.

$N_2$: The number of symbols determined according to numerology $\mu$ and UE processing capability 1 or 2 according to UE capability. If UE processing capability 1 is reported according to capability reporting of the terminal, $N_2$ may have values of [Table 22], and if UE processing capability 2 is reported and it is configured, via higher-layer signaling, that UE processing capability 2 is available, $N_2$ may have values of [Table 23].

TABLE 22

| μ | PUSCH preparation time $N_2$ [symbols] |
| --- | --- |
| 0 | 10 |
| 1 | 12 |
| 2 | 23 |
| 3 | 36 |

TABLE 23

| μ | PUSCH preparation time $N_2$ [symbols] |
| --- | --- |
| 0 | 5 |
| 1 | 5.5 |
| 2 | 11 for frequency range 1 |

$d_{2,1}$: The number of symbols determined to be 0 when all resource elements of a first OFDM symbol of PUSCH transmission are configured to include only DM-RSs, and determined to be 1 otherwise.

κ: 64

μ: μ follows one of $\mu_{DL}$ or $\mu_{UL}$, at which $T_{proc,2}$ has a greater value. $\mu_{DL}$ denotes a numerology of a downlink in which a PDCCH including DCI for scheduling of a PUSCH is transmitted, and $\mu_{UL}$ denotes a numerology of an uplink in which a PUSCH is transmitted.

$T_c$: $1/(\Delta f_{max} \times N_f)$, $\Delta f_{max} = 480 \times 10^3$ Hz, and $N_f = 4096$ $d_{2,2}$: $d_{2,2}$ follows a BWP switching time when DCI for PUSCH scheduling indicates BWP switching, and has 0 otherwise.

$d_2$: If OFDM symbols of a PUCCH, a PUSCH with a high priority index, and a PUCCH with a low priority index overlap in time, a $d_2$ value of the PUSCH with the high priority index is used. Otherwise, $d_2$ is 0.

$T_{ext}$: If the terminal uses a shared spectrum channel access scheme, the terminal may calculate $T_{ext}$ and apply the same to a PUSCH preparation procedure time. Otherwise, $T_{ext}$ is assumed to be 0.

$T_{switch}$: If an uplink switching interval is triggered, $T_{switch}$ is assumed to be a switching interval time. Otherwise, $T_{switch}$ is assumed to be 0.

The base station and the terminal determine that the PUSCH preparation procedure time is not sufficient when a first symbol of the PUSCH starts before a first uplink symbol in which a CP starts after $T_{proc,2}$ from a last symbol of the PDCCH including the DCI for scheduling of the PUSCH, in consideration of time axis resource mapping information of the PUSCH scheduled via the DCI and a timing advance effect between the uplink and the downlink. Otherwise, the base station and the terminal determine that the PUSCH preparation procedure time is sufficient. If the PUSCH preparation procedure time is sufficient, the terminal transmits the PUSCH, and if the PUSCH preparation procedure time is not sufficient, the terminal may disregard the DCI for scheduling of the PUSCH.

[Relating to CA/DC]

Figure 10:
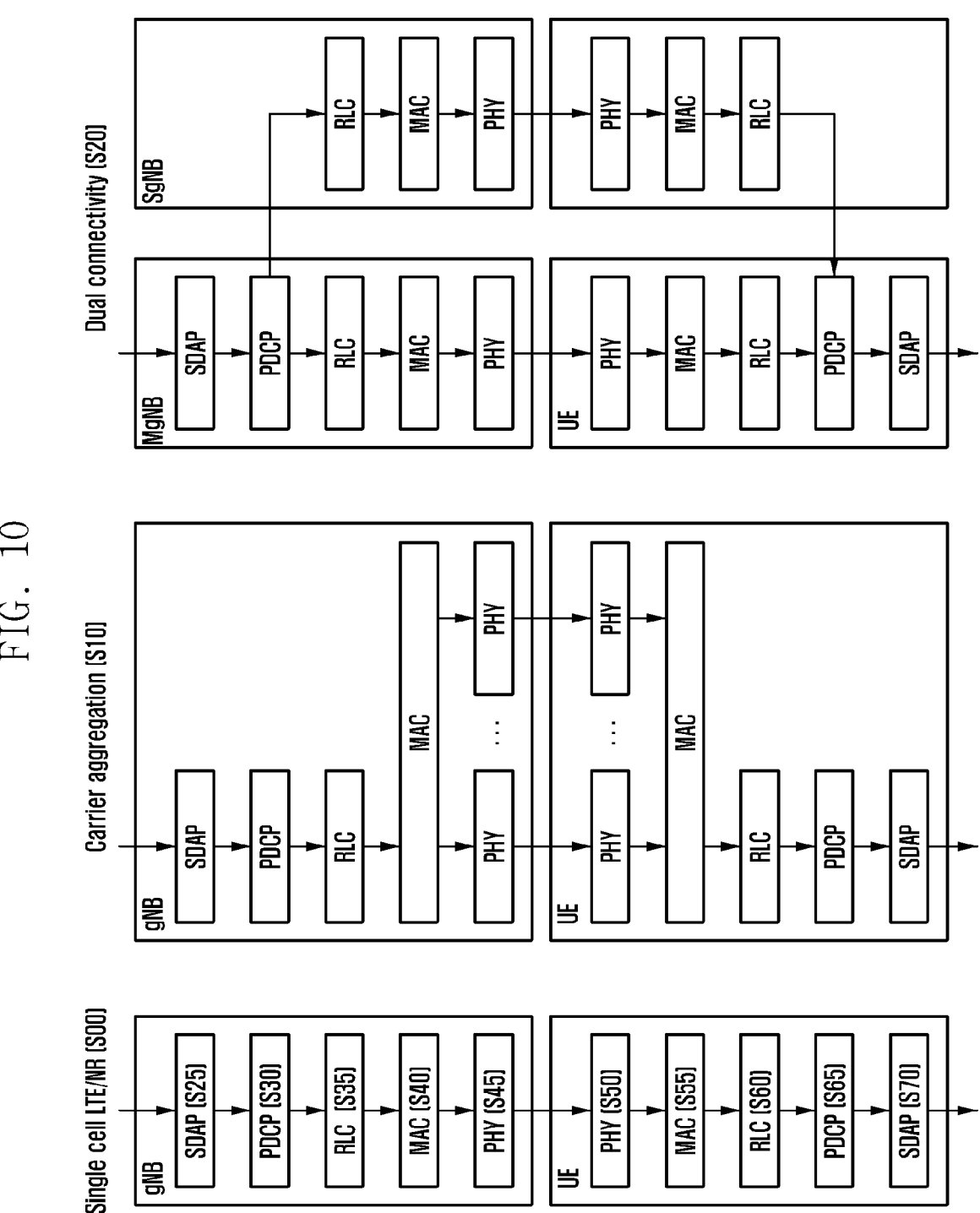
FIG. 10 is a diagram illustrating radio protocol structures of a terminal and a base station in single cell, carrier aggregation, and dual connectivity situations in the wireless communication system according to an embodiment of the disclosure.

FIG. 10 is a diagram illustrating radio protocol structures of a base station and a terminal in single cell, carrier aggregation, and dual connectivity situations according to an embodiment of the disclosure.

Referring to FIG. 10, radio protocols of a next-generation mobile communication system include NR service data adaptation protocols (SDAP) S25 and S70, NR packet data convergence protocols (PDCP) S30 and S65, NR radio link controls (RLC) S35 and S60, and NR medium access controls (MAC) S40 and S55 layers in a terminal and an NR base station, respectively.

Main functions of the NR SDAPs S25 and S70 may include some of the following functions. User data transfer function (transfer of user plane data)

Function of mapping a QoS flow and a data bearer for an uplink and a downlink (mapping between a QoS flow and a DRB for both DL and UL)

Function of marking a QoS flow ID in an uplink and a downlink (marking QoS flow ID in both DL and UL packets)

Function of mapping reflective QoS flows to data bearers for uplink SDAP PDUs (reflective QoS flow to DRB mapping for the UL SDAP PDUs)

With respect to an SDAP layer device, the terminal may be configured, via an RRC message, whether to use a header of the SDAP layer device or whether to use a function of the SDAP layer device for each PDCP layer device, for each bearer, or for each logical channel, and when the SDAP header is configured, a NAS QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in an uplink and a downlink. The SDAP header may include QoS flow ID information indicating QoS. The QoS information may be used as a data processing priority, scheduling information, etc. to support a smooth service.

Main functions of the NR PDCPs S30 and S65 may include some of the following functions.

Header compression and decompression function (ROHC only)

User data transmission function (transfer of user data)

Sequential delivery function (in-sequence delivery of upper layer PDUs)

Non-sequential delivery function (out-of-sequence delivery of upper layer PDUs)

Reordering function (PDCP PDU reordering for reception)

Duplicate detection function (duplicate detection of lower layer SDUs)

Retransmission function (retransmission of PDCP SDUs)

Encryption and decryption function (ciphering and deciphering)

Timer-based SDU discard function (timer-based SDU discard in uplink)

In the above, the reordering function of the NR PDCP device refers to a function of reordering PDCP PDUs received from a lower layer in order based on a PDCP sequence number (SN), and may include a function of transferring data to a higher layer according to the reordered sequence. Alternatively, the reordering function of the NR PDCP device may include a function of direct transfer without considering a sequence, include a function of reordering the sequence to record lost PDCP PDUs, include a function of reporting states of the lost PDCP PDUs to a transmission side, and include a function of requesting retransmission of the lost PDCP PDUs.

Main functions of the NR RLCs S35 and S60 may include some of the following functions.

Data transmission function (transfer of upper layer PDUs)

Sequential delivery function (in-sequence delivery of upper layer PDUs)

Non-sequential delivery function (out-of-sequence delivery of upper layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function

Error detection function (protocol error detection)

RLC SDU discard function

RLC re-establishment function

In the above, the in-sequence delivery function of the NR RLC device may refer to a function of sequentially transferring, to a higher layer, RLC SDUs received from a lower layer. The in-sequence delivery function of the NR RLC device may include a function of, when originally one RLC SDU is segmented into multiple RLC SDUs and then received, reassembling and transferring the received RLC SDUs, may include a function of reordering the received RLC PDUs according to an RLC sequence number (SN) or a PDCP sequence number (SN), may include a function of reordering a sequence and recording lost RLC PDUs, may include a function of reporting states of the lost RLC PDUs to a transmission side, and may include a function of requesting retransmission of the lost RLC PDUs. The in-sequence delivery function of the NR RLC device may include a function of, when there is a lost RLC SDU, sequentially transferring only RLC SDUs before the lost RLC SDU to a higher layer, or may include a function of, even if there is a lost RLC SDU, if a predetermined timer expires, sequentially transferring, to the higher layer, all the RLC SDUs received before the timer starts. Alternatively, the in-sequence delivery function of the NR RLC device may include a function of, even if there is a lost RLC SDU, if a predetermined timer expires, sequentially transferring all currently received RLC SDUs to the higher layer. In the above, the RLC PDUs may be processed in the order of reception thereof (in the order of arrival, regardless of sequence numbers or the order of the sequence numbers) so as to be delivered to the PDCP device regardless of a sequence (out-of-sequence delivery), and in case of segments, segments stored in a buffer or to be received at a later time may be received, reconfigured into one complete RLC PDU, processed, and then delivered to the PDCP device. The NR RLC layer may not include a concatenation function, and the function may be performed in an NR MAC layer or may be replaced with a multiplexing function of the NR MAC layer.

In the above, the out-of-sequence delivery function of the NR RLC device refers to a function of transferring RLC SDUs received from a lower layer to an immediate higher layer regardless of a sequence, may include a function of, when originally one RLC SDU is divided into multiple RLC SDUs and received, reassembling and transferring the received RLC SDUs, and may include a function of storing the RLC SN or PDCP SN of the received RLC PDUs, arranging the sequence thereof, and recording lost RLC PDUs.

The NR MACs S40 and S55 may be connected to multiple NR RLC layer devices included in one terminal, and main functions of the NR MACs may include some of the following functions.

Mapping function (mapping between logical channels and transport channels)

Multiplexing and demultiplexing function (multiplexing/demultiplexing of MAC SDUs)

Scheduling information reporting function

HARQ function (error correction through HARQ)

Function of priority handling between logical channels (priority handling between logical channels of one UE)

Function of priority handling between terminals (priority handling between UEs by means of dynamic scheduling)

MBMS service identification function

Transport format selection function

Padding function

The NR PHY layers S45 and S50 may perform channel-coding and modulation of higher-layer data, make the channel-coded and modulated higher-layer data into OFDM symbols, and transmit the OFDM symbols via a radio channel, or may perform demodulation and channel-decoding of the OFDM symbols received via the radio channel and transfer the same to the higher layer.

The detailed structures of the radio protocol structures may be variously changed according to a carrier (or cell) operating method. For example, if the base station transmits, based on a single carrier (or cell), data to the terminal, the base station and the terminal use a protocol structure having a single structure for each layer, as shown in S00. On the other hand, when the base station transmits data to the terminal, based on carrier aggregation (CA) using multiple carriers in a single TRP, the base station and the terminal use a protocol structure in which up to the RLC has a single structure but the PHY layer is multiplexed via the MAC layer, as shown in S10. As another example, when the base station transmits data to the terminal, based on dual connectivity (DC) using multiple carriers in multiple TRPs, the base station and the terminal use a protocol structure in which up to the RLC has a single structure but the PHY layer is multiplexed via the MAC layer, as shown in S20.

Referring to the aforementioned PDCCH and beam configuration-related descriptions, PDCCH repetitive transmission is not supported currently in Rel-15 and Rel-16 NR, and it is thus difficult to achieve required reliability in a scenario requiring high reliability, such as URLLC. The disclosure provides a method of repeated PDCCH transmission via multiple transmission points (TRPs) so as to improve PDCCH reception reliability of a terminal. Specific methods will be described in detail in the following embodiments.

Hereinafter, embodiments of the disclosure will be described in detail with the accompanying drawings. Contents of the disclosure are applicable in FDD and TDD systems. Hereinafter, in the disclosure, higher signaling (or higher-layer signaling) is a method of transferring a signal from a base station to a terminal by using a physical layer downlink data channel or transferring a signal from a terminal to a base station by using a physical layer uplink data channel, and may be referred to as RRC signaling, PDCP signaling, or a medium access control (MAC) control element (MAC CE).

Hereinafter, in the disclosure, in determining whether to apply cooperative communication, it is possible for a terminal to use various methods, in which a PDCCH(s) assigning a PDSCH to which the cooperative communication is applied has a specific format, a PDCCH(s) assigning a PDSCH to which the cooperative communication is applied includes a specific indicator indicating whether the cooperative communication is applied, a PDCCH(s) assigning a PDSCH to which the cooperative communication is applied is scrambled by a specific RNTI, applying of the cooperative communication in a specific interval indicated by a higher layer is assumed, or the like. Hereinafter, for the convenience of description, a case in which a terminal receives a PDSCH to which cooperative communication has been applied based on conditions similar to the above will be referred to as an NC-JT case.

Hereinafter, in the disclosure, determination of the priority between A and B may be mentioned in various ways, such as selecting one having a higher priority according to a predetermined priority rule so as to perform an operation corresponding thereto, or omitting or dropping an operation having a lower priority.

Hereinafter, in the disclosure, descriptions of the examples will be provided via multiple embodiments, but these are not independent of each other, and it is possible that one or more embodiments are applied simultaneously or in combination.

Hereinafter, embodiments of the disclosure will be described in detail with the accompanying drawings. Hereinafter, a base station is a subject that performs resource allocation to a terminal, and may be at least one of a gNode B, a gNB, an eNode B, a Node B, a base station (BS), a radio access unit, a base station controller, or a node on a network. A terminal may include a user equipment (UE), a mobile station (MS), a cellular phone, a smartphone, a computer, or a multimedia system capable of performing a communication function. Hereinafter, an embodiment of the disclosure will be described using the 5G system as an example, but the embodiment of the disclosure may also be applied to other communication systems having a similar technical background or a similar channel type. For example, LTE or LTE-A mobile communication and a mobile communication technology developed after 5G may be included therein. Therefore, an embodiment of the disclosure may be applied to other communication systems via some modifications without departing from the scope of the disclosure, according to determination by those skilled in the art. Contents of the disclosure are applicable in FDD and TDD systems.

In addition, in description of the disclosure, when it is determined that a detailed description of a related function or configuration may unnecessarily obscure the subject matter of the disclosure, the detailed description thereof will be omitted. Terms to be described hereinafter are terms defined in consideration of the functions in the disclosure, and may vary depending on intention or usage of users or operators. Therefore, the definitions should be based on contents throughout the specification.

Hereinafter, in description of the disclosure, higher-layer signaling may be signaling corresponding to at least one of or a combination of one or more of the following signaling types.

Master information block (MIB)

System information block (SIB) or SIB X (X=1, 2, . . . )

Radio resource control (RRC)

Medium access control (MAC) control element (CE)

In addition, L1 signaling may be signaling corresponding to at least one of or a combination of one or more of signaling methods using the following physical layer channels or signaling types.

Physical downlink control channel (PDCCH)

Downlink control information (DCI)

Terminal-specific (UE-specific) DCI

Group common DCI

Common DCI

Scheduling DCI (e.g., DCI used for scheduling downlink or uplink data)

Non-scheduling DCI (e.g., DCI not for scheduling of downlink or uplink data)

Physical uplink control channel (PUCCH)

Uplink control information (UCI)

Hereinafter, in the disclosure, determination of the priority between A and B may be mentioned in various ways, such as selecting one having a higher priority according to a predetermined priority rule so as to perform an operation corresponding thereto, or omitting or dropping an operation having a lower priority.

Hereinafter, in the disclosure, descriptions of the examples will be provided via multiple embodiments, but these are not independent of each other, and it is possible that one or more embodiments are applied simultaneously or in combination.

[Relating to multi-PDSCH/PUSCH Scheduling]

A new scheduling method has been introduced in Rel-17 NR of 3GPP. The new scheduling method introduced in Rel-17 NR is "multi-PDSCH scheduling" in which one piece of DCI enables scheduling of one or multiple PDSCHs and "multi-PUSCH scheduling" in which one piece of DCI enables scheduling of one or multiple PUSCHs. Here, in multiple PDSCHs or multiple PUSCHs, each PDSCH or each PUSCH transmits a different transport block (TB).

By using the multi-PDSCH scheduling and the multi-PUSCH scheduling, the base station does not schedule multiple pieces of DCI for scheduling of respective multiple PDSCHs or multiple PUSCHs for the terminal, and overhead of a downlink control channel may be thus reduced. However, since one piece of DCI for the multi-PDSCH scheduling and multi-PUSCH scheduling should include scheduling information for multiple PDSCHs or multiple PUSCHs, the size of the DCI may be increased. To this end, when multi-PDSCH scheduling and multi-PUSCH scheduling are configured for the terminal, a method for the terminal to properly interpret the DCI is required.

The disclosure provides descriptions of an example of multi-PDSCH scheduling, but the methods and/or embodiments proposed in the disclosure may also be used in multi-PUSCH scheduling.

The base station may configure multi-PDSCH scheduling for the terminal. For example, the base station may explicitly configure, for the terminal, multi-PDSCH scheduling in a higher-layer signal (e.g., a radio resource control (RRC) signal). Alternatively, the base station may implicitly configure, for the terminal, multi-PDSCH scheduling in a higher-layer signal (e.g., an RRC signal).

For multi-PDSCH scheduling for the terminal, the base station may configure a time domain resource assignment (TDRA) table via a higher-layer signal (e.g., an RRC signal) as follows. The TDRA table may include one or multiple rows. The number of the rows may be configured to be up to N_rows, and a unique index may be assigned to each row. The unique index may be one value among $1, 2, \ldots, N\_row$. For example, N_row may be 16. One or multiple pieces of scheduling information may be configured in each row. Here, when one piece of scheduling information is configured in one row, one PDSCH is scheduled according to the row. That is, when the row is indicated, it may be interpreted that single-PDSCH scheduling is indicated. When multiple pieces of scheduling information are configured in one row, the multiple pieces of scheduling information are used to schedule multiple PDSCHs in order. That is, when the row is indicated, it may be interpreted that multi-PDSCH scheduling is indicated.

The scheduling information may include K0 values, SLIVs, and PDSCH mapping types. That is, when multi-PDSCH scheduling is indicated, the row may include multiple K0 values, SLIVs, and PDSCH mapping types. An N-th K0 value, an N-th SLIV, and an N-th PDSCH mapping type are scheduling information of an N-th PDSCH. For reference, one row may include up to N_pdsch K0 values, SLIVs, and PDSCH mapping types. For example, N_pdsch may be equal to 8 (N_pdsch=8). That is, one row may schedule up to 8 PDSCHs.

Here, K0 indicates a slot scheduled with a PDSCH, and indicates a slot difference (offset) between a slot, in which a PDCCH transmitting DCI for scheduling of the PDSCH is received, and the slot scheduled with the PDSCH. For example, if K0=0, the slot in which the PDSCH is received is the same slot as the slot in which the PDCCH is received. Here, the starting and length indicator value (SLIV) indicates an index of a symbol in which the PDSCH starts and the number of consecutive symbols to which the PDSCH is allocated within one slot. The PDSCH mapping type indicates information on a position of a front-loaded DMRS of the PDSCH. For PDSCH mapping type A, the front-loaded DMRS of the PDSCH starts at a third symbol or a fourth symbol of the slot, and for PDSCH mapping type B, the front-loaded DMRS of the PDSCH starts at a first symbol of symbols scheduled with the PDSCH.

Here, when the row of the TDRA table is configured in the higher-layer signal, some of the K0 values, SLIVs, PDSCH mapping types may be omitted from the scheduling information. In this case, an omitted value may be interpreted to have a default value. For example, if K0 is omitted, a value of K0 may be interpreted to be 0. When the row of the TDRA table is configured, information other than the K0 values, SLIVs, and PDSCH mapping types may be additionally configured.

In the following description, it is assumed that multi-PDSCH scheduling is configured for the terminal. Here, the multi-PDSCH scheduling configuration may refer to configuration of multiple pieces of scheduling information in at least one row of the TDRA table. For reference, one piece of scheduling information may be configured in another row of the TDRA table. Therefore, even if multi-PDSCH scheduling is configured for the terminal, single-PDSCH scheduling may be indicated or multi-PDSCH scheduling may be indicated to the terminal depending on the row of the TDRA field of the received DCI. In other words, the multi-PDSCH scheduling indication is a case where the row of the TDRA table indicated to the terminal from the DCI includes multiple pieces of scheduling information, and the single-PDSCH scheduling indication is a case where the row of the TDRA table indicated to the terminal from the DCI includes one piece of scheduling information.

For single-PDSCH scheduling indication, one PDSCH is scheduled, and scheduling of the one PDSCH requires information, such as a modulation coding scheme (MCS), a new data indicator (NDI), a redundancy version (RV), and an HARQ process number (HPN). To this end, DCI indicating single-PDSCH scheduling should include information, such as an MCS, an NDI, an RV, and an HPN of the one PDSCH. More specifically, The DCI indicating single-PDSCH scheduling may include one MCS field. An MCS (i.e., a modulation scheme and a code rate of a channel code) indicated in the MCS field may be applied to one PDSCH scheduled by the DCI.

The DCI indicating single-PDSCH scheduling may include a 1-bit NDI field. An NDI value may be acquired from the 1-bit NDI field, and whether one PDSCH transmits a new transport block or retransmits a previous transport block may be determined based on the NDI value.

The DCI indicating single-PDSCH scheduling may include a 2-bit RV field. An RV value may be acquired from the 2-bit RV field, and a redundancy version of one PDSCH may be determined based on the RV value.

The DCI for single-PDSCH scheduling may include one HPN field. The one HPN field may be 4 bits. (For reference, if the terminal supports up to 32 HARQ processes, the HPN field may be extended to 5 bits, but an assumption of 4 bits is made for the convenience in description of the disclosure). One HARQ process ID may be indicated via the one HPN field. The one HARQ process ID may be an HARQ process ID of one scheduled PDSCH.

When the DCI indicates multi-PDSCH scheduling, multiple PDSCHs are scheduled, and therefore each PDSCH needs information, such as an MCS, an NDI, an RV, and an HPN. To this end, DCI indicating multi-PDSCH scheduling should include information, such as an MCS, an NDI, an RV, and an HPN of each scheduled PDSCH. More specifically, The DCI indicating multi-PDSCH scheduling may include one MCS field. An MCS (i.e., a modulation scheme and a code rate of a channel code) indicated in the MCS field may be applied to all PDSCHs scheduled by the DCI. That is, the DCI for multi-PDSCH scheduling may not schedule different PDSCHs by using different MCSs.

The DCI indicating multi-PDSCH scheduling may include a K-bit NDI field. Here, K may be a largest value in the number of scheduling information included in each row of the TDRA table. For example, when the TDRA table includes two rows, a first row includes 4 pieces of scheduling information, and a second row includes 8 pieces of scheduling information, K may equal to 8 (K=8). A k-th bit of the K-bit NDI field may indicate an NDI value of the PDSCH corresponding to k-th scheduling information. That is, a k-th PDSCH acquires the NDI value from the k-th bit of the K-bit NDI field, and whether the k-th PDSCH transmits a new transport block or retransmits a previous transport block may be determined based on the NDI value.

The DCI indicating multi-PDSCH scheduling may include a K-bit RV field. A k-th bit of the K-bit RV field may indicate an RV value of the PDSCH corresponding to k-th scheduling information. That is, the k-th PDSCH acquires the RV value from the k-th bit of the K-bit RV field, and a redundancy version of the k-th PDSCH may be determined based on the RV value.

The DCI indicating multi-PDSCH scheduling may include one HPN field. The one HPN field may be 4 bits. (For reference, if the terminal supports up to 32 HARQ processes, the HPN field may be extended to 5 bits, but an assumption of 4 bits is made for the convenience in description of the disclosure). One HARQ process ID may be indicated via the one HPN field. The one HARQ process ID may be an HARQ process ID of a first PDSCH among PDSCHs scheduled by the DCI indicating multi-PDSCH scheduling. The first PDSCH corresponds to first scheduling information. HPNs of subsequent PDSCHs are sequentially increased by one. That is, for a second PDSCH (corresponding to second scheduling information), an HPN is a value obtained by increasing the HARQ process ID of the first PDSCH by 1. For reference, if the HARQ process ID exceeds a maximum HARQ process ID number (numOf-HARQProcessID) configured for the terminal, a modulo operation may be performed. In other words, if the HARQ process ID indicated by DCI is "x", an HARQ process ID of the k-th PDSCH is determined as follows.

$$\text{HPN of } k\text{-}th \text{ PDSCH} = (x + k - 1) \text{ modulo } numOfHARQProcessID$$

As described above, when DCI indicates single-PDSCH scheduling, the DCI includes a 1-bit NDI field or a 2-bit RV field, and when DCI indicates multi-PDSCH scheduling, the DCI includes a K-bit NDI field or a K-bit RV field. For reference, single-PDSCH scheduling indication or multi-PDSCH scheduling indication may be performed in a TDRA field of the DCI (that is, whether single-PDSCH scheduling is indicated or multi-PDSCH scheduling is indicated is determined according to the number of pieces of scheduling information included in an indicated row of the TDRA field). Accordingly, one piece of DCI should support both single-PDSCH scheduling and multi-PDSCH scheduling. If a length of DCI for the single-PDSCH scheduling indication and a length of DCI for the multi-PDSCH scheduling indication are different from each other, "0" may need to be added (padded) to DCI of a shorter length so as to match the lengths.

A procedure of DCI interpretation by the terminal is as follows. The terminal receives DCI. In this case, it is assumed that a length of the DCI equals to a greater one among the length of the DCI for single-PDSCH scheduling indication and the length of the DCI for multi-PDSCH scheduling indication. The terminal may identify a position of the TDRA field in the DCI. The position of the TDRA field in the DCI for single-PDSCH scheduling indication may be the same as that in the DCI for multi-PDSCH scheduling indication. The terminal may determine, via the TDRA field, whether the DCI is for single-PDSCH scheduling indication or for multi-PDSCH scheduling indication. If the number of pieces of scheduling information included in the indicated row of the TDRA field is one, the DCI is determined to be for single-PDSCH scheduling indication, and if the number of pieces of scheduling information included in the row is two or more, the DCI is determined to be for multi-PDSCH scheduling indication. If the terminal determines that the DCI is for single-PDSCH scheduling indication, the DCI may be interpreted according to the determination. That is, it may be interpreted that the NDI field is 1 bit and the RV field is 2 bits. If the terminal determines that the DCI is for multi-PDSCH scheduling indication, the DCI may be interpreted according to the determination. That is, it may be interpreted that the NDI field is K bits and the RV field is K bits. For reference, positions of other fields in the DCI may vary according to a length of the NDI field or a length of the RV field. Therefore, for other fields, according to whether the DCI is for single-PDSCH scheduling indication or for multi-PDSCH scheduling indication, bit lengths of other fields may be the same, but positions thereof within the DCI may be different.

Figure 11:
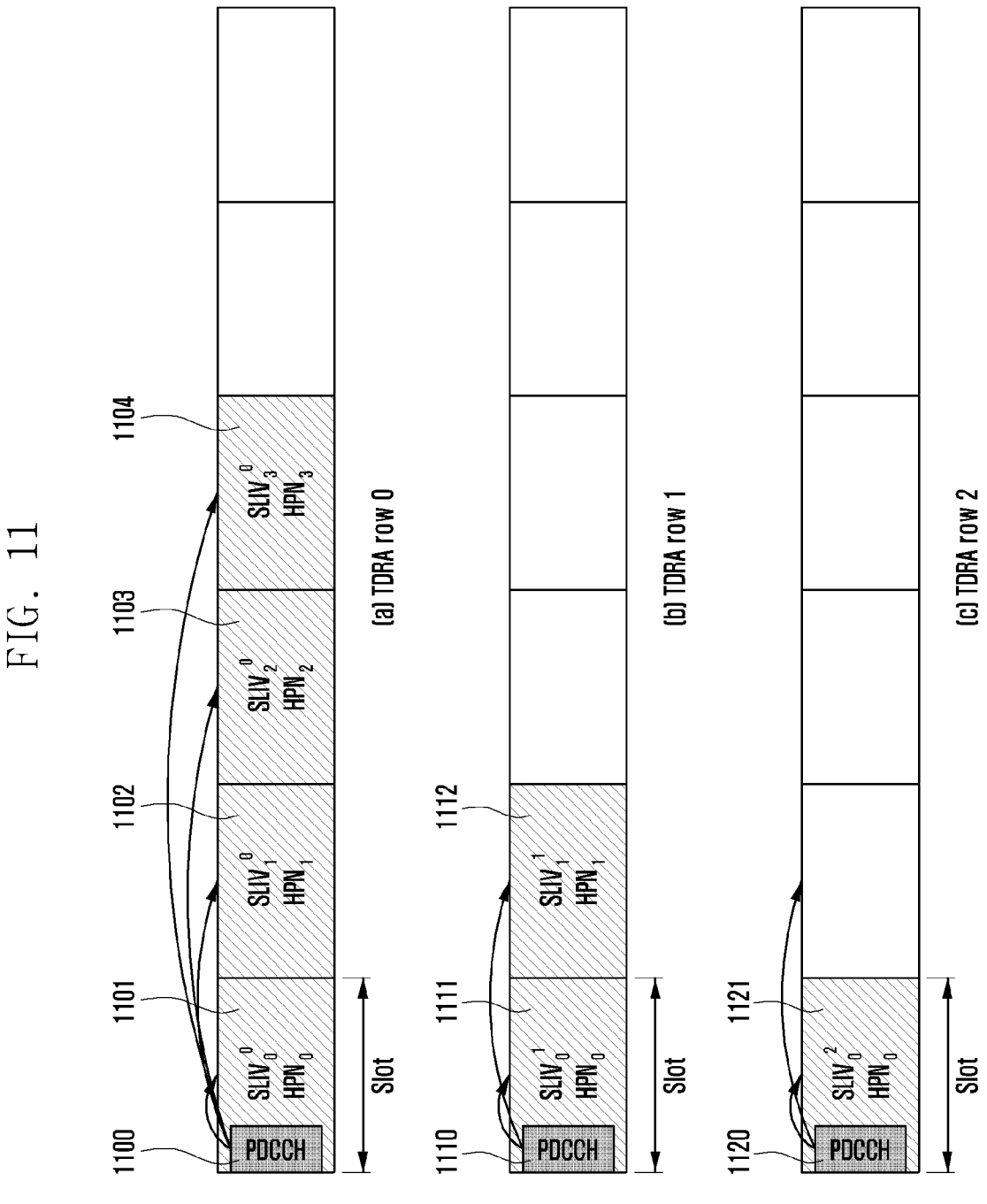
FIG. 11 is a diagram illustrating an example of scheduling one or more PDSCHs according to an embodiment of the disclosure.

FIG. 11 illustrates a PDSCH scheduling scheme according to the descriptions.

A first row (row 0) of a TDRA table includes four pieces of scheduling information (K0 values, SLIVs, and PDSCH mapping types). Here, a first SLIV is referred to as $SLIV^0_0$, a second SLIV is referred to as $SLIV^0_1$, a third SLIV is referred to as $SLIV^0_2$, and a fourth SLIV is referred to as $SLIV^0_3$. Accordingly, when a terminal is indicated with the first row (row 0) of the TDRA table, it may be determined that multi-PDSCH scheduling is indicated.

A second row (row 1) of the TDRA table includes two pieces of scheduling information (K0 values, SLIVs, and PDSCH mapping types). Here, a first SLIV is referred to as $SLIV^1_0$, and a second SLIV is referred to as $SLIV^1_1$. Accordingly, when the terminal is indicated with the second row (row 1) of the TDRA table, it may be determined that multi-PDSCH scheduling is indicated.

A third row (row 2) of the TDRA table includes one piece of scheduling information (a K0 value, an SLIV, and a PDSCH mapping type). Here, an SLIV is referred to as $SLIV^2_0$.

Accordingly, if the terminal is indicated with the third row (row 2) of the TDRA table, it may be determined that single-PDSCH scheduling is indicated. of FIG. 11 illustrates a case in which the terminal is indicated with the first row (row 0) of the TDRA table. In DCI received by the terminal in a PDCCH 1100, the TDRA field may be indicated with the first row (row 0). Accordingly, the terminal may receive four PDSCHs, based on four pieces of scheduling information (K0 values, SLIVs, and PDSCH mapping types) in the first row (row 0). Symbols for receiving a first PDSCH 1101 may be determined based on $SLIV^0_0$ that is a first SLIV, symbols for receiving a second PDSCH 1102 may be determined based on $SLIV^0_1$ that is a second SLIV, symbols for receiving a third PDSCH 1102 may be determined based on $SLIV^0_2$ that is a third SLIV, and symbols for receiving a fourth PDSCH 1103 may be determined based on $SLIV^0_3$ that is a fourth SLIV. Each of the four PDSCHs may have a unique HARQ process ID. That is, the first PDSCH may have $HPN_0$ as an HARQ process ID, the second PDSCH may have $HPN_1$ as an HARQ process ID, the third PDSCH may have $HPN_2$ as an HARQ process ID, and the fourth PDSCH may have $HPN_3$ as an HARQ process ID. Here, the HARQ process ID of the first PDSCH is indicated in the DCI. For example, $HPN_0=0$ may be indicated as the HARQ process ID of the first PDSCH in the DCI. In this case, $HPN_1=1$ may be the HARQ process ID of the second PDSCH, $HPN_1=2$ may be the HARQ process ID of the third PDSCH, and $HPN_1=3$ may be the HARQ process ID of the fourth PDSCH. of FIG. 11 illustrates a case in which the terminal is indicated with the second row (row 1) of the TDRA table. In DCI received by the terminal in a PDCCH 1110, the TDRA field may be indicated with the second row (row 1). Accordingly, the terminal may receive two PDSCHs, based on two pieces of scheduling information (K0 values, SLIVs, and PDSCH mapping types) in the second row (row 1). Symbols for receiving a first PDSCH 1111 may be determined based on $SLIV^1_0$ that is a first SLIV, and symbols for receiving a second PDSCH 1112 may be determined based on $SLIV^1_1$ that is a second SLIV. Each of the two PDSCHs may have a unique HARQ process ID. That is, the first PDSCH may have $HPN_0$ as an HARQ process ID, and the second PDSCH may have $HPN_1$ as an HARQ process ID. Here, the HARQ process ID of the first PDSCH is indicated in the DCI. For example, $HPN_0=0$ may be indicated as the HARQ process ID of the first PDSCH in the DCI. In this case, the HARQ process ID of the second PDSCH may be $HPN_1=1$.

of FIG. 11 illustrates a case in which the terminal is indicated with the third row (row 2) of the TDRA table. In DCI received by the terminal in a PDCCH 1120, the TDRA field may be indicated with the third row (row 2). Accordingly, the terminal may receive one PDSCH, based on one piece of scheduling information (a K0 value, an SLIV, and a PDSCH mapping type) in the third row (row 2). Symbols for receiving a PDSCH 1121 may be determined based on $SLIV^2_0$ that is one SLIV. The HARQ process ID of one PDSCH, i.e., $HPN_0$, is indicated in the DCI. For example, $HPN_0=0$ may be indicated as the HARQ process ID of the first PDSCH in the DCI.

FIG. 12 illustrates DCI for single-PDSCH scheduling and multi-PDSCH scheduling.

Referring to (a) of FIG. 12 and (b) of FIG. 12, a terminal may determine a position of a TDRA field 1200 in received DCI. The position is at the same position in single-PDSCH scheduling DCI and multi-PDSCH scheduling DCI. Whether the received DCI is DCI indicating single-PDSCH scheduling or is DCI indicating multi-PDSCH scheduling may be determined based on a value of the TDRA field.

If a row corresponding to the TDRA field value of the received DCI includes one piece of scheduling information (a K0 value, an SLIV, and a PDSCH mapping type) (e.g., a third row (row 2) of the TDRA table), the terminal may interpret the DCI as single-PDSCH scheduling DCI, as in (a) of FIG. 12. Referring to (a) of FIG. 12, the single-PDSCH scheduling DCI may include a 5-bit MCS field 1205, a 1-bit NDI field 1210, a 2-bit RV field 1215, and a 4-bit HARQ field 1220. The single-PDSCH scheduling DCI may include other fields. For example, an antenna port(s) field 1225, a DMRS sequence initialization field 1230, or the like may be included. In addition, if the single-PDSCH scheduling DCI is shorter than multi-PDSCH scheduling DCI, padding bits 1235 may be included.

If a row corresponding to the TDRA field value of the received DCI includes two or more pieces of scheduling information (K0 values, SLIVs, and PDSCH mapping types) (e.g., a first row (row 0) or a second row (row 1) of the TDRA table), the terminal may interpret the DCI as multi-PDSCH scheduling DCI, as in (b) of FIG. 12. Referring to (b) of FIG. 12, the multi-PDSCH scheduling DCI may include a 5-bit MCS field 1255, K-bit NDI fields 1260 and 1261, K-bit RV field 1262 and 1263, and a 4-bit HARQ field 1270. The multi-PDSCH scheduling DCI may include other fields. For example, an antenna port(s) field 1275, a DMRS sequence initialization field 1280, or the like may be included. For reference, DCI in which up to two PDSCHs are scheduled is shown in (b) of FIG. 12. Here, the 2-bit NDI fields 1260 and 1261 are illustrated separately, but may be attached as one 2-bit field. In addition, in (b) of FIG. 12, the 2-bit RV fields 1262 and 1263 are illustrated separately, but may be attached as one 2-bit field.

With reference to (a) of FIG. 12 and (b) of FIG. 12, it is assumed that a length of the DCI indicating single-PDSCH scheduling is shorter than a length of the DCI indicating multi-PDSCH scheduling, so that the padding bits 1235 are added to the single-PDSCH scheduling DCI. If the length of DCI indicating single-PDSCH scheduling is longer than the length of DCI indicating multi-PDSCH scheduling, padding bits may be added to the DCI indicating multi-PDSCH scheduling.

Hereafter, unless otherwise specified, this disclosure assumes that a PDSCH transmits a single codeword. If transmission of two-codewords is configured for a terminal, fields of DCI are for a first codeword unless otherwise specified.

Figure 13:
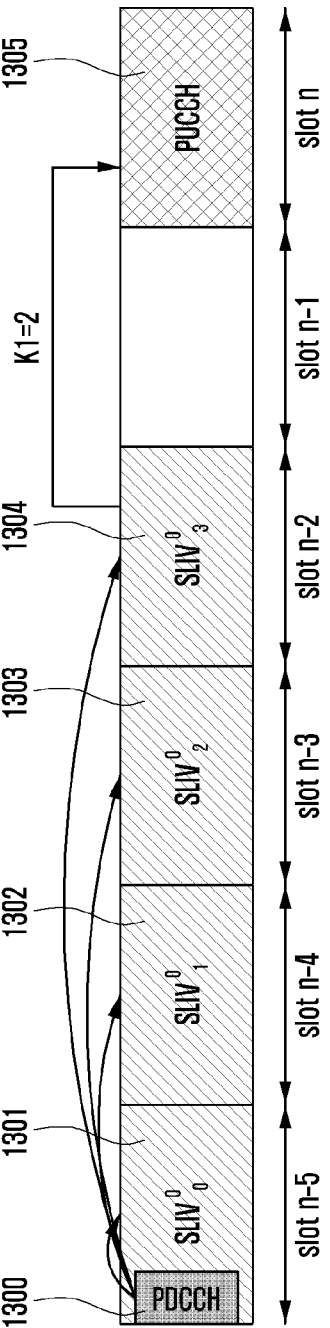
FIG. 13 is a diagram illustrating a method of transmitting HARQ-ACK of multiple PDSCHs according to an embodiment of the disclosure.

FIG. 13 is a diagram illustrating a method of transmitting HARQ-ACK of multiple PDSCHs according to an embodiment of the disclosure. FIG. 13 illustrates a PUCCH 1305 for HARQ-ACK transmission of one or multiple PDSCHs scheduled by DCI when the DCI indicates multi-PDSCH scheduling.

A base station may configure one or multiple K1 value(s) for a terminal. This may be referred to as a K1 set. DCI indicating multi-PDSCH scheduling may include an indicator indicating one K1 value in a K1 set. More specifically, the DCI may include a PDSCH-to-HARQ_feedback timing indicator field having up to 3 bits. The field may indicate one K1 value in the K1 set The terminal may determine a slot for transmission of HARQ-ACK of multiple PDSCHs, based on one K1 value and a slot in which a last PDSCH of the multiple PDSCHs is scheduled. For reference, HARQ-ACK of all PDSCHs scheduled by one piece of DCI may be transmitted through one PUCCH in the slot for transmission of the HARQ-ACK. A slot after K1 slots from the slot in which the last PDSCH is scheduled is the slot for transmission of HARQ-ACK of multiple PDSCHs. That is, a PUCCH including HARQ-ACK of multiple PDSCHs may be transmitted in the slot after K1 slots from the slot in which the last PDSCH is scheduled. Referring to FIG. 13, it is assumed that DCI received by the terminal indicates row 0 of the TDRA table as shown in FIG. 11, and according to row 0 of the TDRA table, PDSCHs have been scheduled in slot n–5, slot n–4, slot n–3, and slot n–2. In addition, it is assumed that the terminal is indicated with 2 as a K1 value. In this case, the terminal may determine slot n as a slot for transmission of HARQ-ACK, wherein slot n is two slots, i.e., the K1 value, after slot n–2 that is the last slot scheduled for PDSCH. That is, in the PUCCH 1305 of slot n, the terminal may transmit HARQ-ACK information of a PDSCH 1301 of slot n–5, a PDSCH 1302 of slot n–4, a PDSCH 1303 of slot n–3, and a PDSCH 1304 of slot n–2.

Embodiment 1: Method of Configuring/Determining the Number of HARQ Processes

In an Rel-15/16 NR system, the terminal may be configured with the number of common HARQ processes (the number of HARQ processes) (e.g., nrofHARQ-Processes-ForPDSCH) for a serving cell. This may be identified via the PDSCH-ServingCellConfig information element (IE) RRC parameter of 3GPP TS38.331 in Table 24.

TABLE 24

| PDSCH-ServingCellConfig |
| --- |
| The IE PDSCH-ServingCellConfig is used to configure UE specific PDSCH parameters that are common across the UE's BWPs of one serving cell. |
| PDSCH-ServingCellConfig information element |

```
ASN1START
TAG-PDSCH-SERVINGCELLCONFIG-START
PDSCH-ServingCellConfig ::=        SEQUENCE {
codeBlockGroupTransmission         SetupRelease { PDSCH-
CodeBlockGroupTransmission }          OPTIONAL,  -- Need
M
xOverhead                          ENUMERATED { xOh6,
xOh12, xOh18 }                        OPTIONAL,  --
Need S
```

TABLE 24-continued

| | |
|---|---|
| nrofHARQ-ProcessesForPDSCH | ENUMERATED {n2, n4, |
| n6, n10, n12, n16} | OPTIONAL, -- |
| Need S | |
| pucch-Cell | ServCellIndex |
| OPTIONAL, -- Cond SCellAddOnly | |
| ...., | |
| } | |

Referring to Table 24, the PDSCH-ServingCellConfig IE is commonly applied to all downlink BWPs of one serving cell, and PDSCH-ServingCellConfig includes nrofHARQ-ProcessesForPDSCH as the number of cell-common HARQ processes. Here, cell-common indicates that all BWPs configured for a cell use the number of HARQ processes. nrofHARQ-ProcessesForPDSCH may indicate one value among 2, 4, 6, 10, 12, and 16 as the number of cell-common HARQ processes. If nrofHARQ-ProcessesForPDSCH is not configured, the terminal may assume 8 as the number of cell-common HARQ processes. Here, the number of HARQ processes for a downlink can be up to 16.

For reference, the number of HARQ processes for an uplink has always been fixed to 16.

In Rel-17 NR, frequency range (FR) 2-2, i.e., a new frequency band, has been introduced. FR 2-2 includes a carrier frequency band of 52.6 GHz to 70 GHz. In FR 2-2, 480 kHz and 960 kHz have been introduced as new subcarrier spacings for transmission or reception in a wide frequency band. The newly introduced 480 kHz and 960 kHz have shorter OFDM symbol lengths which are 1/4 and 1/8 of an OFDM symbol length of an existing subcarrier spacing of 120 kHz. In addition, 480 kHz and 960 kHz also have shorter slot lengths which are 1/4 and 1/8 of a slot length of the existing subcarrier spacing of 120 kHz. Accordingly, the terminal may require a greater number of HARQ processes to support a high throughput at the subcarrier spacing of 480 kHz or 960 kHz. For reference, the subcarrier spacing of 120 kHz may be used in FR 2-2. However, since the existing maximum number of 16 HARQ processes is sufficient for the subcarrier spacing of 120 kHz, more HARQ processes may not be used. Therefore, the terminal needs to be configured with a different number of HARQ processes depending on a subcarrier spacing for use.

The disclosure provides a method of configuring the number of HARQ processes for BWPs having different subcarrier spacings (SCSs) or different BWPs of one serving cell.

For reference, hereinafter, description will be provided for the number of HARQ processes of a downlink, but the above scheme may equally be applied to configure the number of ARQ processes of a uplink. Unless otherwise stated, the description hereinafter is related to a downlink.

[Method 1: Configuring the Number of BWP-Specific HARQ Processes]

In the first method of the disclosure, the number of HARQ processes may be configured for each BWP.

More specifically, when the terminal is configured with a BWP, a subcarrier spacing (subcarrierSpacing), a cyclic prefix (CP) type (cyclicPrefix), and a frequency location and bandwidth (locationAndBandwidth) of the BWP are configured. In addition, when the BWP is configured, the number of HARQ processes of the BWP (e.g., nrofHARQ-ProcessesForBWP) may be configured. For example, the number of HARQ processes of the BWP may be configured to be n24 or n32 for a downlink BWP. Here, when n24 or n32 is configured, the number of HARQ processes of the BWP may be 24 or 32.

When the number of HARQ processes (e.g., nrofHARQ-ProcessesForBWP) is configured in the BWP configuration, a preconfigured number of cell-common HARQ processes (e.g., nrofHARQ-ProcessesForPDSCH) may be ignored. If the number of HARQ processes (e.g., nrofHARQ-ProcessesForBWP) is not configured in the BWP configuration, the preconfigured number of cell-common HARQ processes (e.g., nrofHARQ-ProcessesForPDSCH) may be used as the number of HARQ processes of the BWP.

In the BWP configuration, the number of HARQ processes (e.g., nrofHARQ-ProcessesForBWP) may be configured when at least one of the following conditions is satisfied. Alternatively, in the BWP configuration, the number of HARQ processes (e.g., nrofHARQ-ProcessesForBWP) may be configured when all of the following conditions are satisfied.

As a first condition, in the BWP configuration, a subcarrier spacing should be indicated to be either 480 kHz or 960 kHz. That is, as mentioned earlier, when the subcarrier spacing is 480 kHz and 960 kHz in FR2-2, since an increased number of HARQ processes is required, the number of HARQ processes may be configured in the BWP configuration only in this case.

If the subcarrier spacing is 120 kHz in FR2-2, since an increased number of HARQ processes is not required, the terminal does not expect configuration of the number of HARQ processes (e.g., nrofHARQ-ProcessesForBWP) in the BWP configuration.

As a second condition, the number of HARQ processes (e.g., nrofHARQ-ProcessesForBWP) may be configured in the BWP configuration only when the terminal reports, to the base station, UE capability indicating that more than 16 HARQ processes can be used. That is, if the terminal cannot use more than 16 HARQ processes, there is no need to newly configure the number of HARQ processes in the BWP configuration. According to method 1, BWP configuration information (e.g., BWP IE of TS38.331) may be modified as shown in Table 25.

TABLE 25

| BWP |
|---|
| The IE BWP is used to configure generic parameters of a bandwidth part as defined in TS 38.211 [16], clause 4.5, and TS 38.213 [13], clause 12. For each serving cell the network configures at least an initial downlink bandwidth part and one (if the serving cell is configured with an uplink) or two (if using supplementary uplink (SUL)) initial uplink bandwidth parts. Furthermore, the network may configure additional uplink and downlink bandwidth parts for a serving cell. The uplink and downlink bandwidth part configurations are divided into common and dedicated parameters. |

TABLE 25-continued

| BWP information element | |
| --- | --- |
| ASN1START | |
| TAG-BWP-START | |
| BWP ::= | SEQUENCE { |
| locationAndBandwidth | INTEGER (0..37949), |
| subcarrierSpacing | SubcarrierSpacing, |
| cyclicPrefix | ENUMERATED { extended } |
| OPTIONAL  -- Need R | |
| nrofHARQ-ProcessesForBWP | ENUMERATED {n24, n32} |
| OPTIONAL,  -- Need M | |
| } | |
| TAG-BWP-STOP | |
| -- ASN1STOP | |

For reference, in method 1, the number of HARQ processes (nrofHARQ-ProcessesForBWP) in the BWP configuration is indicated as n24 and n32, but this is an example and other values may be added. For example, the number of HARQ processes (nrofHARQ-ProcessesForBWP) in the BWP configuration may further include n2, n4, n6, n10, n12, and n16 which are values of the number of cell-common HARQ processes (nrofHARQ-ProcessesForPDSCH).

[Method 2: Configuring the Number of SCS-Specific HARQ Processes]

In the second method of the disclosure, the number of HARQ processes may be configured for each subcarrier spacing.

More specifically, the terminal may be configured with the number of HARQ processes (e.g., nrofHARQ-Processes-ForPDSCH480 KHz or nrofHARQ-Processes-ForPDSCH960 KHz) for the subcarrier spacing of 480 kHz or 960 kHz. Here, the number of HARQ processes for the subcarrier spacing of 480 kHz (e.g., nrofHARQ-Processes-ForPDSCH480 KHz) may be used as the number of HARQ processes of a BWP having the subcarrier spacing of 480 kHz. In addition, the number of HARQ processes for the subcarrier spacing of 960 kHz (e.g., nrofHARQ-Processes-ForPDSCH960 KHz) may be used as the number of HARQ processes of a BWP having the subcarrier spacing of 960 kHz.

For example, the number of HARQ processes (e.g., nrofHARQ-ProcessesForPDSCH480 KHz or nrofHARQ-ProcessesForPDSCH960 KHz) may be configured to be n24 or n32 for a downlink BWP. Here, when n24 or n32 is configured, the number of HARQ processes may be 24 or 32.

When the number of HARQ processes (e.g., nrofHARQ-ProcessesForPDSCH480 KHz) is configured, the preconfigured number of cell-common HARQ processes (nrofHARQ-ProcessesForPDSCH) may be ignored in a BWP having the subcarrier spacing of 480 kHz. When the number of HARQ processes (e.g., nrofHARQ-ProcessesForPDSCH960 KHz) is configured, the preconfigured number of cell-common HARQ processes (nrofHARQ-ProcessesForPDSCH) may be ignored in the BWP having the subcarrier spacing of 960 kHz. In a BWP having another subcarrier, the preconfigured number of cell-common HARQ processes (nrofHARQ-ProcessesForPDSCH) may be used as the number of HARQ processes.

According to method 2, the PDSCH-ServingCellConfig IE of TS38.331 may be modified as shown in Table 26.

TABLE 26

| PDSCH-ServingCellConfig information element | |
| --- | --- |
| ASN1START | |
| TAG-PDSCH-SERVINGCELLCONFIG-START | |
| PDSCH-ServingCellConfig ::= | SEQUENCE { |
| codeBlockGroupTransmission | SetupRelease { PDSCH- |
| CodeBlockGroupTransmission } | OPTIONAL,  -- Need |
| M | |
| xOverhead | ENUMERATED { xOh6, |
| xOh12, xOh18 } | OPTIONAL,  -- |
| Need S | |
| nrofHARQ-ProcessesForPDSCH | ENUMERATED {n2, n4, |
| n6, n10, n12, n16} | OPTIONAL,  -- Need S |
| nrofHARQ-ProcessesForPDSCH480KHz | ENUMERATED {n24, n32} |
| OPTIONAL,  -- Need S | |
| nrofHARQ-ProcessesForPDSCH960KHz | ENUMERATED {n24, n32} |
| OPTIONAL,  -- Need S | |
| pucch-Cell | ServCellIndex |
| OPTIONAL,  -- Cond SCellAddOnly | |
| ..., | |
| } | |

For reference, in the description above, the number of HARQ processes has been configured via separate RRC parameters for the subcarrier spacing of 480 kHz and the subcarrier spacing of 960 kHz, respectively. However, as another example, the number of HARQ processes may be configured via one RRC parameter (e.g., nrofHARQ-ProcessesForPDSCH480/960 KHz), and the number of HARQ processes via one RRC parameter may be applied to the BWP having the subcarrier spacing of 480 kHz and the BWP having the subcarrier spacing of 960 kHz.

[Method 3: Determining the Number of SCS-Dependent HARQ Processes]

In the third method of the disclosure, a value (e.g., n24 or n32) added to existing nrofHARQ-ProcessesForPDSCH may be configured for the number of HARQ processes. In addition, the number of HARQ processes actually used in each BWP may be determined based on a value of nrof-HARQ-ProcessesForPDSCH and a subcarrier spacing of the BWP. In this case, the maximum number of HARQ processes used by the terminal may be configured via nrof-HARQ-ProcessesForPDSCH.

More specifically, according to method 3, TS38.331 PDSCH-ServingCellConfig IE may be modified based on Table 27.

US 12,627,415 B2

57

TABLE 27

PDSCH-ServingCellConfig information element

```
ASN1START
TAG-PDSCH-SERVINGCELLCONFIG-START
PDSCH-ServingCellConfig ::=        SEQUENCE {
codeBlockGroupTransmission         SetupRelease { PDSCH-
CodeBlockGroupTransmission }          OPTIONAL,  -- Need
M
xOverhead                          ENUMERATED { xOh6,
xOh12, xOh18 }                        OPTIONAL,  --
Need S
nrofHARQ-ProcessesForPDSCH         ENUMERATED {n2, n4,
n6, n10, n12, n16, n24, n32}          OPTIONAL,  --
Need S
pucch-Cell                         ServCellIndex
OPTIONAL,   -- Cond SCellAddOnly
...,
}
```

As an example of the disclosure, when a value greater than 16 (e.g., n24 or n32) is configured via nrofHARQ-ProcessesForPDSCH, the terminal may determine the number of actually used HARQ processes according to a sub-carrier spacing of a BWP.

For a BWP having the subcarrier spacing of 480 kHz or 960 kHz, the value configured in nrofHARQ-Processes-ForPDSCH may be used as the number of HARQ processes. However, in a BWP having a subcarrier spacing other than 480 kHz or 960 kHz may use a smaller value among nrofHARQ-ProcessesForPDSCH and X (e.g., min(nrof-HARQ-ProcessesForPDSCH, X)) as the number of HARQ processes. Here, X is the number of HARQ processes that the terminal may use in the BWP. For example, X may be 16. For another example, the X value may be a value reported as UE capability by the terminal to the base station.

For example, when n32 is configured in nrofHARQ-ProcessesForPDSCH, 32 may be applied as the number of HARQ processes in a BWP having the subcarrier spacing of 480 kHz or 960 kHz, and X (e.g., 16) may be applied as the number of HARQ processes in a BWP having a subcarrier spacing other than 480 kHz or 960 kHz.

For reference, when nrofHARQ-ProcessesForPDSCH is a value that is not greater than 16 (e.g., n2, n4, n6, n10, n12, or n16), a value indicated in nrofHARQ-Processes-ForPDSCH may be used as the number of HARQ processes in all BWPs.

That is, in the example above, nrofHARQ-Processes-ForPDSCH is configured to be a cell-common value, but the number of actually used HARQ processes may be deter-mined and used according to a subcarrier spacing of a BWP.

As an example of the disclosure, when a value greater than 16 (e.g., n24 or n32) is configured via nrofHARQ-ProcessesForPDSCH, the terminal may determine the number of actually used HARQ processes according to a method of PDSCH reception in a BWP.

When a BWP is configured with multi-PDSCH schedul-ing, a value configured in nrofHARQ-ProcessesForPDSCH may be used as the number of HARQ processes. However, a BWP which is not configured with multi-PDSCH sched-uling may use min(nrofHARQ-ProcessesForPDSCH, X) as the number of HARQ processes. Here, X is the number of HARQ processes that the terminal may use in the BWP. For example, X may be 16. For another example, the X value may be a value reported as UE capability by the terminal to the base station.

For example, when n32 is configured in nrofHARQ-ProcessesForPDSCH, 32 may be applied as the number of HARQ processes in a BWP configured with multi-PDSCH scheduling, and X (e.g., 16) may be applied as the number of HARQ processes in a BWP which is not configured with multi-PDSCH scheduling.

That is, in the example above, nrofHARQ-Processes-ForPDSCH is configured to be a cell-common value, but the number of actually used HARQ processes may be deter-mined and used according to multi-PDSCH scheduling of a BWP. This is because, multi-PDSCH scheduling may be used in a BWP having the subcarrier spacing of 480 kHz or 960 kHz, and when the multi-PDSCH scheduling is used, since one piece of DCI is used to schedule multiple PDSCHs at once, a large number of HARQ processes is required.

As an example of the disclosure, when a value greater than 16 (e.g., n24 or n32) is configured via nrofHARQ-ProcessesForPDSCH, the terminal may determine the num-ber of actually used HARQ processes according to a sub-carrier spacing and a method of PDSCH reception in a BWP.

When the BWP having the subcarrier spacing of 480 kHz or 960 kHz is configured with multi-PDSCH scheduling, a value configured in nrofHARQ-ProcessesForPDSCH may be used as the number of HARQ processes. However, for other BWPs, min(nrofHARQ-ProcessesForPDSCH, X) may be used as the number of HARQ processes. Here, X is the number of HARQ processes that the terminal may use in the BWP. For example, X may be 16. For another example, the X value may be a value reported as UE capability by the terminal to the base station.

For example, when n32 is configured in nrofHARQ-ProcessesForPDSCH, if the BWP having the subcarrier spacing of 480 kHz or 960 kHz is configured with multi-PDSCH scheduling, 32 may be applied as the number of HARQ processes, but for a BWP having a subcarrier spacing other than 480 kHz or 960 kHz or a BWP which is not configured with multi-PDSCH scheduling may use X (e.g., 16) as the number of HARQ processes.

[Method 4: Expansion of the number of HARQ processes of BWP other than 480/960 kHz]

In the fourth method of the disclosure, the number of HARQ processes of a BWP having a subcarrier spacing other than 480 kHz or 960 kHz may be determined accord-ing to whether the terminal is configured with a BWP having the subcarrier spacing of 480 kHz or 960 kHz.

More specifically, if the terminal is not configured with a BWP having the subcarrier spacing of 480 kHz or 960 kHz in a serving cell, the terminal may use a cell-common nrofHARQ-ProcessesForPDSCH value as the number of HARQ processes in the serving cell. Here, the cell-common nrofHARQ-ProcessesForPDSCH value is up to 16.

If the terminal is configured with at least one BWP having the subcarrier spacing of 480 kHz or 960 kHz in a serving cell, the terminal may determine the number of HARQ processes of all BWPs to be the same value as the number of HARQ processes of the BWPs having the subcarrier spacing of 480 kHz or 960 kHz. For example, if 32 (e.g., n32) is configured as the number of HARQ processes of the BWP having the subcarrier spacing of 480 kHz or 960 kHz, the terminal may assume 32 as the number of HARQ processes in a BWP having a subcarrier spacing other than 480 kHz or 960 kHz. For reference, the number of HARQ processes of BWPs having the subcarrier spacing of 480 kHz or 960 kHz may be determined using method 1, method 2, or method 3.

Likewise, a BWP having a subcarrier spacing other than 480 kHz or 960 kHz may also support up to 32 HARQ processes, and by assuming that all BWPs in serving cells have the same number of HARQ processes, a problem caused by different numbers of HARQ processes between different BWPs may be prevented.

For example, based on embodiment 1, the terminal may operate as follows. The terminal may be configured with a parameter from a higher layer in order to determine the number of HARQ process IDs. More specifically, the terminal may be configured with a parameter for each BWP from a higher layer, and use the parameter as the number of HARQ process IDs of the BWPs. Alternatively, the terminal may be configured with a parameter for each subcarrier spacing from a higher layer, and use the parameter as the number of HARQ process IDs of the BWPs using subcarrier. The terminal may be configured with one parameter from the higher layer, and according to a subcarrier spacing of an active BWP, the terminal may use, as an HARQ process ID, the configured parameter or one value among the maximum number of HARQ process IDs which can be used in the subcarrier spacing of the active BWP.

<Embodiment 2: Method of Configuring/Determining Bit-Size of HARQ Process Number

FIELD

Figure 14:
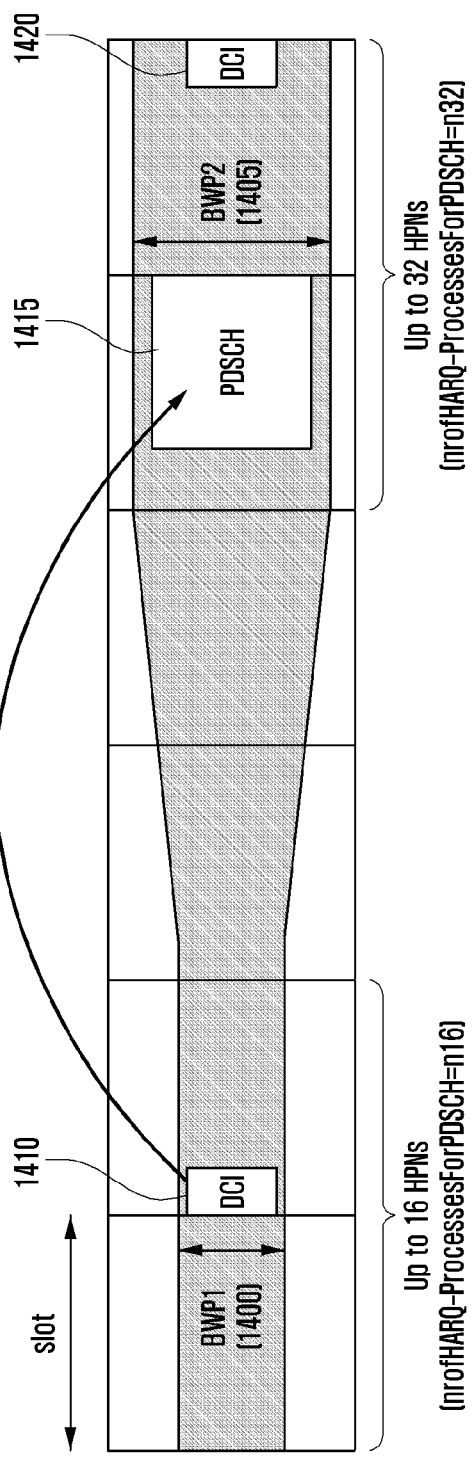
FIG. 14 is a diagram illustrating allocation of the number of different HARQ processes to multiple BWPs according to an embodiment of the disclosure.

FIG. 14 is a diagram illustrating allocation of the number of different HARQ processes to multiple BWPs according to an embodiment of the disclosure.

Referring to FIG. 14, the terminal may be configured with two BWPs (e.g., BWP1 and BWP2). 16 is configured as the number of HARQ processes for BWP1 1400, and 32 is configured as the number of HARQ processes for BWP2 1405. The terminal may receive DCI 1410 in BWP1 and may receive DCI 1420 in BWP2. In this case, the DCI may include an HARQ process number field to indicate an HARQ process ID. However, since each BWP may have a different number of HARQ processes, a bit-size of the HARQ process number field should be determined.

[Method 1: Determining Bit-Size without Separate RRC Signal]

In the first method, a bit-size of an HARQ process number field in DCI may be determined without a separate RRC signal, based on the number of HARQ processes in a BWP.

More specifically, in a (1-1)st method, a bit-size may be determined based on a largest number of HARQ processors among the numbers of HARQ processes of all BWPs. The HARQ process number field of the determined bit-size may be included in DCI monitored in all BWPs. For reference, the bit-size may be determined by ceil(log 2 (largest number of HARQ processes)).

For example, referring to FIG. 14, 16 is configured as the number of HARQ processes for BWP1 1400, and 32 is configured as the number of HARQ processes for BWP2 1405. The bit-size may be determined based on 32 which is the greater among the numbers of HARQ processes of the two BWPs. That is, since the number of HARQ processes is 32, the bit-size is determined to be 5 bits. The DCI that the terminal monitors in all BWPs may include a 5-bit HARQ process number field. If the terminal receives DCI in BWP1, only some values of the 5-bit HARQ process number field may be used. The some values are within the number of HARQ processes of BWP1. The terminal does not expect to be indicated with a value exceeding the number of HARQ processes of BWP1.

The (1-1)st method may be interpreted as follows. If the number of HARQ processes exceeding 16 (e.g., 24 or 32) is configured in at least one of the BWPs of the terminal, the DCI of all BWPs may include a 5-bit HARQ process number field. Otherwise (i.e., if the number of HARQ processes in all BWPs is not greater than 16), the DCI of all BWPs may include a 4-bit HARQ process number field.

In a (1-2)nd method, a bit-size may be determined based on the number of HARQ processes of an active BWP. The HARQ process number field of the determined bit-size may be included in DCI monitored in the active BWP. For reference, the bit-size may be determined by ceil(log 2 (largest number of HARQ processes)).

For example, referring to FIG. 14, 16 is configured as the number of HARQ processes for BWP1 1400, and 32 is configured as the number of HARQ processes for BWP2 1405. In the DCI 1410 that the terminal monitors in BWP1, 16 is configured as the number of HARQ processes for BWP1, and a 4-bit HARQ process number field may be thus included. DCI 1420 that the terminal monitors in BWP2 may include a 5-bit HARQ process number field, because 32 is configured as the number of HARQ processes for BWP1.

[Method 2: Determining bit-size by using RRC signal]

In the second method, the terminal may determine a bit-size, based on an RRC signal.

In a (2-1)st method, bit-sizes of HARQ process number fields of all BWPs may be indicated via one RRC parameter. That is, the base station may configure, for the terminal, a cell-common value as a bit-size of an HARQ process number field. The HARQ process number field of the configured bit-size may be included in DCI monitored in all BWPs.

For example, referring to FIG. 14, 16 is configured as the number of HARQ processes for BWP1 1400, and 32 is configured as the number of HARQ processes for BWP2 1405. The base station may configure a 5-bit HARQ process number field for the terminal. The DCI that the terminal monitors in all BWPs may include a 5-bit HARQ process number field. If the terminal receives DCI in BWP1, only some values of the 5-bit HARQ process number field may be used. The some values are within the number of HARQ processes of BWP1. The terminal does not expect to be indicated with a value exceeding the number of HARQ processes.

In a (2-2)nd method, a bit-size of the HARQ process number field of each BWP may be indicated via an RRC parameter. That is, the base station may configure the bit-size of the HARQ process number field for each BWP for the terminal, and the HARQ process number field of the configured bit-size may be included in DCI monitored in the corresponding BWP.

In a (2-3)rd method, a bit-size of the HARQ process number field for each subcarrier spacing may be indicated via an RRC parameter. That is, the base station may configure the bit-size of the HARQ process number field for each subcarrier spacing for the terminal, and the HARQ process number field of the configured bit-size may be included in DCI monitored in a BWP having the corresponding subcarrier spacing.

Embodiment 3: Type-3/Enhanced Type-3 HARQ-ACK Codebook Generation Method

A Type-3 HARQ-ACK codebook (or one-shot codebook) has a scheme of reporting all HARQ-ACK information about all serving cells, HARQ process IDs, the number of TBs per HARQ process, and the number of code block groups (CBGs) per TB, which are configured for the terminal. For example, if there are 2 serving cells, 16 HARQ processes for each serving cell, 1 TB for each HARQ process, and 2 CBGs for each TB, the terminal reports a total of 64 (=2*16*1*2) HARQ-ACK information bits.

The Type-3 HARQ-ACK codebook may list the HARQ-ACK information bits in a sequential order. The sequential order may be as follows.

HARQ-ACK information may be arranged in ascending order of indexes of the serving cells. Within the same serving cell, the HARQ-ACK information may be arranged in ascending order of HARQ process IDs.

When multiple TBs are included in the same HARQ process (e.g., for 2-TB transmission), HARQ-ACK information of a first TB may be arranged at a position preceding HARQ-ACK information of a second TB.

When the same TB includes multiple CBGs (i.e., for CBG-based PDSCH transmission), HARQ-ACK information may be arranged in ascending order of indexes of the CBGs.

Figure 15:
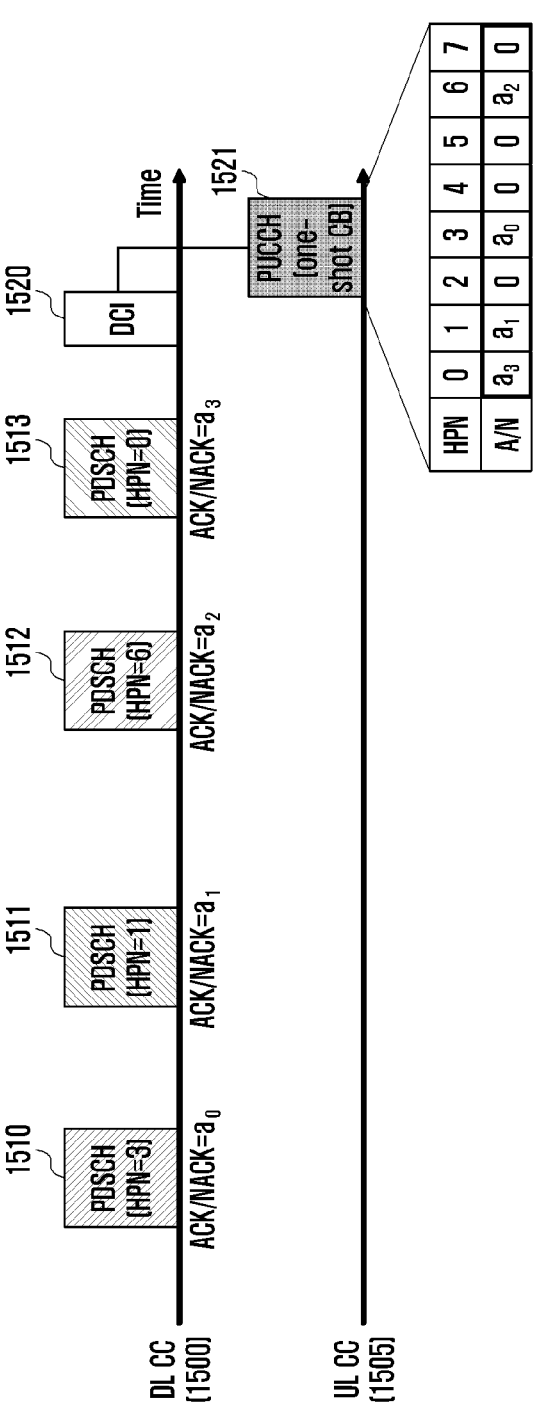
FIG. 15 is a diagram illustrating a method for Type-3 HARQ-ACK transmission according to an embodiment of the disclosure.

FIG. 15 is a diagram illustrating a method for Type-3 HARQ-ACK transmission according to an embodiment of the disclosure.

Referring to FIG. 15, it is assumed that a terminal is configured with one downlink serving cell (DL CC) 1500 and one uplink serving cell (UL CC) 1505. Here, the uplink serving cell is a cell for transmission of a PUCCH 1521. It may be assumed that the terminal is configured with 8 (i.e., n8) as the number of HARQ processes for the downlink serving cell 1500, and that one PDSCH is configured to transmit only one TB. In addition, it may be assumed that no CBG-based transmission is configured. A Type-3 HARQ-ACK codebook may be generated according to all serving cells, HARQ process IDs, and the number of TB for each HARQ process. Therefore, since the terminal is configured with 8 HARQ process IDs for one serving cell and 1 TB per HARQ process, the Type-3 HARQ-ACK codebook may include 8 bits of HARQ-ACK information.

The terminal may arrange 8 bits of the type-3 HARQ-ACK codebook in ascending order of the HARQ process IDs for the downlink serving cell 1500. Since the terminal is configured with 8 HARQ process IDs for the downlink serving cell 1500, HARQ-ACK information of HARQ process ID 0 may be located at a first place in the Type-3 HARQ-ACK codebook, HARQ-ACK information of HARQ process ID 1 may be located at a second place in the Type-3 HARQ-ACK codebook, HARQ-ACK information of HARQ process ID 2 may be located at a third place in the Type-3 HARQ-ACK codebook, HARQ-ACK information of HARQ process ID 3 may be located at a fourth place in the Type-3 HARQ-ACK codebook, HARQ-ACK information of HARQ process ID 4 may be located at a fifth place in the Type-3 HARQ-ACK codebook, HARQ-ACK information of HARQ process ID 5 may be located at a sixth place in the Type-3 HARQ-ACK codebook, HARQ-ACK information of HARQ process ID 6 may be located at a seventh place in the Type-3 HARQ-ACK codebook, and HARQ-ACK information of HARQ process ID 7 may be located at a last place in the Type-3 HARQ-ACK.

Referring to FIG. 15, the terminal may receive 4 PDSCHs in the downlink serving cell 1500. In chronological order, the terminal may receive PDSCH #0 1510, PDSCH #1 1511, PDSCH #2 1512, and PDSCH #3 1513. The HARQ process ID corresponding to each PDSCH may be indicated by an HARQ process number field of DCI. It is assumed that PDSCH #0 is indicated with HARQ process ID 3, and that HARQ-ACK information of PDSCH #0 is $a_0$. It is assumed that PDSCH #1 is indicated with HARQ process ID 1, and that HARQ-ACK information of PDSCH #1 is $a_1$. It is assumed that PDSCH #2 is indicated with HARQ process ID 6, and that HARQ-ACK information of PDSCH #2 is $a_2$. In addition, it is assumed that PDSCH #3 is indicated with HARQ process ID 0, and that HARQ-ACK information of PDSCH #3 is $a_3$. The terminal may add the HARQ-ACK information of $a_0$, $a_1$, $a_2$, and $a_3$ to the Type-3 HARQ-ACK codebook in ascending order of the HARQ process IDs. That is, since the HARQ process ID of PDSCH #0 is 3, $a_0$ which is HARQ-ACK of PDSCH #0 may be included in a fourth bit of the Type-3 HARQ-ACK codebook. Since the HARQ process ID of PDSCH #1 is 1, $a_1$ which is HARQ-ACK of PDSCH #1 may be included in a second bit of the Type-3 HARQ-ACK codebook. Since the HARQ process ID of PDSCH #2 is 6, $a_2$ which is HARQ-ACK of PDSCH #2 may be included in a seventh bit of the Type-3 HARQ-ACK codebook. Finally, since the HARQ process ID of PDSCH #3 is 0, as which is HARQ-ACK of PDSCH #3 may be included in a first bit of the Type-3 HARQ-ACK codebook. For reference, in the Type-3 HARQ-ACK codebook, NACK (or 0) may be included for an HARQ process ID for which reception has failed or an HARQ process ID for which feedback has already been transmitted to a base station.

The terminal may receive DCI 1520 indicating transmission of the Type-3 HARQ-ACK codebook in the downlink serving cell 1500. The terminal may receive, from the DCI, an indication of a PUCCH 1521 resource for transmission of the Type-3 HARQ-ACK codebook. The terminal may transmit the 8-bit Type-3 HARQ-ACK codebook on the PUCCH resource. According to a separate configuration, in the Type-3 HARQ-ACK codebook, it may be possible to report, in addition to HARQ-ACK information, an NDI value recently received by the terminal for each HARQ process and for all serving cells. Based on a corresponding NDI value, the base station may determine whether a PDSCH received for each HARQ process of the terminal is determined to be initial transmission or is determined to be retransmission. When there is no separate report of a corresponding NDI value, if HARQ-ACK information has already been reported for a specific HARQ process before the base station receives DCI for requesting of the Type-3 HARQ-ACK codebook, the terminal may map a corresponding HARQ process to NACK, and otherwise may map an HARQ-ACK information bit to a PDSCH received for each corresponding HARQ process.

Each of the number of serving cells, the number of HARQ processes, the number of TBs, and the number of CBGs may be configured, and if there is no separate configuration, the terminal may consider that the number of serving cells is 1, the number of HARQ processes is 8, the number of TB is 1, and the number of CBG is 1. In addition, the number of HARQ processes may vary for each serving cell. In addition, the number of TBs may have a different value for each serving cell or for each BWP within a serving cell. In addition, the number of CBGs may vary for each serving cell.

One of reasons that the Type-3 HARQ-ACK codebook is required may be occurrence of a case where the terminal cannot transmit a PUSCH or a PUCCH including HARQ-ACK information for a PDSCH due to a channel access failure, overlapping with another channel having a high priority, etc. Therefore, it is reasonable for the base station to request reporting of only corresponding HARQ-ACK information without needing to reschedule a separate PDSCH. Accordingly, for the terminal, Type-3 HARQ-ACK codebook transmission and scheduling of a PUCCH resource for the codebook transmission may be possible via a higher signal or an L1 signal (e.g., a specific field in DCI) from the base station.

The terminal may include, in a DCI format, an indicator indicating the Type-3 HARQ-ACK codebook transmission. The indicator may indicate 0 or 1.

If the terminal receives a DCI format including 1 as a value of a field for requesting Type-3 HARQ-ACK codebook transmission, the terminal may determine a PUCCH or PUSCH resource for transmission of the Type-3 HARQ-ACK codebook in a specific slot indicated by the DCI format. In addition, the terminal may multiplex only the Type-3 HARQ-ACK codebook within the PUCCH or PUSCH of the corresponding slot. In addition, the terminal may assume that the DCI format is not for PDSCH scheduling. That is, fields for PDSCH transmission in the DCI format may not be used for PDSCH scheduling. Furthermore, the fields that are not used for PDSCH scheduling may be used for other purposes.

The Type-3 HARQ-ACK codebook should include HARQ-ACK information of all HARQ processes and all serving cells, based on information configured for the terminal. Therefore, an HARQ-ACK information bit for a PDSCH of an HARQ process, which is not actually used, should also be included as NACK in the codebook. Accordingly, there is a disadvantage that a size of the Type-3 HARQ-ACK codebook is large. Therefore, there is a possibility that uplink transmission coverage or transmission reliability decreases as a size of an uplink control information bit increases. An HARQ-ACK codebook having a size smaller than that of the Type-3 HARQ-ACK codebook is required. Such a codebook may be referred to as an enhanced Type-3 HARQ-ACK codebook. As an example, an enhanced Type-3 HARQ-ACK codebook may be configured as follows.

Type A: a subset of a total set of (configured) serving cells
Type B: a subset of a total set of (configured) HARQ process IDs
Type C: a subset of a total set of (configured) TB indexes
Type D: a subset of a total set of (configured) CBG indexes
Type E: a combination of at least two of types A to D The enhanced Type-3 HARQ-ACK codebook may have characteristics of at least one of types A to E, and can be configured by one or multiple sets. The enhanced Type-3 HARQ-ACK codebook may include the entire set of types A to E instead of a subset. As for the meaning of multiple sets, for example, it is possible that type A and type B exist, or that different subsets exist even for type A.

The terminal may be indicated with a type of the Enhanced Type-3 HARQ-ACK codebook by a higher-layer signal, an L1 signal, or a combination thereof. For example, as in [Table 28], it may be possible that a set configuration for HARQ-ACK information bits to be reported in each enhanced Type-3 HARQ-ACK codebook is indicated via a higher-layer signal, and that one of these values is indicated by an L1 signal. As in [Table 28], it may be possible to individually configure, via a higher-layer signal, a type of the enhanced Type-3 HARQ-ACK codebook configured for each index. For convenience, such a table may be referred to as an enhanced Type-3 HARQ-ACK codebook type table.

For a specific index (e.g., index 3 in [Table 28]) of the enhanced Type-3 HARQ-ACK codebook type table, it is also possible to use a Type-3 HARQ-ACK codebook for reporting all HARQ-ACK information bits. If not separately indicated by a higher signal or there is no higher signal, it may be determined that the Type-3 HARQ-ACK codebook is used based on a default value (e.g., ACK or NACK states for all HARQ process IDs).

TABLE 28

| enhanced Type-3 HARQ-ACK codebook type table | |
|---|---|
| Index | Enhanced Type-3 HARQ-ACK codebook configuration |
| 1 | Serving cell i, HARQ process ID(0~7), TB 1 |
| 2 | Serving cell i, HARQ process ID(8~11), TB 1 |
| 3 | Type-3 HARQ-ACK codebook |
| . . . | . . . |

For example, when the terminal receives a value indicated by index 1, the terminal may report an enhanced Type-3 HARQ-ACK codebook including a total of 8 bits of HARQ-ACK information for serving cell i, HARQ process IDs (0 to 7), and TB 1 according to [Table 28]. If the terminal receives a value indicated by index 2, the terminal may report a total of 4 bits of HARQ-ACK information for serving cell i, HARQ process IDs (#8 to #11), and TB 1 according to [Table 28]. If the terminal receives a value indicated by index 3, the terminal may calculate a total number of HARQ-ACK bits by considering a serving cell set, a total number of HARQ processes per serving cell i, the number of TBs per HARQ process, and the number of CBGs per TB according to [Table 28]. [Table 28] is only an example, and a total number of indexes may be more then or fewer than this, and a range of an HARQ process value indicated by each index and/or information included in the enhanced Type-3 HARQ-ACK codebook may be different. In addition, [Table 28] may be information indicated by a higher-layer signal (e.g., RRC), and a specific index may be notified via DCI. It may be possible that selection of the specific index in [Table 28] may be indicated by a combination of or at least one of HARQ process ID, MCS, NDI, RV, frequency resource allocation information, or time resource allocation information in DCI fields. For example, a size of a DCI bit field indicating the specific index of [Table 28] may be determined by $$\lceil \log_2(N_{total}^{index}) \rceil.$$

Here, $$N_{total}^{index}$$

denotes a total number of indexes of [Table 28] configured via a higher signal.

Figure 16:
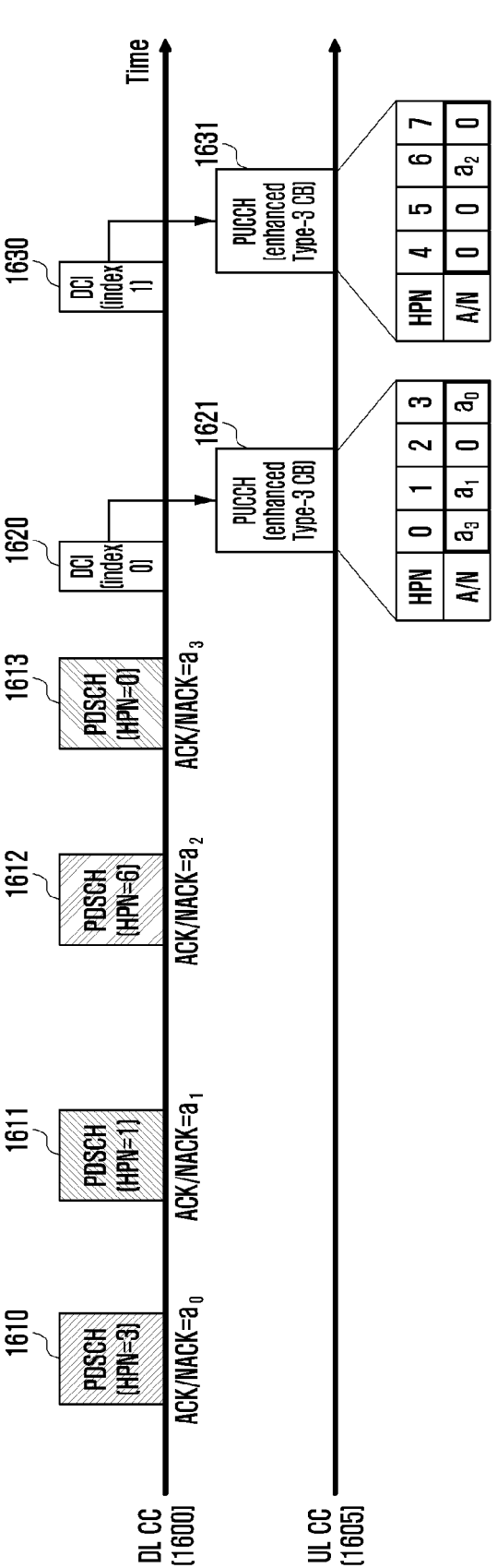
FIG. 16 is a diagram illustrating a method of enhanced Type-3 HARQ-ACK transmission according to an embodiment of the disclosure.

FIG. 16 illustrates a method of transmitting an enhanced type-3 HARQ-ACK codebook when the enhanced type-3 HARQ-ACK codebook is configured for a terminal according to an embodiment of the disclosure.

Serving cell configuration, HARQ process number configuration, etc. of the terminal are the same as those in FIG. 15. Unlike in FIG. 15, the terminal may be configured with enhanced Type-3 HARQ-ACK codebook transmission. For example, when index 0 is indicated in DCI 1620 for triggering enhanced Type-3 HARQ-ACK codebook transmission, an enhanced Type-3 HARQ-ACK codebook 1621 to be transmitted by the terminal may include only HARQ-ACK information for HARQ processes of $\{0, 1, 2, 3\}$ and may not include HARQ-ACK information for HARQ processes of $\{4, 5, 6, 7\}$ from among 8 HARQ processes. For example, when index 1 is indicated in DCI 1630 for triggering enhanced Type-3 HARQ-ACK codebook transmission, an enhanced Type-3 HARQ-ACK codebook 1631 to be transmitted by the terminal may include only HARQ-ACK information for HARQ processes of $\{4, 5, 6, 7\}$ and may not include HARQ-ACK information for HARQ processes of $\{0, 1, 2, 3\}$ from among 8 HARQ processes. Although not illustrated in FIG. 16, an index other than indexes 0 and 1 may be further indicated, and when the index is indicated, an enhanced Type-3 HARQ-ACK codebook including only HARQ-ACK information for an HARQ process corresponding to the index may be transmitted.

Referring to FIG. 15, the terminal may determine the size of the Type-3 HARQ-ACK codebook according to the number of HARQ processes in the downlink serving cell. As described above, in Rel-15 or Rel-16 NR, the terminal may be configured with the number of HARQ processes common to all BWPs of one serving cell from the base station. In other words, the terminal always uses the same number of HARQ processes regardless of which BWP is an active BWP. However, a BWP having a subcarrier spacing of 480 kHz or 960 kHz, which is newly introduced in Rel-17, may be separately indicated with the number of HARQ processes, which exceeds 16 and is equal to or less than 32. That is, the number of available HARQ processes may vary depending on which BWP is an active BWP, and accordingly, the size of the Type-3 HARQ-ACK codebook may vary. Therefore, a method for solving this problem will be described in detail.

[Method 1: Generating Type-3 HARQ-ACK Codebook by Considering all BWPs of Serving Cell]

In the first method of the disclosure, the terminal may generate a Type-3 HARQ-ACK codebook, based on a union of HARQ processes of all BWPs configured from the base station.

More specifically, it may be assumed that the terminal is configured with multiple BWPs. For convenience, description is provided using two BWPs, but the following description may also be applied to more than two BWPs. A first BWP may include first HARQ processes, and a second BWP may include second HARQ processes.

For example, the HARQ processes may be consecutive HARQ processes starting from 0. In this case, the first HARQ processes of the first BWP may be $\{\#0, \#1, \ldots, \#(N_1-1)\}$. Here, $N_1$ is the number of HARQ processes of the first BWP. In addition, the second HARQ processes of the second BWP may be $\{\#0, \#1, \ldots, \#(N_2-1)\}$. Here, $N_2$ is the number of HARQ processes of the second BWP.

When generating the Type-3 HARQ-ACK codebook, the terminal may include HARQ-ACK information for all HARQ processes in all BWPs. That is, the HARQ processes included in the Type-3 HARQ-ACK codebook generated by the terminal may be $\{\#0, \#1, \ldots, \#(N_{max}-1)\}$.

Here, $N_{max}$ is a maximum value among the number of HARQ processes in each BWP. That is, when $N_1$ is configured as the number of HARQ processes for the first BWP, and $N_2$ is configured as the number of HARQ processes for the second BWP, $N_{max}$ may be $max\{N_1, N_2\}$ (i.e., a greater value among $N_1$ and $N_2$).

As another example, the HARQ processes may be any HARQ processes (i.e., not consecutive HARQ processes starting from #0). In this case, the first HARQ processes of the first BWP may be $\{\#i, i \in P_1\}$. Here, $P_1$ is a set of available HARQ process IDs of the first BWP. The second HARQ processes of the second BWP may be $\{\#i, i \in P_2\}$. Here, $P_2$ is a set of available HARQ process IDs of the second BWP.

When generating the Type-3 HARQ-ACK codebook, the terminal may include HARQ-ACK information for all HARQ processes in all BWPs. That is, the HARQ processes included in the Type-3 HARQ-ACK codebook generated by the terminal may be $\{\#i, i \in P_{tot}\}$. Here, $P_{tot}$ is a union of the sets of HARQ process IDs of the respective BWPs. That is, when set $P_1$ of the available HARQ process IDs of the first BWP is configured and set $P_2$ of the available HARQ process IDs of the second BWP is configured, $P_{tot}$ may be $P_1$ U $P_2$ (i.e., a union of $P_1$ and $P_2$).

According to the first method, the terminal generates the Type-3 HARQ-ACK codebook, based on the union of the configured sets of HARQ process IDs of all BWPs, and may thus fail to receive a PDSCH for some HARQ processes. In this case, HARQ-ACK information for the HARQ processes in the Type-3 HARQ-ACK codebook may be NACK (or 0).

Some BWPs may be BWPs that the terminal does not use for PDSCH reception. For example, such BWPs may include a dormant BWP. The terminal may use a dormant BWP as an active BWP in order to prevent power waste of an Scell (secondary cell). PDCCH monitoring may not be performed in the dormant BWP. As another example, the some BWPs may include a default BWP. A default BWP is a BWP that the terminal uses when a BWP inactive timer expires. Therefore, no PDSCH may be received in the default BWP. As another example, the some BWPs may include an initial BWP. An initial BWP is a BWP having a BWP index of 0, and may be configured by a frequency band of CORESET0 configured in a PBCH or may be configured in an SIB. Since this initial BWP is used for initial access or random-access of the terminal, the BWP may be a BWP that is not used to receive a unicast PDSCH transmitted to the terminal.

For the BWP that is not used for PDSCH reception, since no PDSCH is separately received, the number of HARQ processes may not be configured. In this case, when generating the Type-3 HARQ-ACK codebook, the number of HARQ processes of the BWP that is not used for PDSCH reception may be assumed to be 8. In addition, HARQ process IDs that are used may be $\{\#0, \#1, \#2, \#3, \#4, \#5, \#6, \#7\}$. As another example, when generating the Type-3 HARQ-ACK codebook, the number of HARQ processes of the BWP that is not used for PDSCH reception may be assumed to be 0. When the number of HARQ processes of the BWP that is not used for PDSCH reception is assumed to be 0, the terminal may generate the Type-3 HARQ-ACK codebook by using only the number of HARQ processes of the BWP used for PDSCH reception, except for the number of HARQ processes of the BWP that is not used for PDSCH reception.

In the aforementioned first method, the number of HARQ processes in each BWP has been described, but the method may be expanded to the number of TBs in each BWP or the number of CBGs in each BWP. Such expansion may be as follows.

The terminal may be configured with a different number of TBs per PDSCH for each BWP of a serving cell. For example, the terminal may be configured to include up to 1 TB per PDSCH for a first BWP, and may be configured to include up to 2 TB per PDSCH for a second BWP. In this case, the terminal may generate a Type-3 HARQ-ACK codebook, based on a larger number of TBs per PDSCH among the configured numbers of TBs for the BWPs. That is, the terminal may generate the Type-3 HARQ-ACK codebook, based on 2 because the larger number of TBs among the numbers of TBs for the first BWP and the second BWP is 2 for the second BWP. That is, 2 bits of HARQ-ACK information may be generated per HARQ process ID of the Type-3 HARQ-ACK codebook. Here, a first bit may be HARQ-ACK for a first TB, and a second bit may be HARQ-ACK for a second TB.

If a PDSCH actually received by the terminal includes only one TB, HARQ-ACK corresponding to the second TB in the type-3 HARQ-ACK codebook may be NACK (or 0).

The terminal may be configured with different CBG transmission configurations for respective BWPs of the serving cell. Here, the terminal includes 1 TB per PDSCH equally in all BWPs. For example, for the first BWP and the second BWP, the terminal may be configured with CBG-based transmission. A first CBG number ($N_{CBG,1}$) may be configured for the first BWP, and a second CBG number ($N_{CBG,2}$) may be configured for the second BWP. In addition, for a third BWP, the terminal may not be configured with CBG-based transmission. Here, it is assumed that the second CBG number is greater than the first CBG number. In this case, the terminal may generate a Type-3 HARQ-ACK codebook, based on a greatest CBG number among the configured CBG numbers for the BWPs. For reference, when CBG-based transmission is not configured, the number of CBGs may be assumed to be 1. That is, the terminal may generate the Type-3 HARQ-ACK codebook, based on the second BWP for which a larger number of CBGs is configured from among the first BWP, the second BWP, and the third BWP. That is, $N_{CBG,max}$ bits of HARQ-ACK information may be generated per HARQ process ID of the Type-3 HARQ-ACK codebook. Here, an n-th (n=1, 2, . . . , $N_{CBG,\ max}$) bit is HARQ-ACK for an n-th CBG. Here, $N_{CBG,max}=\max\{N_{CBG,1}, N_{CBG,2}, N_{CBG,3}\}$.

If a PDSCH actually received by the terminal corresponds to TB-based transmission rather than CBG-based transmission (i.e., for a PDSCH received in the third BWP), a first bit of $N_{CBG,max}$ bits of an HARQ process ID corresponding to the PDSCH may include HARQ-ACK of the TB-based transmission, and the remaining $N_{CBG,max}-1$ bits may be NACK (or 0). If a PDSCH received by the terminal corresponds to CBG-based transmission, but the number of CBGs is fewer than $N_{CBG,max}$, bits corresponding to preceding CBG numbers from among $N_{CBG,max}$ bits of an HARQ process ID corresponding to the PDSCH may include HARQ-ACK of as many CBGs as the number of CBGs, and the remaining bits may be NACK (or 0).

Including different numbers of TBs per PDSCH in all BWPs are as follows. For example, for the first BWP and the second BWP, the terminal may be configured with CBG-based transmission. A first CBG number ($N_{CBG,1}$) may be configured for the first BWP, and a second CBG number ($N_{CBG,2}$) may be configured for the second BWP. In addition, for the third BWP, the terminal may not be configured with CBG-based transmission. In addition, a first number ($N_{TB,1}$) of TBs per PDSCH may be configured for the first BWP, a second number of TBs per PDSCH may be configured for the third BWP.

The terminal may generate a Type-3 HARQ-ACK codebook, based on a greatest number among the products of the configured numbers of CBGs and the configured numbers of TBs among those configured for the BWPs. For reference, when CBG-based transmission is not configured, the number of CBGs may be assumed to be 1. That is, the terminal may generate the Type-3 HARQ-ACK codebook, based on a BWP for which the product of a larger number of CBGs and a larger number of TBs is configured from among the first BWP, the second BWP, and the third BWP. That is, $N_{max}$ bits of HARQ-ACK information may be generated per HARQ process ID of the Type-3 HARQ-ACK codebook. Here, an n-th (n=1, 2, . . . , $N_{max}$) bit is HARQ-ACK for an n-th CBG. Here, $N_{max}=\max\{N_{CBG,1}*N_{TB,1}, N_{CBG,2}*N_{TB,2}, N_{CBG,3}*N_{TB,3}\}$. For reference, for 2 TB, a sequence of CBGs is to first set CBGs included in a first TB and then set CBGs included in a second TB.

If a PDSCH actually received by the terminal corresponds to TB-based transmission rather than CBG-based transmission (i.e., for a PDSCH received in the third BWP), bits of preceding TB numbers from among $N_{max}$ bits of an HARQ process ID corresponding to the PDSCH may include HARQ-ACK of the TB(s) of the TB-based transmission, and the remaining bits may be NACK (or 0).

If a PDSCH received by the terminal corresponds to CBG-based transmission, but the product of the number of CBGs and the number of TBs is smaller than $N_{max}$, bits corresponding to preceding CBG numbers from among $N_{max}$ bits of an HARQ process ID corresponding to the PDSCH may include HARQ-ACK of as many CBGs as the number of CBGs of the first TB, and if 2 TBs exist for the PDSCH, bits corresponding to subsequent CBG numbers may include HARQ-ACK of as many CBGs as the number of CBGs of the second TB, and the remaining bits may be NACK (or 0).

The terminal may generate a Type-3 HARQ-ACK codebook, based on the product of a greatest number of the configured numbers of CBGs and a greatest number of the configured numbers of TBs among those configured for the BWPs. For reference, when CBG-based transmission is not configured, the number of CBGs may be assumed to be 1. That is, the terminal may generate the Type-3 HARQ-ACK codebook, based on a BWP for which the product of the greatest number of the numbers of CBGs and the greatest number of the numbers of TBs is configured from among the first BWP, the second BWP, and the third BWP. That is, $N_{max}$ bits of HARQ-ACK information may be generated per HARQ process ID of the Type-3 HARQ-ACK codebook. Here, when $N_{TB,max}$ is 1, an n-th (n=1, 2, . . . , $N_{max}$) bit is HARQ-ACK for an n-th CBG. Here, when $N_{TB,max}$ is 2, an n-th (n=1, 2, . . . , $N_{max}/2$) bit is HARQ-ACK for an n-th CBG of a first TB, and an n-th (n=$N_{max}/2+1$, $N_{max}/2+2$, . . . , $N_{max}$) bit is HARQ-ACK for an (n–$N_{max}/2$)th CBG of a second TB. Here, $N_{max}=N_{CBG,max}*N_{TS,max}$. Here, $N_{CBG,max}=\max\{N_{CBG,1},N_{CBG,2},N_{CBG,3}\}$ and $N_{TB,max}=\max\{N_{TB,1},N_{TB,2},N_{TB,3}\}$.

If a PDSCH actually received by the terminal corresponds to TB-based transmission rather than CBG-based transmission (i.e., for a PDSCH received in the third BWP), a first bit of $N_{max}$ bits of an HARQ process ID corresponding to the PDSCH includes HARQ-ACK of a first TB of the TB-based transmission, and an ($N_{max}+1$)th bit includes HARQ-ACK of a second TB of the TB-based transmission. Here, the remaining bits may be NACK (or 0).

If a PDSCH received by the terminal corresponds to CBG-based transmission, but the product of the number of CBGs and the number of TBs is smaller than $N_{max}$, bits corresponding to preceding CBG numbers in the first half of $N_{max}$ bits among the $N_{max}$ bits include HARQ-ACK of as many CBGs as the number of CBGs of the first TB, and bits corresponding to preceding CBG numbers in the remaining half of $N_{max}$ bits among the $N_{max}$ bits include HARQ-ACK of as many CBGs as the number of CBGs of the second TB. Here, the remaining bits may be NACK (or 0).

Bits corresponding to preceding CBG numbers from among $N_{max}$ bits of an HARQ process ID corresponding to the PDSCH may include HARQ-ACK of as many CBGs as the number of CBGs of the first TB, and if 2 TBs exist for the PDSCH, bits corresponding to subsequent CBG numbers may include HARQ-ACK of as many CBGs as the number of CBGs of the second TB, and the remaining bits may be NACK (or 0).

[Method 2: Generating Type-3 HARQ-ACK Codebook by Considering Only Active BWP of Serving Cell]

In the second method of the disclosure, the terminal may generate a Type-3 HARQ-ACK codebook, based on the number of HARQ processes of an always active BWP among BWPs configured from the base station.

More specifically, it may be assumed that the terminal is configured with multiple BWPs. For convenience, description is provided using two BWPs, but the following description may also be applied to more than two BWPs. A first BWP may include first HARQ processes, and a second BWP may include second HARQ processes.

Only one BWP may be activated at one time point for the terminal. The terminal may receive a downlink signal (PDCCH monitoring, PDSCH reception, etc.) only in the active BWP. A downlink signal is not received in a BWP other than the active BWP. Therefore, the terminal may determine a BWP activated at a specific time point, and may generate a Type-3 HARQ-ACK codebook, based on the activated BWP. If the terminal determines the first BWP to be an active BWP, the Type-3 HARQ-ACK codebook may be generated based on first HARQ processes of the first BWP. If the terminal determines the second BWP to be an active BWP, the Type-3 HARQ-ACK codebook may be generated based on second HARQ processes of the second BWP.

[Active BWP Determination Method]

Figure 17:
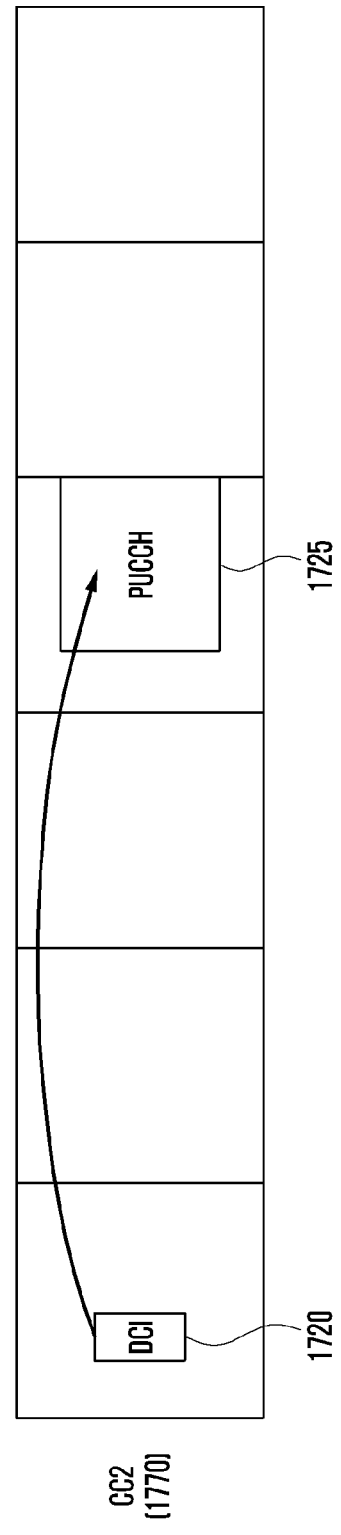
FIG. 17 is an embodiment of generating a Type-3 HARQ-ACK codebook when different numbers of HARQ processes are assigned to multiple BWPs according to an embodiment of the disclosure.

FIG. 17 is an embodiment of generating a Type-3 HARQ-ACK codebook when different numbers of HARQ processes are assigned to multiple BWPs according to an embodiment of the disclosure.

In the above, it has been noted that a terminal may determine an active BWP at a specific time point. However, referring to FIG. 17, when a terminal receives BWP switching DCI 1710 indicating BWP switching from BWP1 1700 to BWP2 1705, it may be ambiguous which BWP is an active BWP during a time interval 1750 between reception of the DCI and a time point of receiving a PDSCH 1715 scheduled by the BWP switching DCI.

In addition, it may be ambiguous which time point is the specific time point. For example, referring to FIG. 17, it is ambiguous whether a time point of receiving DCI 1720 indicating Type-3 HARQ-ACK codebook transmission to one cell is the specific time point to determine the active BWP, or whether a time point of transmitting a PUCCH 1725 including the Type-3 HARQ-ACK codebook is the specific time point.

Therefore, hereinafter, the disclosure proposes a method of determining an active BWP for Type-3 HARQ-ACK codebook transmission.

Referring to FIG. 17, the terminal may determine an active BWP, based on at least two of the four transmission or reception points.

Time point of receiving the DCI 1710 indicating BWP switching

Time point of receiving the PDSCH 1715 scheduled by the DCI indicating BWP switching Time point of receiving the DCI 1720 indicating Type-3 HARQ-ACK codebook transmission Time point of transmitting the PUCCH 1725 on which a Type-3 HARQ-ACK codebook is transmitted As an example, the following four combinations may be considered based on at least two of the four transmission or reception points.

In a first combination, an active BWP may be determined based on the time point of receiving the DCI 1710 indicating BWP switching and the time point of receiving the DCI 1720 indicating Type-3 HARQ-ACK codebook transmission. More specifically, if the time point of receiving the DCI 1720 indicating Type-3 HARQ-ACK codebook transmission is earlier than the time point of receiving the DCI 1710 indicating BWP switching, a BWP before the BWP switching may be determined to be an active BWP. Conversely, if the time point of receiving the DCI 1720 indicating Type-3 HARQ-ACK codebook transmission is later than the time point of receiving the DCI 1710 indicating BWP switching, a BWP after the BWP switching may be determined to be an active BWP.

In the first combination, the time point of receiving the DCI 1720 indicating Type-3 HARQ-ACK codebook transmission is used as a specific time point (i.e., the active BWP is determined at the time point of receiving the DCI 1720 indicating Type-3 HARQ-ACK codebook transmission), and switching of the active BWP may be determined based on the time point of receiving the DCI 1710 indicating BWP switching. In other words, until the time point of receiving the DCI 1710 indicating BWP switching, the active BWP may be a BWP before switching, and after the time point of receiving the DCI 1710 indicating BWP switching, the active BWP may be a BWP after switching.

In a second combination, an active BWP may be determined based on the time point of receiving the PDSCH 1715 scheduled by the DCI indicating BWP switching and the time point of receiving the DCI 1720 indicating Type-3 HARQ-ACK codebook transmission. More specifically, if the time point of receiving the DCI 1720 indicating Type-3 HARQ-ACK codebook transmission is earlier than the time point of receiving the PDSCH 1715 scheduled by the DCI indicating BWP switching, a BWP before the BWP switching may be determined to be an active BWP. Conversely, if the time point of receiving the DCI 1720 indicating Type-3 HARQ-ACK codebook transmission is later than the time point of receiving the PDSCH 1715 scheduled by the DCI indicating BWP switching, a BWP after the BWP switching may be determined to be an active BWP.

In the second combination, the time point of receiving the DCI 1720 indicating Type-3 HARQ-ACK codebook transmission is used as a specific time point (i.e., the active BWP is determined at the time point of receiving the DCI 1720 indicating Type-3 HARQ-ACK codebook transmission), and switching of the active BWP may be determined based on the time point of receiving the PDSCH 1715 scheduled by the DCI indicating BWP switching. In other words, until the time point of receiving the PDSCH 1715 scheduled by the DCI indicating BWP switching, the active BWP may be a BWP before switching, and after the time point of receiving the PDSCH 1715 scheduled by the DCI indicating BWP switching, the active BWP may be a BWP after switching.

In a third combination, an active BWP may be determined based on the time point of receiving the DCI 1710 indicating BWP switching and the time point of transmitting the PUCCH 1725 on which a Type-3 HARQ-ACK codebook is transmitted. More specifically, if the time point of transmitting the PUCCH 1725 on which the Type-3 HARQ-ACK codebook is transmitted is earlier than the time point of receiving the DCI 1710 indicating BWP switching, a BWP before the BWP switching may be determined to be an active BWP. Conversely, if the time point of transmitting the PUCCH 1725 on which the Type-3 HARQ-ACK codebook is transmitted is later than the time point of receiving the DCI 1710 indicating BWP switching, a BWP after the BWP switching may be determined to be an active BWP.

In the third combination, the time point of transmitting the PUCCH 1725 on which the Type-3 HARQ-ACK codebook is transmitted is used as a specific time point (i.e., the active BWP is determined at the time point of transmitting the PUCCH 1725 on which the Type-3 HARQ-ACK codebook is transmitted), and switching of the active BWP may be determined based on the time point of receiving the DCI 1710 indicating BWP switching. In other words, until the time point of receiving the DCI 1710 indicating BWP switching, the active BWP may be a BWP before switching, and after the time point of receiving the DCI 1710 indicating BWP switching, the active BWP may be a BWP after switching.

In a fourth combination, an active BWP may be determined based on the time point of receiving the PDSCH 1715 scheduled by the DCI indicating BWP switching and the time point of transmitting the PUCCH 1725 on which the Type-3 HARQ-ACK codebook is transmitted. More specifically, if the time point of transmitting the PUCCH 1725 on which the Type-3 HARQ-ACK codebook is transmitted is earlier than the time point of receiving the PDSCH 1715 scheduled by the DCI indicating BWP switching, a BWP before the BWP switching may be determined to be an active BWP. Conversely, if the time point of transmitting the PUCCH 1725 on which the Type-3 HARQ-ACK codebook is transmitted is later than the time point of receiving the PDSCH 1715 scheduled by the DCI indicating BWP switching, a BWP after the BWP switching may be determined to be an active BWP.

In the fourth combination, the time point of transmitting the PUCCH 1725 on which the Type-3 HARQ-ACK codebook is transmitted is used as a specific time point (i.e., the active BWP is determined at the time point of transmitting the PUCCH 1725 on which the Type-3 HARQ-ACK codebook is transmitted), and switching of the active BWP may be determined based on the time point of receiving the PDSCH 1715 scheduled by the DCI indicating BWP switching. In other words, until the time point of receiving the PDSCH 1715 scheduled by the DCI indicating BWP switching, the active BWP may be a BWP before switching, and after the time point of receiving the PDSCH 1715 scheduled by the DCI indicating BWP switching, the active BWP may be a BWP after switching.

The aforementioned four transmission or reception points may be determined as follows.

Time point of receiving the DCI 1710 indicating BWP switching: As a first example, the time point may be a start time point of a first symbol of a PDCCH on which the DCI is received. As a second example, the time point may be an end time point of a last symbol of the PDCCH on which the DCI is received. As a third example, the time point may be an end time point of a symbol that is a certain number of slots after the last symbol of the PDCCH on which the DCI is received. Here, the certain number may be an X value in Table 29 depending on a subcarrier spacing ($\mu$).

TABLE 29

| $\mu$ | NR slot length (ms) | Interruption length X (slot) |
|---|---|---|
| 0 | 1 | 1 |
| 1 | 0.5 | 1 |
| 2 | 0.25 | 3 |
| 3 | 0.125 | 5 |
| 5 | 0.03125 | 17 |
| 6 | 0.015625 | 33 |

Time point of receiving the PDSCH 1715 scheduled by the DCI indicating BWP switching: As a first example, the time point may be a start time point of a first symbol in which the PDSCH is received. As a second example, the time point may be a start time point of a first symbol of a slot in which the PDSCH is received. As a third example, the time point may be an end time point of a last symbol in which the PDSCH is received. As a fourth example, the time point may be an end time point of a last symbol of the slot in which the PDSCH is received. Time point of receiving the DCI 1720 indicating Type-3 HARQ-ACK codebook transmission: As a first example, the time point may be a start time point of a first symbol of a PDCCH on which the DCI is received. As a second example, the time point may be an end time point of a last symbol of the PDCCH on which the DCI is received. As a third example, the time point may be an end time point of a symbol that is a certain number of symbols after the last symbol of the PDCCH on which the DCI is received. Here, the certain number may be an N value in Table 30 below.

TABLE 30

If processingType 2Enabled of PDSCH-ServingCellConfig is set to enable for the serving cell, N = 5 for $\mu$ = 0, N = 5.5 for $\mu$ = 1, and N = 11 for $\mu$ = 2, otherwise, N = 10 for $\mu$ = 0, N = 12 for $\mu$ = 1, N = 22 for $\mu$ = 2, N = 25 for $\mu$ = 3, N = 100 for $\mu$ = 5, and N = 200 for $\mu$ = 6 wherein $\mu$ corresponds to the smallest SCS configuration between the SCS configuration of the PDCCH and the SCS configuration of a PUCCH carrying the HARQ-information Time point of transmitting the PUCCH 1725 on which a Type-3 HARQ-ACK codebook is transmitted: As a first example, the time point may be a start time point of a first symbol of the PUCCH. As a second example, the time point may be an end time point of a last symbol of the PUCCH. As a third example, the time point may be a start time point of a symbol preceding by a certain number of symbols in the PUCCH. Here, the certain number may be the N value in Table 30 above.

[Interval in which Reception of BWP Switching DCI is Prohibited]

In method 2 of the disclosure, the terminal generates a Type-3 HARQ-ACK codebook, based on an active BWP. In addition, a method of determining an active BWP is disclosed. In addition to the above method, the following may be considered.

The terminal may expect not to receive DCI indicating BWP switching during a specific interval. That is, by not receiving DCI indicating BWP switching of the terminal, changes in HARQ-ACK information and a size of the Type-3 HARQ-ACK codebook may be prevented. More specifically, the interval in which DCI indicating BWP switching is not received may be determined as follows. During a certain time interval prior to the time point of transmitting the PUCCH 1725 on which the Type-3 HARQ-ACK codebook is transmitted, reception of a DCI format indicating BWP switching may not be expected. That is, when a DCI format indicating BWP switching is received during the interval, the terminal may disregard the DCI format.

The certain time interval may be represented by $N_3 \cdot (2048+144) \cdot k \cdot 2^{-\mu} \cdot T_C$ which is an absolute time unit. Here, $k=64$, $T_c=1/(\Delta f_{max} \cdot N_f)$, $\Delta f_{max}=480 \times 10^3$ Hz, and $\mu$ is a smaller value among a subcarrier spacing configuration of the PUCCH 1725 and a subcarrier spacing configuration of the PDCCH 1710 on which the DCI format is transmitted, and $N_3$ is as shown in Table 31.

TABLE 31

| If processingType2Enabled of PDSCH-ServingCellConfig is set to enable for the serving cell with the DCI format and for all serving cells with corresponding HARQ-ACK information multiplexed in the PUCCH transmission in the slot, $N_3 = 3$ for $\mu = 0$, $N_3 = 4.5$ for $\mu = 1$, $N_3 = 9$ for $\mu = 2$; otherwise, $N_3 = 8$ for $\mu = 0$, $N_3 = 10$ for $\mu = 1$, $N_3 = 17$ for $\mu = 2$, $N_3 = 20$ for $\mu = 3$, $N_3 = 100$ for $\mu = 5$, and $N_3 = 200$ for $\mu = 6$. |
| --- |

The certain time interval may be represented by $N_3$ which is the number of OFDM symbols. Here, $N_3$ is as shown in Table 31.

[Method 3: Generating Type-3 HARQ-ACK Codebook by Considering all BWPs and Active BWP of Serving Cell]

In case of aforementioned method 1, the number of HARQ processes is determined based on all BWPs in all serving cells, and a Type-3 HARQ-ACK codebook is generated based on the number of HARQ processes. Since the number of HARQ processes is determined based on all BWPs, the Type-3 HARQ-ACK codebook is generated based on a number greater than the number of actually used HARQ processes, resulting in high overhead. High overhead may consume an uplink control channel or reduce coverage. In addition, in case of aforementioned method 2, the number of HARQ processes is determined based on only an active BWP in all serving cells, and a Type-3 HARQ-ACK codebook is generated based on the number of HARQ processes. Since only an active BWP is considered, if DCI indicating BWP switching cannot be received, an active BWP may be erroneously determined. Therefore, method 2 may have potential ambiguity regarding a size and a configuration of the Type-3 HARQ-ACK codebook between a base station and the terminal.

In the third method of the disclosure to solve this problem, the terminal may determine the number of HARQ processes based on an activated BWP for some cells among serving cells configured from the base station, may determine the number of HARQ processes by considering all BWPs for the remaining some serving cells, and may generate a Type-3 HARQ-ACK codebook based on the number of HARQ processes.

The terminal may be configured with information of the serving cells from the base station.

The terminal may be configured with serving cells (e.g., a first serving cell), for which the number of HARQ processes is to be determined based on an active BWP, from the base station. HARQ-ACK information of the configured serving cells (e.g., the first serving cell) may be determined based on the active BWP, as in method 2. For example, the configured serving cells (e.g., the first serving cell) may be BWPs in which BWP switching does not occur frequently.

The terminal may be configured with serving cells (e.g., a second serving cell), for which the number of HARQ processes is to be determined based on all BWPs, from the base station. HARQ-ACK information of the configured serving cells (e.g., the second serving cell) may be determined based on all BWPs, as in method 1. For example, the configured serving cells (e.g., the second serving cell) may be BWPs in which BWP switching occurs frequently.

Without separate information configuration for the serving cells, which is associated with determination of the number of HARQ processes, from the base station, the terminal may perform determination as follows.

For example, HARQ-ACK information of Scells among the serving cells configured for the terminal may be determined based on the active BWP, as in method 2. HARQ-ACK information of a Pcell among the serving cells configured for the terminal may be determined based on all BWPs, as in method 1. This is because, for the Pcell, there may be frequent BWP switching to reduce power consumption of the terminal.

As another example, referring to FIG. 17, when the terminal receives a PDSCH in cell 1 1760 and cell 2 1770, and DCI triggering a Type-3 HARQ-ACK CB is received in cell 2, the terminal may determine HARQ-ACK information of cell 2 based on the active BWP, as in method 2. HARQ-ACK information of other cells may be determined based on all BWPs, as in method 1. This is because, since BWP switching may not occur within a time interval between reception of the DCI triggering the Type-3 HARQ-ACK CB and transmission of the Type-3 HARQ-ACK CB indicated by the DCI, there may be no ambiguity between the terminal and the base station even if the active BWP is used.

For example, based on embodiment 3, the terminal may operate as follows. When determining different numbers of HARQ process IDs according to BWPs, the terminal needs to determine a BWP for Type-3 HARQ-ACK codebook generation. Here, a Type-3 HARQ-ACK codebook may include one piece of HARQ-ACK information per HARQ process ID with respect to all HARQ process IDs of the BWP. The BWP for Type-3 HARQ-ACK codebook generation may be a BWP including a largest number of HARQ process IDs from among BWPs configured for the terminal, or may be one of active BWPs. When BWP switching DCI is received, the terminal may determine the active BWP, based on a time point of receiving the BWP switching DCI or a PDSCH scheduled by the DCI, and a time point of receiving DCI triggering Type-3 HARQ-ACK codebook transmission or a time point of transmitting the Type-3 HARQ-ACK codebook.

Embodiment 4: CG-UCI Generation Method

Configured grant (CG) PUSCH transmission may be configured for the terminal from the base station. When transmitting a CG PUSCH, the terminal may multiplex CG-UCI on the CG PUSCH and transmit the CG PUSCH. Embodiment 4 describes a method by which the terminal multiplexes CG-UCI on a CG PUSCH and transmits the CG PUSCH.

Table 32 shows a sequence and information included in v17.2.0 (2022-06) CG-UCI of TS38.212.

TABLE 32

| Field | Bitwidth |
| --- | --- |
| HARQ process number | 4 |
| Redundancy version | 2 |
| New data indicator | 1 |
| Channel Occupancy Time (COT) sharing information | [log$_2$C] if both higher layer parameter ul-toDL-COT-SharingED-Threshold and higher layer parameter cg-COT-SharingList are configured, or if both higher layer parameter ue-SemiStaticChannelAccessConfig and higher layer parameter cg-COT-SharingList are configured, or if higher layer parameter cg-COT-SharingList is configured in frequency range 2-2, where C is the number of combinations configured in cg-COT-SharingList; 1 if higher layer parameter ul-toDL-COT-SharingED-Threshold is not configured, and if higher layer parameter ue-SemiStaticChannelAccessConfig is not configured, and if higher layer parameter cg-COT-SharingOffset is configured; 0 otherwise; If a UE indicates COT sharing other than "no sharing" in a CG PUSCH within the UE's initiated COT, the UE should provide consistent COT sharing information in all the subsequent CG PUSCHs, if any, occurring within the same UE's initiated COT such that the same DL starting point and duration are maintained. |

Referring to Table 32, CG-UCI may include a 4-bit HARQ process number, a 2-bit redundancy version, a 1-bit new data indicator (NDI), and COT sharing information. The HARQ process number (or HARQ process ID) of the CG PUSCH may be transmitted via an HARQ process number field. For reference, a method of determining an HARQ process number of a transport block (TB) transmitted by the CG PUSCH will be described later. The redundancy version may include a redundancy version indicating a position of a bit transmitted in a circular buffer of an LDPC code of the TB transmitted by the CG PUSCH. The NDI may indicate whether the TB transmitted by the CG-PUSCH is retransmission of a previous TB or transmission of a new TB.

The HARQ process number of the TB transmitted by the CG PUSCH may be determined as follows. In the disclosure, harq-ProcID-Offset2 indicates an offset used to derive HARQ process IDs. Parameter harq-ProcID-Offset2 may not be configured along with cg-RetransmissionTimer. cg-RetransmissionTimer indicates "the initial value of the configured retransmission timer in multiples of periodicity". A value of cg-RetransmissionTimer may be smaller than or equal to a value of configuredGrantTimer. Parameter cg-RetransmissionTimer may be configured along with parameter harq-ProcID-Offset.

If the terminal is not configured with both harq-ProcID-Offset2 and cg-RetransmissionTimer via a higher-layer signal from the base station, the HARQ process number (or HARQ process ID) of the CG-PUSCH may be determined by the following equation.

HARQ process ID=[floor(CURRENT_symbol/periodicity)] modulo nrofHARQ-Processes Here, CURRENT_symbol is an index of a first symbol in which the CG-PUSCH is transmitted, wherein CURRENT_symbol=SFN×numberOfSlotsPerFrame×numberOfSymbolsPerSlot+slot number in the frame×numberOfSymbolsPerSlot+symbol number in the slot. In addition, numberOfSlotsPerFrame and numberOfSymbolsPerSlot indicate the number of slots in a frame and the number of symbols in a slot. Periodicity is a period and is a unit of the number of symbols. nrofHARQ-Processes is the number of HARQ processes available for the CG-PUSCH. Here, the terminal may be configured with the periodicity and nrofHARQ-Processes via a higher-layer signal from the base station. Therefore, the CG-PUSCH may have, as the HARQ process number, one value among 0, 1, 2, . . . , nrofHARQ-Processes-1.

If the terminal is configured with harq-ProcID-Offset2 via a higher-layer signal from the base station, but is not configured with cg-RetransmissionTimer, the HARQ process number (or HARQ process ID) of the CG-PUSCH may be determined by the following equation.

HARQ process ID=[floor(CURRENT_symbol/periodicity)] modulo nrofHARQ-Processes+harq-ProcID-Offset2

Therefore, the CG-PUSCH may have, as the HARQ process number, one value among harq-ProcID-Offset2, harq-ProcID-Offset2+1, . . . , harq-ProcID-Offset2+nrofHARQ-Processes-1. If the terminal is configured with cg-RetransmissionTimer via a higher-layer signal from the base station, the terminal may select one HARQ process number among HARQ process numbers available for the CG PUSCH, and may transmit a TB corresponding to the HARQ process number to the CG PUSCH. Accordingly, in this case, the base station needs information on the received HARQ process number of the CG PUSCH. Therefore, the CG-UCI should include information on the HARQ process number selected by the terminal.

Referring to Table 32, the HARQ process number field of the CG-UCI transmitted by the terminal is 4 bits. Therefore, the terminal may indicate only up to 16 HARQ process numbers of 0, 1, . . . , 15 via the HARQ process number field. However, the HARQ process numbers that the terminal is able to use for the CG PUSCH may be up to 32. That is, the terminal may transmit the CG PUSCH by selecting one value among 0, 1, . . . , 31, but the CG-UCI includes only the 4-bit HARQ process number field. Embodiment 4 proposes a method to solve this problem.

In a first method, the terminal may include a HARQ process number field of 5 bits, instead of 4 bits, in CG-UCI. Here, a method of determining 4 bits and 5 bits may correspond to at least one of the following cases.

Case 1: For a CG PUSCH transmitted in frequency range (FR) 2-2, a 5-bit HARQ process number field may be included in CG-UCI. That is, a fixed 5-bit HARQ process number field may be included regardless of the number of HARQ process numbers actually used by the terminal. In this case, the HARQ process number field of the CG-UCI may be determined regardless of other signals and configurations of the terminal.

Case 2: The base station may configure, for the terminal, the number of HARQ process numbers for PUSCH transmission. Here, a PUSCH may include a CG PUSCH or a dynamic grant (DG) PUSCH. For reference, the CG PUSCH may refer to a PUSCH scheduled via a DCI format. More specifically, when the terminal is configured with nrof-HARQ-ProcessesForPUSCH-r17=n32 via a higher-layer signal from the base station, the terminal may include a 5-bit HARQ process number field in CG-UCI. nrofHARQ-ProcessesForPUSCH-r17 indicates the number of HARQ processes to be used for a PUSCH of a serving cell. n32 may correspond to 32 HARQ processes. In other cases (i.e., when parameter nrofHARQ-ProcessesForPUSCH-r17 is not configured), the terminal may include a 4-bit HARQ process number field in the CG-UCI. In addition, the terminal may include an HARQ process number used for a CG PUSCH in the 5-bit or 4-bit HARQ process number field. For reference, since the number of HARQ process numbers available for a CG PUSCH is always equal to or smaller than the number of HARQ process numbers for PUSCH transmission, the 5 bits or 4 bits are not insufficient to include the HARQ process number of the CG PUSCH.

Case 3: The base station may configure, for the terminal, the number of HARQ process numbers (e.g., nrofHARQ-Processes) for transmission of a CG PUSCH. Based on the number, the terminal may determine bits of an HARQ process number field of CG-UCI. For example, if nrof-HARQ-Processes is smaller than or equal to 16, the terminal may determine the bits of the HARQ process number of the CG-UCI to be 4 bits. In this case, the HARQ process number of the CG PUSCH is converted into a 4-bit binary number and may be included in the 4 bits. If nrofHARQ-Processes is greater than 16, the terminal may determine the bits of the HARQ process number of the CG-UCI to be 5 bits. In this case, the HARQ process number of the CG PUSCH is converted into a 5-bit binary number and may be included in the 5 bits.

Case 4: The base station may configure, for the terminal, the number of HARQ process numbers (e.g., nrofHARQ-Processes) or an offset value (harq-ProcID-Offset2) for transmission of a CG PUSCH. Based on the number of HARQ process numbers and the offset value, the terminal may determine bits of an HARQ process number field of CG-UCI. For example, if nrofHARQ-Processes is smaller than or equal to 16, the terminal may determine the bits of the HARQ process number of the CG-UCI to be 4 bits. The terminal may convert a value, which is obtained by subtracting the offset value (harq-ProcID-Offset2) from the HARQ process number of the CG PUSCH, into a 4-bit binary number and may include the obtained value in the 4 bits. For reference, the range of the value obtained by subtracting the offset value (harq-ProcID-Offset2) from the HARQ process number of the CG PUSCH is one value among 0, 1, . . . , nrofHARQ-Processes-1. Therefore, nrof-HARQ-Processes is smaller than or equal to 16, and may be thus expressed using a 4-bit HARQ process number field. If nrofHARQ-Processes is greater than 16, the terminal may determine the bits of the HARQ process number of the CG-UCI to be 5 bits. The terminal may convert the value, which is obtained by subtracting the offset value (harq-ProcID-Offset2) from the HARQ process number of the CG PUSCH, into a 5-bit binary number and may include the obtained value in the 5 bits. For reference, the range of the value obtained by subtracting the offset value (harq-ProcID-Offset2) from the HARQ process number of the CG PUSCH is one value among 0, 1, . . . , nrofHARQ-Processes-1. Therefore, nrofHARQ-Processes is greater than 16, and may be thus expressed using a 5-bit HARQ process number field.

Case 5: The base station may configure, for the terminal, the number of HARQ process numbers (e.g., nrofHARQ-Processes) or an offset value (harq-ProcID-Offset2) for transmission of a CG PUSCH. Based on the number of HARQ process numbers and the offset value, the terminal may determine bits of an HARQ process number field of CG-UCI. For example, if {(nrofHARQ-Processes)+(harq-ProcID-Offset2)} is smaller than or equal to 16, the terminal may determine the bits of the HARQ process number of the CG-UCI to be 4 bits. In this case, the terminal may convert the HARQ process number of the CG PUSCH into a 4-bit binary number and include the same in the 4 bits. For reference, the range of the HARQ process number of the CG PUSCH is one value among 0, 1, . . . , nrofHARQ-Processes+harq-ProcID-Offset2-1. Therefore, nrofHARQ-Processes+harq-ProcID-Offset2 is smaller than or equal to 16, and may be thus expressed using a 4-bit HARQ process number field. For example, if {(nrofHARQ-Processes)+(harq-ProcID-Offset2)} is greater than 16, the terminal may determine the bits of the HARQ process number of the CG-UCI to be 5 bits. The terminal may convert the HARQ process number of the CG PUSCH into a 5-bit binary number and include the same in the 5 bits. For reference, the range of the HARQ process number of the CG PUSCH is one value among 0, 1, . . . , nrofHARQ-Processes+harq-ProcID-Offset2-1. Therefore, nrofHARQ-Processes+harq-ProcID-Offset2 is greater than 16, and may be thus expressed using a 5-bit HARQ process number field.

Case 6: In the previous cases of cases 3, 4, and 5, it has been assumed that one CG PUSCH is configured. If the terminal has multiple CG PUSCH configurations, the terminal may be configured with multiple values of nrof-HARQ-Processes and/or harq-ProcID-Offset2. That is, one value of nrofHARQ-Processes and/or harq-ProcID-Offset2 may be configured for each CG PUSCH configuration. In this case, a value based on which the terminal determines a size of an HARQ process number field may be ambiguous. In order to resolve this ambiguity, for example, it may be assumed that sizes of HARQ process number fields of CG-UCI of all CG PUSCHs are the same. As a specific example, if an HARQ process number field determined by at least one CG PUSCH configuration is 5 bits, the HARQ process number fields of the CG-UCI included in all CG PUSCHs may be fixed to 5 bits. In addition, if an HARQ process number field determined by all CG PUSCH configurations is 4 bits, the CG-UCI of all CG PUSCHs may be 4 bits. For another example, sizes of different HARQ process number fields of the CG-UCI may be different for each CG PUSCH configuration. That is, the terminal may determine the sizes of the HARQ process number fields of the CG-UCI, based on nrofHARQ-Processes or harq-ProcID-Off-set2 configured for each PUSCH configuration. Additionally, if configurations of two CG PUSCHs include CG-UCI having different numbers of HARQ process number fields (e.g., 4 bits and 5 bits), and CG PUSCHs transmitted via the configurations of two CG PUSCHs are transmitted at the same time or frequency position, the base station may not be able to distinguish a CG PUSCH configuration via which a CG PUSCH is transmitted. In this case, the base station may have an ambiguous HARQ process number of the CG-UCI. Therefore, in this case, when transmitting the CG PUSCH, the terminal may transmit CG-UCI including a number (5 bits) of a longer HARQ process number field.

Case 7: A Type-2 CG PUSCH may be activated or released by a DCI format. The DCI format may have an HARQ process number field. For example, DCI format 0_0 may include a 4-bit HARQ process number field, DCI format 0_1 may include a 4-bit or 5-bit HARQ process number field, and DCI format 0_2 may include a 0-bit, 1-bit, 2-bits, 3-bits, 4-bits or 5-bit HARQ process number field. The terminal may determine a length of an HARQ process number field of CG-UCI, based on a length of the HARQ process number field included in the DCI format. More specifically, if the HARQ process number field of the DCI format is 4 bits or less, the HARQ process number field of the CG UCI may be determined to be 4 bits, and if the HARQ process number field of the DCI format is 5 bits, the HARQ process number field of the CG UCI may be determined to be 5 bits.

In the first method, an HARQ process number field of CG-UCI is determined to be 4 bits or 5 bits. Therefore, the terminal should include an additional 1 bit in the HARQ process number field. Therefore, uplink overhead may increase. In order to prevent an increase in uplink overhead, a second or third method which will be described later may be considered.

In a second method, the terminal may always include a 4-bit HARQ process number field in CG-UCI. The 4-bit HARQ process number field may include at least one of the following values (e.g., first value/second value/third value). For convenience in the following description, an HARQ process number of a CG PUSCH will be expressed as $i_{HPN}$. However, such an expression does not limit the technical scope of the disclosure.

First value: The terminal may include, in the 4-bit HARQ process number field, a value obtained by performing modulo 16 operation of an $i_{HPN}$ value.

Second value: The terminal may include, in the 4-bit HARQ process number field, a value obtained by performing ceil($i_{HPN}/2$) operation. For example, this operation may be applied when the number of HARQ process numbers used for a CG PUSCH exceeds 16 (that is, when nrofHARQ- Processes is greater than 16) or when nrofHARQ-Processes+harq-ProcID-Offset2 exceeds 16. In other cases, the terminal may include an $i_{HPN}$ value in the 4-bit HARQ process number field.

Third value: The base station may be configured, for the terminal, a value corresponding to $i_{HPN}$ (e.g., this value is one value among 0, 1, . . . , 15). The terminal may include the configured value in the 4-bit HARQ process number field. For example, if $i_{HPN}>16$, the base station may configure 0 for the terminal. Therefore, if $i_{HPN}>16$, the terminal may include a binary number "0000" in the 4-bit HARQ process number field of the CG-UCI.

In a third method, the terminal may always include a 4-bit HARQ process number field in CG-UCI. The terminal may not transmit a CG PUSCH having a value exceeding a value of the 4-bit HARQ process number field. That is, when transmitting a CG PUSCH, the terminal may transmit only a TB corresponding to one value among HARQ process numbers of 0, 1, . . . , 15, to the CG PUSCH. The 4-bit HARQ process number of CG-UCI of the CG PUSCH may indicate one value among 0, 1, . . . , 15. In other words, when the base station configures a CG PUSCH including CG-UCI, an HARQ process number of the CG PUSCH should be configured to be one value among 0, 1, . . . , 15. For example, when nrofHARQ-Processes is configured and harq-ProcID-Offset2 is not configured, nrofHARQ-Processes should be smaller than or equal to 16. As another example, when nrofHARQ-Processes and harq-ProcID-Offset2 are configured, nrofHARQ-Processes+harq-ProcID-Offset2 should be smaller than or equal to 16. If these are not satisfied, the terminal may consider a case an error case.

Embodiment 5: CG-DFI Generation Method

The base station may indicate to the terminal whether a CG PUSCH is successful (hereinafter, expressed as HARQ-ACK or downlink feedback information (CG-DFI) of the CG PUSCH) via DCI format 0_1. Table 33 describes DCI format 0_1. Here, DCI format 0_1 is a DCI format available for PUSCH scheduling. Therefore, in order to distinguish whether DCI format 0_1 is a DCI format for PUSCH scheduling or is a DCI format indicating CG-DFI, DCI format 0_1 may include a 1-bit DFI flag field. For example, if the DFI flag field of DCI format 0_1 is "1", DCI format 0_1 may be interpreted to be DCI for CG-DFI transmission. In this case, DCI format 0_1 may include a 16-bit HARQ-ACK bitmap. Here, each bit may indicate whether a CG PUSCH including a TB of a corresponding HARQ process number (or HARQ process ID) is successfully received. The terminal may determine, via an HARQ-ACK bitmap field, a TB failed to be received and may retransmit the TB through the CG PUSCH.

However, since only the 16-bit HARQ-ACK bitmap is included in this case, when the CG PUSCH uses 16 or more HARQ process numbers (e.g., 32 HARQ process numbers), the 16-bit HARQ-ACK bitmap may be insufficient. Therefore, when the terminal uses 16 or more HARQ process numbers (e.g., 32 HARQ process numbers), how to transmit CG-DFI needs to be determined. Embodiment 5 proposes methods for this.

TABLE 33

7.3.1.1.2    Format 0_1
DCI format 0_1 is used for the scheduling of one or multiple PUSCH in one cell, or
indicating CG downlink feedback information (CG-DFI) to a UE.
The following information is transmitted by means of the DCI format 0 1 with CRC TABLE 33-continued scrambled by C-RNTI or CS-RNTI or SP-CSI-RNTI or MCS-C-RNTI:
Identifier for DCI formats - 1 bit
The value of this bit field is always set to 0, indicating an UL DCI format
Carrier indicator - 0 or 3 bits, as defined in Clause 10.1 of [5, TS38.213]. This field is
reserved when this format is carried by PDCCH on the primary cell and the UE is
configured for scheduling on the primary cell from an SCell, with the same number of bits
as that in this format carried by PDCCH on the SCell for scheduling on the primary cell.
DFI flag - 0 or 1 bit
1 bit if the UE is configured to monitor DCI format 0_1 with CRC scrambled by CS-RNTI
and for operation in a cell with shared spectrum channel access when the higher layer
parameter cg-RetransmissionTimer is configured. For a DCI format 0_1 with CRC
scrambled by CS-RNTI, the bit value of 0 indicates activating or releasing type 2 CG
transmission and the bit value of 1 indicates CG-DFI. For a DCI format 0_1 with CRC
scrambled by C-RNTI/SP-CSI-RNTI/MCS-C-RNTI and for operation in a cell with shared
spectrum channel access, the bit is reserved.
0 bit otherwise;
If DCI format 0_1 is used for indicating CG-DFI, all the remaining fields are set as
follows:
HARQ-ACK bitmap - 16 bits , where the order of the bitmap to HARQ process index
mapping is such that HARQ process indices are mapped in ascending order from MSB to
LSB of the bitmap. For each bit of the bitmap, value 1 indicates ACK, and value 0
indicates NACK.
TPC command for scheduled PUSCH - 2 bits as defined in Clause 7.1.1 of [5, TS38.213]
-    All the remaining bits in format 0_1 are set to zero.

In a first method, the base station may include, in DCI format 0_1, a 32-bit HARQ-ACK bitmap field instead of a 16-bit HARQ-ACK bitmap field. The terminal may acquire a 32-bit HARQ-ACK bitmap field instead of a 16-bit HARQ-ACK bitmap field in DCI format 0_1 indicating CF DGI. Here, a method of determining 16 bits and 32 bits may correspond to at least one of the following cases.

Case 1: When a cell (a cell indicated by a carrier indicator field of DCI format 0_1) indicated by DCI format 0_1 indicates a band of frequency range (FR) 2-2, the HARQ-ACK bitmap field may be 32 bits. That is, a fixed 32-bit HARQ-ACK bitmap field may be included in DCI format 0_1 regardless of the number of HARQ process numbers that the terminal actually uses for a CG PUSCH. In this case, the HARQ-ACK bitmap field of DCI format 0_1 indicating CG-DFI may be determined regardless of other signals and configurations of the terminal.

Case 2: The base station may configure, for the terminal, the number of HARQ process numbers for PUSCH transmission. Here, a PUSCH may include a CG PUSCH or a dynamic grant (DG) PUSCH. For reference, the DG PUSCH may refer to a PUSCH scheduled via a DCI format. More specifically, when the terminal is configured with nrof-HARQ-ProcessesForPUSCH-r17=n32 via a higher-layer signal from the base station, the terminal may include 32 bits in the HARQ-ACK bitmap field of DCI format 0_1. nrof-HARQ-ProcessesForPUSCH-r17 indicates the number of HARQ processes to be used for a PUSCH of a serving cell. n32 may correspond to 32 HARQ processes. In other cases (i.e., when parameter nrofHARQ-ProcessesForPUSCH-r17 is not configured), the terminal may include 4 bits in the HARQ-ACK bitmap field of DCI format 0_1.

Case 3: The base station may configure, for the terminal, the number (nrofHARQ-Processes) of HARQ process numbers for CG PUSCH transmission. Bits of the HARQ-ACK bitmap field of DCI format 0_1 indicating CG-DFI may be determined based on the number of HARQ process numbers (nrofHARQ-Processes). For example, if nrofHARQ-Processes is smaller than or equal to 16, the HARQ-ACK bitmap field may be determined to be 16 bits. If nrofHARQ-Processes is greater than 16, the HARQ-ACK bitmap field may be determined to be 32 bits. As another example, if nrofHARQ-Processes is greater than 16, the HARQ-ACK bitmap field may be determined to be nrofHARQ-Processes bits.

Case 4: The base station may configure, for the terminal, the number (nrofHARQ-Processes) of HARQ process numbers or an offset value (harq-ProcID-Offset2) for CG PUSCH transmission. Bits of the HARQ-ACK bitmap field of DCI format 0_1 indicating CG-DFI may be determined based on the number of HARQ process numbers and the offset value. For example, if nrofHARQ-Processes is smaller than or equal to 16, the HARQ-ACK bitmap field may be determined to be 16 bits. If nrofHARQ-Processes is greater than 16, the HARQ-ACK bitmap field may be determined to be 32 bits. A first bit (i.e., a most significant bit (MSB)) of the HARQ-ACK bitmap field may indicate whether a PUSCH, on which a TB with an HARQ process number of harq-ProcID-Offset2 is transmitted, is successfully received, a second bit of the HARQ-ACK bitmap field may indicate whether a PUSCH, on which a TB with an HARQ process number of harq-ProcID-Offset2+1 is transmitted, is successfully received, an i-th bit of the HARQ-ACK bitmap field may indicate whether a PUSCH, on which a TB with an HARQ process number of harq-ProcID-Offset2+i−1 is transmitted, is successfully received, and a last bit (a least significant bit (LSB)) of the HARQ-ACK bitmap field may indicate whether a PUSCH, on which a TB with an HARQ process number of harq-ProcID-Offset2+nrofHARQ-Processes-1 is transmitted, is successfully received.

Case 5: The base station may configure, for the terminal, the number (nrofHARQ-Processes) of HARQ process numbers or an offset value (harq-ProcID-Offset2) for CG PUSCH transmission. Bits of the HARQ-ACK bitmap field of DCI format 0_1 indicating CG-DFI may be determined based on the number of HARQ process numbers and the offset value. If nrofHARQ-Processes+harq-ProcID-Offset2 is smaller than or equal to 16, the HARQ-ACK bitmap field may be determined to be 16 bits. If nrofHARQ-Processes+harq-ProcID-Offset2 is greater than 16, the HARQ-ACK bitmap field may be determined to be 32 bits. A first bit (i.e., a most significant bit (MSB)) of the HARQ-ACK bitmap field may indicate whether a PUSCH, on which a TB with an HARQ process number of 0 is transmitted, is successfully received, a second bit of the HARQ-ACK bitmap field may indicate whether a PUSCH, on which a TB with an HARQ process number of 1 is transmitted, is successfully received, an i-th bit of the HARQ-ACK bitmap field may indicate whether a PUSCH, on which a TB with an HARQ process number of i−1 is transmitted, is successfully received, and a last bit (a least significant bit (LSB)) of the HARQ-ACK bitmap field may indicate whether a PUSCH, on which a TB with an HARQ process number of 31 is transmitted, is successfully received.

Case 6: In the previous cases of cases 3, 4, and 5, it has been assumed that one CG PUSCH is configured. If the terminal has multiple CG PUSCH configurations, the terminal may be configured with multiple values of nrof-HARQ-Processes and/or harq-ProcID-Offset2. That is, one value of nrofHARQ-Processes and/or harq-ProcID-Offset2 may be configured for each CG PUSCH configuration. In this case, a value based on which the terminal determines a size of the HARQ-ACK bitmap field may be ambiguous. In order to resolve this ambiguity, for example, it may be assumed that sizes of HARQ-ACK bitmap fields are the same. As a specific example, if an HARQ-ACK bitmap field size determined by at least one CG PUSCH configuration is 32 bits, the HARQ-ACK bitmap field size may be fixed to 32 bits. In addition, if an HARQ-ACK bitmap field size determined by all CG PUSCH configurations is 16 bits, the HARQ-ACK bitmap field size may be fixed to 16 bits.

In the aforementioned first method, the HARQ-ACK bit field length may be 16 bits or 32 bits. If the length is determined to be 32 bits, a length of DCI format 0_1 (i.e., DCI format 0_1 with DFI flag="0") used for PUSCH scheduling may be shorter than a length of DCI format 0_1 (i.e., DCI format 0_1 with DFI flag="1") for transmission of CG-DFI including a 32-bit HARQ-ACK bitmap. In this case, the base station may add "0" so as to make the length of DCI format 0_1 (i.e., DCI format 0_1 with DFI flag="0") used for PUSCH scheduling to be the same as the length of DCI format 0_1 (i.e., DCI format 0_1 with DFI flag="1") for transmission of CG-DFI including the 32-bit HARQ-ACK bitmap. Here, the base station may add "0" to a last bit position (i.e., LSB) of DCI format 0_1 (i.e., DCI format 0_1 with DFI flag="0") used for PUSCH scheduling. If the length of DCI format 0_1 (i.e., DCI format 0_1 with DFI flag="0") used for PUSCH scheduling is shorter than the length of DCI format 0_1 (i.e., DCI format 0_1 with DFI flag="1") for transmission of CG-DFI including the 32-bit HARQ-ACK bitmap, the terminal may receive DCI format 0_1 by assuming the length of DCI format 0_1 (i.e., DCI format 0_1 with DFI flag="1") for transmission of CG-DFI including the 32-bit HARQ-ACK bitmap.

Alternatively, the terminal may always assume that the length of DCI format 0_1 (i.e., DCI format 0_1 with DFI flag="0") used for PUSCH scheduling is greater than or equal to the length of DCI format 0_1 (i.e., DCI format 0_1 with DFI flag="1") for transmission of CG-DFI including the 32-bit HARQ-ACK bitmap. In other words, the base station needs to configure the length of DCI format 0_1 (i.e., DCI format 0_1 with DFI flag="0") used for PUSCH scheduling to be greater than or equal to the length of DCI format 0_1 (i.e., DCI format 0_1 with DFI flag="1") for transmission of CG-DFI including the 32-bit HARQ-ACK bitmap.

If these are not satisfied, the terminal may consider a case an error case. In the aforementioned first method, the HARQ-ACK bit field length may be 16 bits or 32 bits. If the length is selected to be 32 bits, overhead of a downlink control channel may be high. Therefore, the length of the HARQ-ACK bitmap field may be fixed to 16 bits. In the second method of the embodiment, the 16-bit HARQ-ACK bitmap field may indicate whether TBs corresponding to up to 32 HARQ process numbers are successfully received. More specifically, whether reception is successful may be indicated as follows.

Case 1: The base station may indicate whether TBs corresponding to specific 16 HARQ process numbers are successfully received. For example, the specific 16 may be HARQ process numbers 0, 1, . . . , 15. As another example, the specific HARQ process numbers may be 16, 17, . . . , 31. In addition, the specific HARQ process numbers may be configured by the base station. In other words, the base station may configure HARQ process numbers indicated via CG-DCI, and whether TBs corresponding to the HARQ process numbers are successfully received may be indicated via 16-bit CG-DFI.

Furthermore, DCI format 0_1 received by the terminal may include a 16-bit HARQ-ACK bitmap corresponding to a first HARQ process number set (e.g., HARQ process number 0, 1, . . . , 15), or a 16-bit HARQ-ACK bitmap corresponding to a second HARQ process number set (e.g., HARQ process numbers 16, 17, . . . , 31) may be included. This may be determined according to an index of a slot in which a PDCCH including DCI format 0_1 is received, an index of a CORESET, an index of a search space, an index (e.g., an index of a lowest control channel element (CCE)) of a CCE in which the PDCCH is received, or a value of an RNTI by which DCI format 0_1 is scrambled. For example, if the index is an even number, DCI format 0_1 may include a 16-bit HARQ-ACK bitmap corresponding to the first HARQ process number set, and if the index is an odd number, DCI format 0_1 may include a 16-bit HARQ-ACK bitmap corresponding to the second HARQ process number set. For example, if the RNTI is a CS-RNTI, DCI format 0_1 may include a 16-bit HARQ-ACK bitmap corresponding to the first HARQ process number set, and if the RNTI is an RNTI other than a CS-RNTI, DCI format 0_1 may include a 16-bit HARQ-ACK bitmap corresponding to the second HARQ process number set. Alternatively, a 1-bit flag may be added to DCI format 0_1. For example, if 1 bit flag="0", DCI format 0_1 may include a 16-bit HARQ-ACK bitmap corresponding to the first HARQ process number set, and if 1 bit flag="1", DCI format 0_1 may include a 16-bit HARQ-ACK bitmap corresponding to the second HARQ process number set.

Case 2: The base station may indicate, using one bit, whether TBs of two HARQ process number are successfully received. That is, one bit may be "1" if both TBs of the two HARQ process numbers are successfully received, and may be "0" if at least one of the TBs of the two HARQ process numbers cannot be received. For reference, it may be assumed that a TB of an HARQ process number not used for CG PUSCH transmission has been successfully received.

For example, a first bit of a 16-bit HARQ-ACK bitmap may indicate whether a TB corresponding to HARQ process number 0 and a TB corresponding to HARQ process number 16 are successfully received. An i-th bit of the 16-bit HARQ-ACK bitmap may indicate whether a TB corresponding to HARQ process number i−1 and a TB corresponding to i+15 are successfully received.

For example, the first bit of the 16-bit HARQ-ACK bitmap may indicate whether the TB corresponding to HARQ process number 0 and a TB corresponding to HARQ process number 1 are successfully received. The i-th bit of the 16-bit HARQ-ACK bitmap may indicate whether a TB corresponding to HARQ process number 2*(i−1) and a TB corresponding to 2*(i−1)+1 are successfully received.

The respective proposed methods and/or embodiments (e.g., embodiment 1/embodiment 2/embodiment 3/embodiment 4/embodiment 5, etc.) described above may be performed individually, or two or more embodiments may be combined so as to be performed together. In addition, the proposed methods and/or embodiments (e.g., embodiment 1/embodiment 2/embodiment 3/embodiment 4/embodiment 5, etc.) above are described based on a downlink, but may also certainly be applied to an uplink (e.g., configuring the number of HARQ processes for PUSCH).

Figure 18:
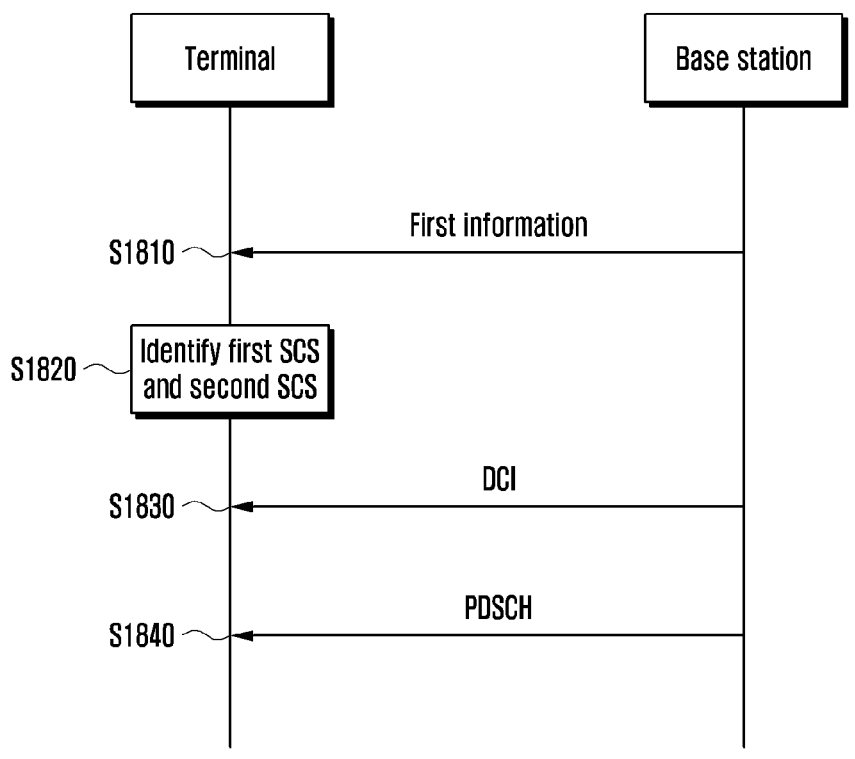
FIG. 18 illustrates a signaling flowchart of a terminal and a base station according to an embodiment of the disclosure.

FIG. 18 illustrates a signaling flowchart of a terminal and a base station according to an embodiment of the disclosure.

Operations of a terminal and a base station in FIG. 18 may be based on the aforementioned proposed methods and/or embodiments (e.g., embodiment 1/embodiment 2/embodiment 3/embodiment 4/embodiment 5, etc.). An operation sequence shown in FIG. 18 is not fixed and may be changed. Also, in some cases, some operations may be omitted, or two or more operations may be combined so as to be performed as one operation.

The terminal may receive first information from the base station, in S1810. That is, the base station may transmit the first information to the terminal. The first information may be information for configuring the number of HARQ processes associated with a PDSCH.

The terminal may identify a first SCS for a first BWP. In addition, the terminal may identify a second SCS for a second BWP, in S1820. For example, the first SCS may be configured to be 480 kHz or 960 kHz, and the second SCS may be configured to be a value (e.g., 120 kHz) other than 480 kHz and 960 kHz.

A method for determining the number of HARQ processes by considering a BWP for which the SCS of 480 kHz or 960 kHz is configured may be based on embodiment 1 described above. For example, when 32, which is the number of HARQ processes, configured based on the first information is associated with the first SCS, up to 32 HARQ processes may be supported in the second BWP for which the second SCS is configured.

The terminal may receive DCI including an HARQ process number field, in S1830. That is, the base station may transmit DCI to the terminal.

The number of bits of the HARQ process number field of the DCI may be determined based on embodiment 2 described above. For example, the terminal may receive, via RRC signaling, second information associated with the number of bits of the HARQ process number field in the DCI. It may be determined, based on the second information, whether the number of bits of the HARQ process number field is 5 bits. The second information may be configured for each BWP.

The terminal may receive a PDSCH, based on the first BWP or the second BWP, in S1840. That is, the base station may transmit the PDSCH to the terminal. For example, PDSCH may be scheduled by the DCI.

The terminal may generate an HARQ-ACK codebook for the received PDSCH, and transmit information including the HARQ-ACK codebook to the base station through an uplink channel. For example, the HARQ-ACK codebook may be generated based on embodiment 3 described above.

The terminal may receive third information for configuring the number of HARQ processes for transmission of an uplink channel (e.g., CG-PUSCH) based on a configured grant. That is, the base station may transmit the third information to the terminal.

The terminal may transmit UCI associated with the configured grant, based on the uplink channel (e.g., CG-PUSCH). The UCI may include an HARQ process number field. The number of bits of the HARQ process number field included in the UCI may be determined based on embodiment 4 described above. For example, based on the third information for configuring the number of HARQ processes for transmission of the uplink channel to be a value greater than 16, the HARQ process number field of the UCI may include 5 bits.

The terminal may receive, from the base station, DCI for indicating DFI associated with the configured grant-based uplink channel. The base station may indicate, via the DCI for indicating the DFI, whether the configured grant-based uplink channel (e.g., CG-PUSCH) is successfully received. The DCI for indicating the DFI may include an HARQ-ACK bitmap field. The number of bits of the HARQ-ACK bitmap field may be determined based on embodiment 5 described above. For example, based on the third information for configuring the number of HARQ processes for transmission of the uplink channel to be a value greater than 16, the number of bits of the bitmap field may be determined to be 32 bits.

Figure 19:
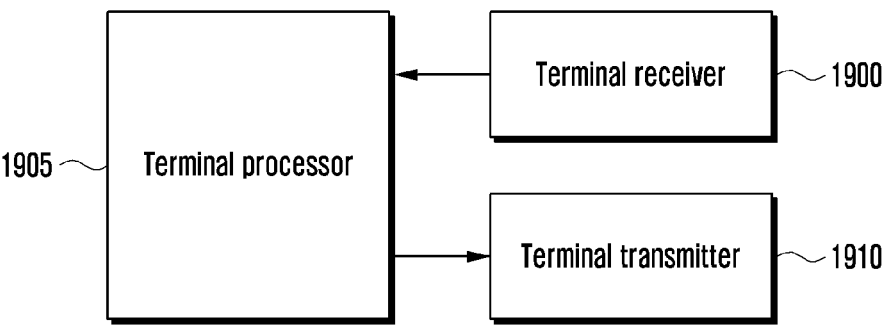
FIG. 19 is a diagram illustrating a structure of a terminal in the wireless communication system according to an embodiment of the disclosure.
Figure 20:
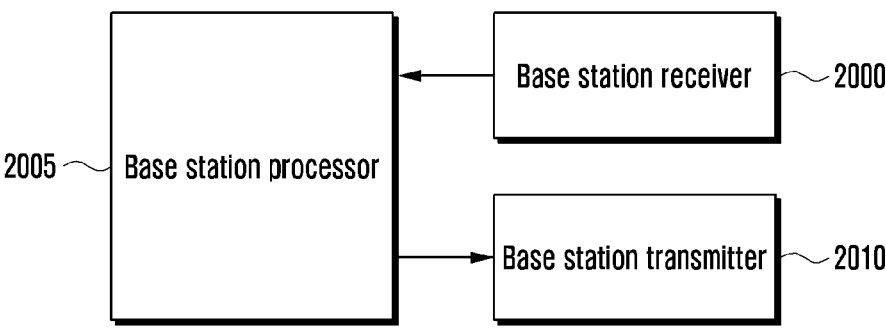
FIG. 20 is a diagram illustrating a structure of a base station in the wireless communication system according to an embodiment of the disclosure.

The proposed methods and/or embodiments (e.g., embodiment 1/embodiment 2/embodiment 3/embodiment 4/embodiment 5, etc.) described above and the operations of FIG. 18 may be performed by the terminal and the base station of FIG. 19 and FIG. 20.

FIG. 19 is a diagram illustrating a structure of a terminal in the wireless communication system according to an embodiment of the disclosure.

Referring to FIG. 19, a terminal may include a transceiver which refers to a terminal receiver 1900 and a terminal transmitter 1910, a memory (not illustrated), and a terminal processor 1905 (or a terminal controller or a processor). According to the communication method of the terminal described above, the transceiver 1900 or 1910, the memory, and the terminal processor 1905 of the terminal may operate. However, the elements of the terminal are not limited to the aforementioned examples. For example, the terminal may include more elements or fewer elements compared to the aforementioned elements. In addition, the transceiver, the memory, and the processor may be implemented in the form of a single chip.

The transceiver may transmit a signal to or receive a signal from a base station. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

The transceiver may receive a signal and output the same to the processor via a radio channel and may transmit, via a radio channel, a signal output from the processor.

The memory may store a program and data necessary for operation of the terminal. The memory may store control information or data included in a signal transmitted or received by the terminal. The memory may include a storage medium or a combination of storage media, such as a ROM, a RAM, a hard disk, a CD-ROM, and a DVD. There may be multiple memories.

The processor may control a series of procedures so that the terminal operates according to the aforementioned embodiments. For example, the processor may receive DCI including two layers and control the elements of the terminal to simultaneously receive multiple PDSCHs.

There may be multiple processors, and the processor may control the elements of the terminal by executing programs stored in the memory.

FIG. 20 is a diagram illustrating a structure of a base station in the wireless communication system according to an embodiment of the disclosure.

Referring to FIG. 20, a base station may include a transceiver, which refers to a base station receiver 2030 and a base station transmitter 2010, a memory (not illustrated), and a base station processor 2005 (or a base station controller or processor). According to the communication method of the base station described above, the transceiver 2000 or 2010, the memory, and the base station processor 2005 of the base station may operate. However, the elements of the base station are not limited to the above examples. For example, the base station may include more elements or fewer elements compared to the aforementioned elements. In addition, the transceiver, the memory, and the processor may be implemented in the form of a single chip.

The transceiver may transmit a signal to or receive a signal from a terminal. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is merely an embodiment of the transceiver, and the elements of the transceiver are not limited to the RF transmitter and the RF receiver.

The transceiver may receive a signal and output the same to the processor via a radio channel and may transmit, via a radio channel, a signal output from the processor.

The memory may store a program and data necessary for operation of the base station. The memory may store control information or data included in a signal transmitted or received by the base station. The memory may include a storage medium or a combination of storage media, such as a ROM, a RAM, a hard disk, a CD-ROM, and a DVD. There may be multiple memories.

The processor may control a series of procedures so that the base station operates according to the aforementioned embodiments of the disclosure. For example, the processor may configure DCI of two layers including allocation information for multiple PDSCHs, and may control each element of the base station to transmit the DCI. There may be multiple processors, and the processor may control the elements of the base station by executing programs stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein. The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, although the above embodiments have been described based on the FDD LTE system, other variants based on the technical idea of the embodiments may also be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel. Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the purpose of illustration, and embodiments of the disclosure are not limited to the embodiments set forth herein. Those skilled in the art will appreciate that other particular modifications and changes may be easily made without departing from the technical idea or the essential features of the disclosure. The scope of the disclosure should be determined not by the above description but by the appended claims, and all modifications or changes derived from the meaning and scope of the claims and equivalent concepts thereof shall be construed as falling within the scope of the disclosure.

The invention claimed is:

1. A method performed by a terminal in a wireless communication system, the method comprising:
identifying that a first subcarrier spacing (SCS) for a first bandwidth part (BWP) is one of 480 KHz or 960 KHz;
identifying that a second SCS for a second BWP is 120 KHz;
receiving information on a configured grant configuration for transmission of an uplink channel;
receiving downlink control information (DCI) for indicating configured grant-downlink feedback information (CG-DFI) associated with the uplink channel; and
receiving a physical downlink shared channel (PDSCH) based on the first BWP or the second BWP
wherein the DCI includes a hybrid automatic repeat request-acknowledgement (HARQ-ACK) bitmap field,
wherein a number of bits of the HARQ-ACK bitmap field is 32 bits, in case that the information on the configured grant configuration includes information on a number of HARQ processes associated with the uplink channel, and
wherein the number of HARQ processes is greater than 16.

2. The method of claim 1, further comprising:
receiving first information for configuring a number of HARQ processes associated with the PDSCH
wherein, in case that the number of HARQ processes associated with the PDSCH is 32 for the first SCS, up to 32 HARQ processes are supported in the second BWP for which the second SCS is configured.

3. The method of claim 1, further comprising:
receiving, via radio resource control (RRC) signaling, second information associated with a number of bits of an HARQ process number field in second DCI; and
receiving the second DCI including the HARQ process number field,
wherein whether the number of bits of the HARQ process number field is 5 bits is based on the second information.

4. The method of claim 1, further comprising:
transmitting uplink control information (UCI) associated with a configured grant, based on the uplink channel,
wherein the UCI comprises an HARQ process number field, and
wherein the HARQ process number field of the UCI comprises 5 bits, based on the number of HARQ processes associated with the uplink channel being greater than 16 in the information on the configured grant configuration.

5. The method of claim 1, further comprising:
receiving information for configuring an offset of the HARQ processes associated with the uplink channel; and
transmitting uplink control information (UCI) associated with a configured grant, based on the uplink channel,
wherein the UCI comprises an HARQ process number field, and
wherein in case that a sum of the number of the HARQ processes associated with the uplink channel and a value of the offset is greater than 16, the HARQ process number field of the UCI comprises 5 bits, and the number of bits of the HARQ-ACK bitmap field is 32 bits.

6. The method of claim 1, further comprising:
receiving configurations for multiple configured grants for uplink channel transmission; and
identifying third information for configuring a number of HARQ processes corresponding to each configured grant and fourth information for configuring offsets of HARQ processes,
wherein, in case that a number of bits of an HARQ-ACK bitmap field determined based on the third information and fourth information corresponding to at least one configured grant among the multiple configured grants is 32 bits, the number of bits of the HARQ-ACK bitmap field included in the DCI is 32 bits.

7. The method of claim 2, further comprising:
identifying that the second BWP is an active BWP;
generating a HARQ-ACK codebook, based on a number of HARQ processes corresponding to the second BWP; and
transmitting an uplink channel comprising the HARQ-ACK codebook.

8. A method performed by a base station in a wireless communication system, the method comprising:
transmitting, to a terminal, information on a configured grant configuration for transmission of an uplink channel;
transmitting, to the terminal, downlink control information (DCI) for indicating configured grant-downlink feedback information (CG-DFI) associated with the uplink channel; and
transmitting, to the terminal, a physical downlink shared channel (PDSCH) based on a first bandwidth part (BWP) or a second BWP,
wherein a first subcarrier spacing (SCS) for the first BWP is configured to be 480 kHz or 960 kHz, and a second SCS for the second BWP is configured to be 120 KHz,
wherein the DCI includes a hybrid automatic repeat request-acknowledgement (HARQ-ACK) bitmap field,
wherein a number of bits of the HARQ-ACK bitmap field is 32 bits, in case that information on a number of HARQ processes associated with the uplink channel is configured in the information on the configured grant configuration, and
wherein the number of HARQ processes is greater than 16.

9. The method of claim 8, further comprising:
transmitting, to the terminal, first information for configuring a number of HARQ processes associated with the PDSCH
wherein in case that the number of HARQ processes associated with the PDSCH configured based on the first information is 32 for the first SCS, up to 32 HARQ processes are supported in the second BWP for which the second SCS is configured.

10. The method of claim 8, further comprising:
transmitting, to the terminal via radio resource control (RRC) signaling, second information associated with a number of bits of an HARQ process number field in second DCI; and
transmitting the second DCI including the HARQ process number field to the terminal,
wherein whether the number of bits of the HARQ process number field is 5 bits is determined based on the second information.

11. The method of claim 8, further comprising:
receiving uplink control information (UCI) associated with a configured grant, based on the uplink channel,
wherein the UCI comprises an HARQ process number field, and wherein the HARQ process number field of the UCI comprises 5 bits, based on the number of HARQ processes associated with the uplink channel being set to a value greater than 16 in the information on the configured grant configuration.

12. A terminal of a wireless communication system, the terminal comprising:

a transceiver; and a controller functionally connected to the transceiver and configured to:

identify that a first subcarrier spacing (SCS) for a first bandwidth part (BWP) is one of 480 kHz or 960 kHz, identify that a second SCS for a second BWP is 120 kHz, receive information on a configured grant configuration for transmission of an uplink channel, receive downlink control information (DCI) for indicating configured grant-downlink feedback information (CG-DFI) associated with the uplink channel, and receive a physical downlink shared channel (PDSCH) based on the first BWP or the second BWP wherein the DCI includes a hybrid automatic repeat request-acknowledgement (HARQ-ACK) bitmap field, wherein a number of bits of the HARQ-ACK bitmap field is 32 bits, in case that the information on the configured grant configuration includes information on a number of HARQ processes associated with the uplink channel, and wherein the number of HARQ processes is greater than 16.

13. The terminal of claim 12, wherein the controller is further configured to:

receive first information for configuring a number of HARQ processes associated with the PDSCH, and wherein, in case that the number of HARQ processes associated with the PDSCH is 32 for the first SCS, up to 32 HARQ processes are supported in the second BWP for which the second SCS is configured.

14. A base station of a wireless communication system, the base station comprising:

a transceiver; and a controller functionally connected to the transceiver and configured to:

transmit, to a terminal, information on a configured grant configuration for transmission of an uplink channel, transmit, to the terminal, downlink control information (DCI) for indicating configured grant-downlink feedback information (CG-DFI) associated with the uplink channel, and transmit, to the terminal, a physical downlink shared channel (PDSCH) based on a first bandwidth part (BWP) or a second BWP, wherein a first subcarrier spacing (SCS) for the first BWP is configured to be 480 KHz or 960 kHz, and a second SCS for the second BWP is configured to be 120 kHz, wherein the DCI includes a hybrid automatic repeat request-acknowledgement (HARQ-ACK) bitmap field, wherein a number of bits of the HARQ-ACK bitmap field is 32 bits, in case that information on a number of HARQ processes associated with the uplink channel is configured in the information on the configured grant configuration, and wherein the number of HARQ processes is greater than 16.

15. The base station of claim 14, wherein the controller is further configured to:

transmit, to the terminal, first information for configuring a number of HARQ processes associated with the PDSCH, and wherein in case that the number of HARQ processes associated with the PDSCH configured based on the first information is 32 for the first SCS, up to 32 HARQ processes are supported in the second BWP for which the second SCS is configured.

* * * * *